United States Patent
Liu et al.

(10) Patent No.: US 12,452,753 B2
(45) Date of Patent: Oct. 21, 2025

(54) MODE 1 NETWORK ENTITY INITIATED NETWORK CODING HANDOVER

(71) Applicant: QUALCOMM Incorporated, San Diego, CA (US)

(72) Inventors: Guangyi Liu, Shanghai (CN); Gabi Sarkis, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 17/814,471

(22) Filed: Jul. 22, 2022

(65) Prior Publication Data
US 2024/0031889 A1     Jan. 25, 2024

(51) Int. Cl.
*H04W 36/00* (2009.01)
*H04W 36/32* (2009.01)
*H04W 72/23* (2023.01)
*H04W 4/44* (2018.01)

(52) U.S. Cl.
CPC .......... *H04W 36/03* (2018.08); *H04W 36/32* (2013.01); *H04W 36/322* (2023.05); *H04W 72/23* (2023.01); *H04W 4/44* (2018.02)

(58) Field of Classification Search
CPC ......... H04W 4/40–48; H04W 36/0005; H04W 36/023; H04W 36/03; H04W 36/32; H04W 36/322; H04W 92/18; H04W 72/23–232
See application file for complete search history.

(56) References Cited

U.S. PATENT DOCUMENTS

2010/0278141 A1* 11/2010 Choi-Grogan ...... H04J 13/0062
                                                       370/331
2019/0174344 A1*  6/2019 Karella ............... H04W 24/10

FOREIGN PATENT DOCUMENTS

WO     2018005531 A1    1/2018

OTHER PUBLICATIONS

"3rd Generation Partnership Project; Technical Specification Group Radio Access Network; Study on LTE-based V2X Services; (Release 14)", 3GPP Standard, 3GPP TR 36.885, 3rd Generation Partnership Project (3GPP), Mobile Competence Centre, 650, Route Des Lucioles, F-06921, Sophia-Antipolis Cedex, France, vol. RAN WG1, No. V14.0.0, Jul. 20, 2016 (Jul. 20, 2016), pp. 1-216, XP051295325, [retrieved on Jul. 20, 2016], abstract, p. 14-p. 24, Annex A.

(Continued)

*Primary Examiner* — Thomas R Cairns
(74) *Attorney, Agent, or Firm* — Procopio, Cory, Hargreaves & Savitch LLP/Qualcomm

(57) ABSTRACT

A first device may communicate an SL NC TB with a second device. At least one of the first device and the second device may be a UE. The first device may transmit, to a network entity, a first message having a first location information that indicates a movement of the UE from a first zone to a second zone. The first message may have a first location information associated with the UE. The UE may be in SL communication with a first encoder in the first zone. The network entity may obtain, from the first device, the first message. The network entity may initialize an NC handover of the UE to a second encoder of the second zone in response to the first location information indicating a movement of the UE from the first zone to the second zone.

44 Claims, 30 Drawing Sheets

(56) References Cited

OTHER PUBLICATIONS

International Search Report and Written Opinion—PCT/US2023/027555—ISA/EPO—Nov. 2, 2023.
ITRI, et al., "Discussion on PC5 Handover and Uu Handover for V2X", 3GPP TSG RAN WG2 Meeting #94, R2-163799, 3rd Generation Partnership Project, Mobile Competence Centre, 650, Route Des Lucioles, F-06921 Sophia-Antipolis Cedex, France, vol. RAN WG2, No. Nanjing, China, May 23, 2016-May 27, 2016, May 22, 2016, XP051105205, 5 pages, the whole document.
LG Electronics Inc: "Consideration on the Issues for LTE-Based V2X", 3GPP TSG-RAN WG3 Meeting #90, R3-152577, 3rd Generation Partnership Project, Mobile Competence Centre, 650, Route Des Lucioles, F-06921 Sophia-Antipolis Cedex, France, vol. RAN WG3 No. Anaheim, USA, Nov. 16, 2015-Nov. 20, 2015, Nov. 16, 2015, XP051007449, pp. 1-7, the whole document.
Igor Ostrovsky Blogging, "How RAID-6 dual parity calculation works" posted Sep. 29, 2014. Retrieved from The Wayback Machine—https://web.archive.org/web/20220102210658/http:/igoro.com/archive/how-raid-6-dual-parity-calcuation-works/.

* cited by examiner

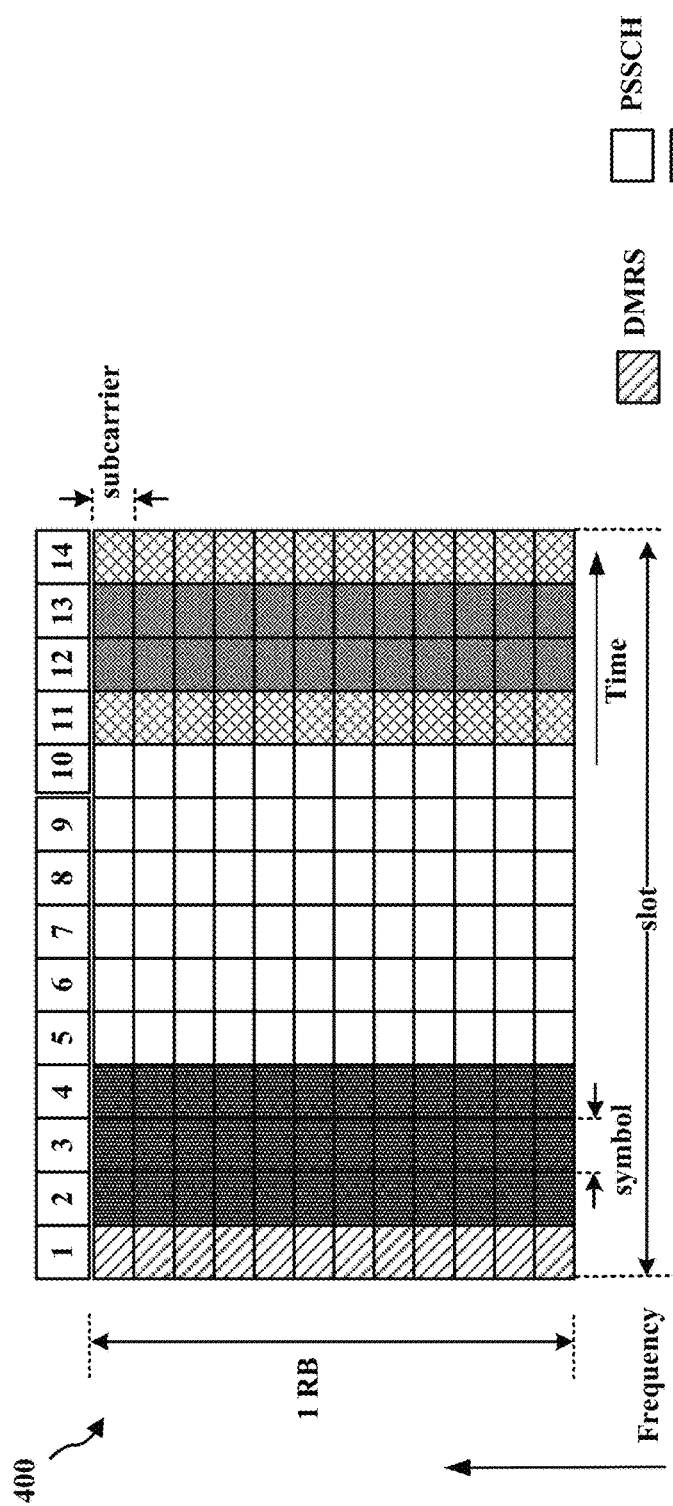
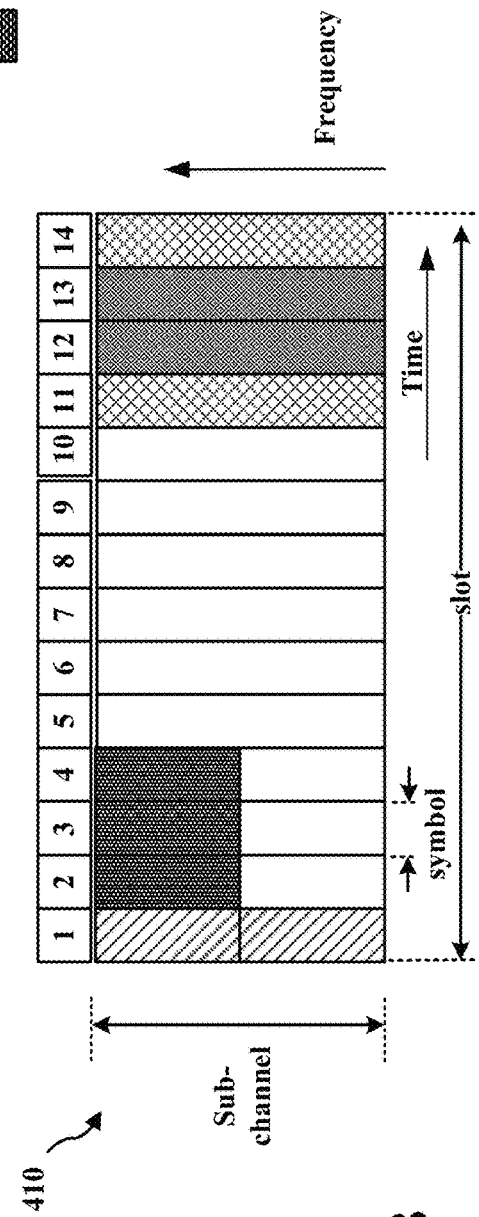
FIG. 4A
FIG. 4B

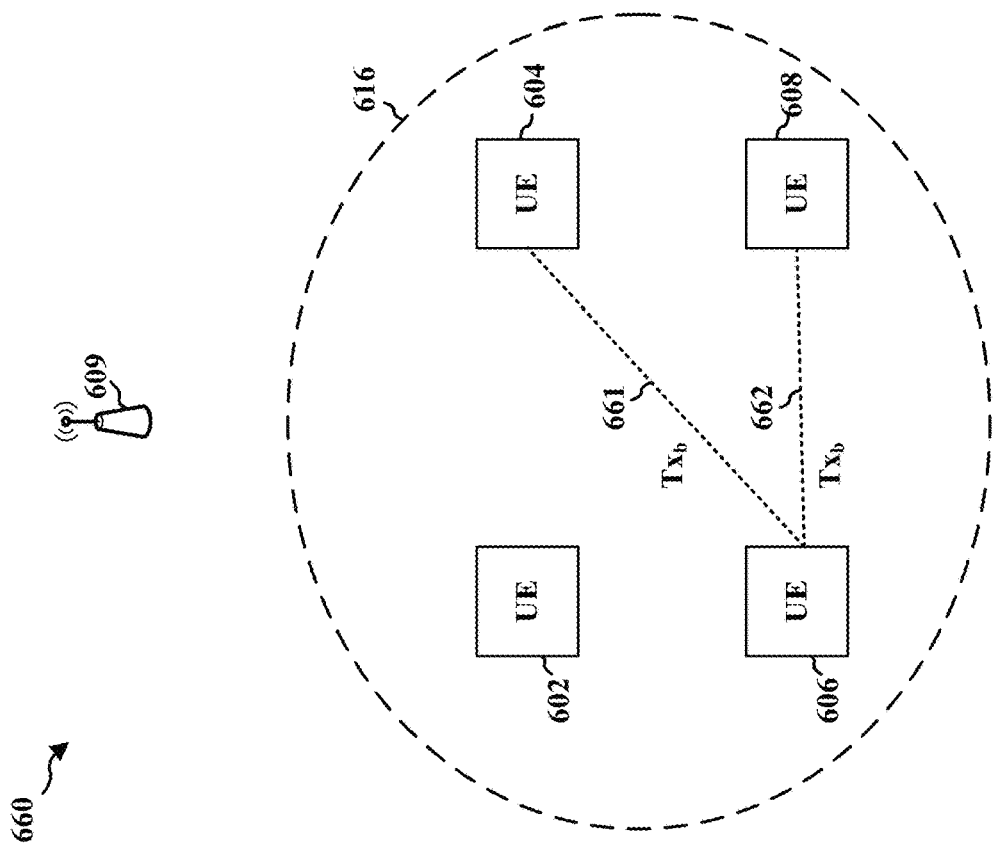
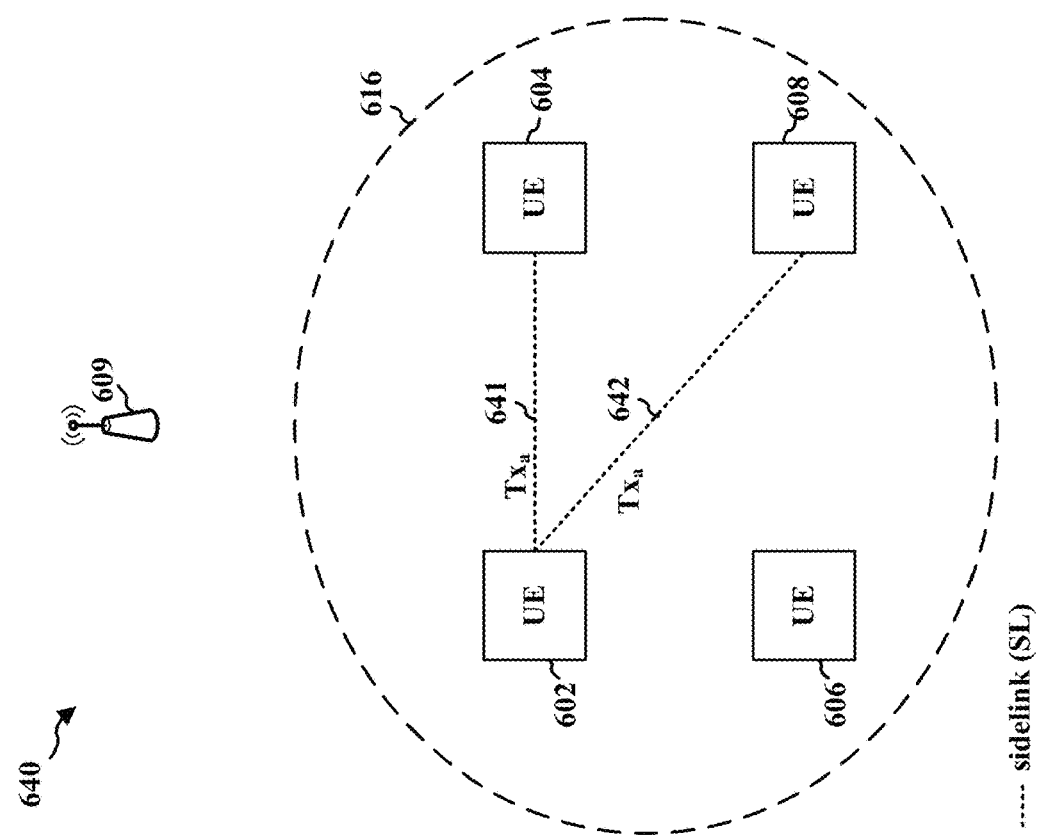
FIG. 6D
FIG. 6C
---- sidelink (SL)
—— cellular (Uu)

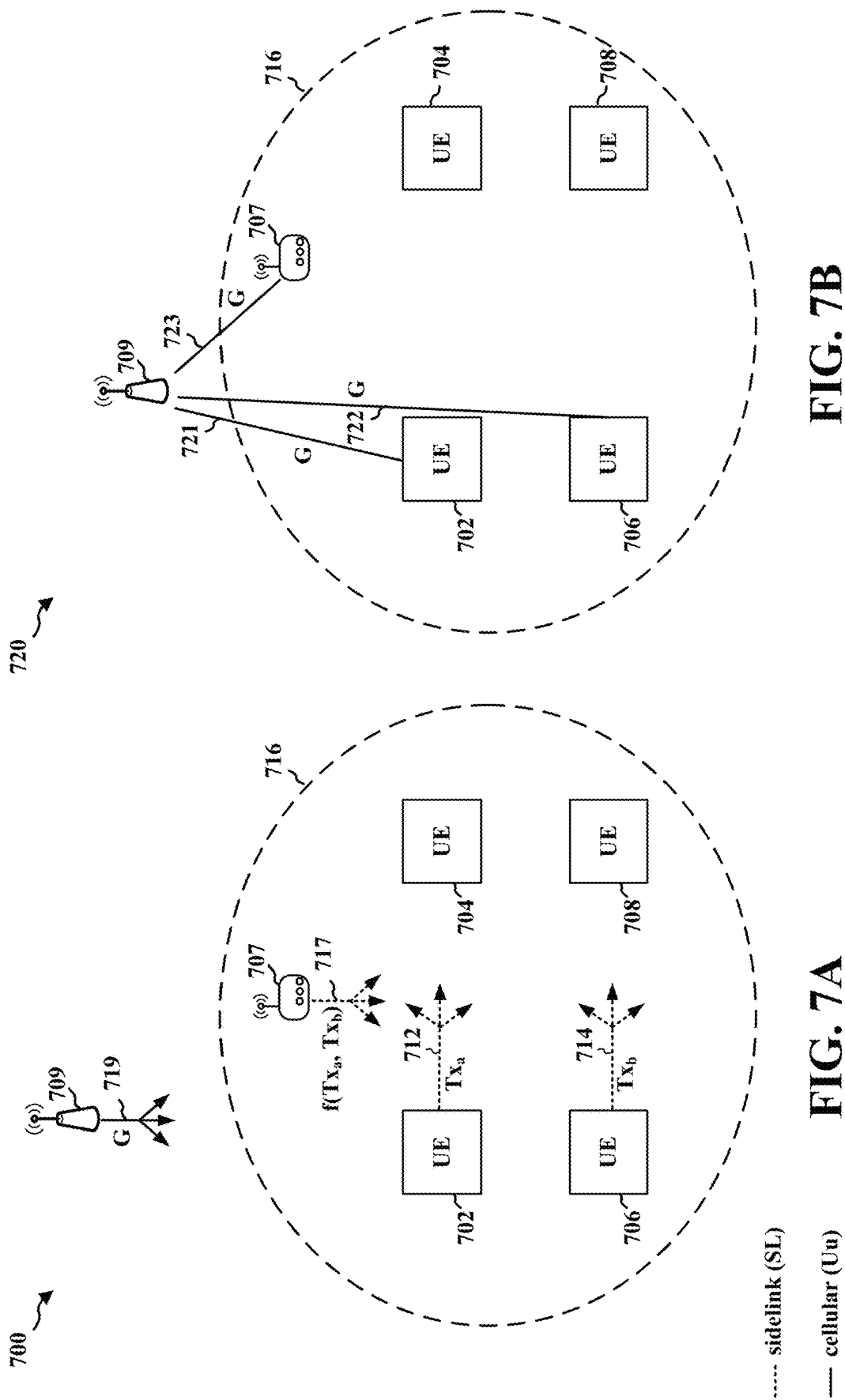

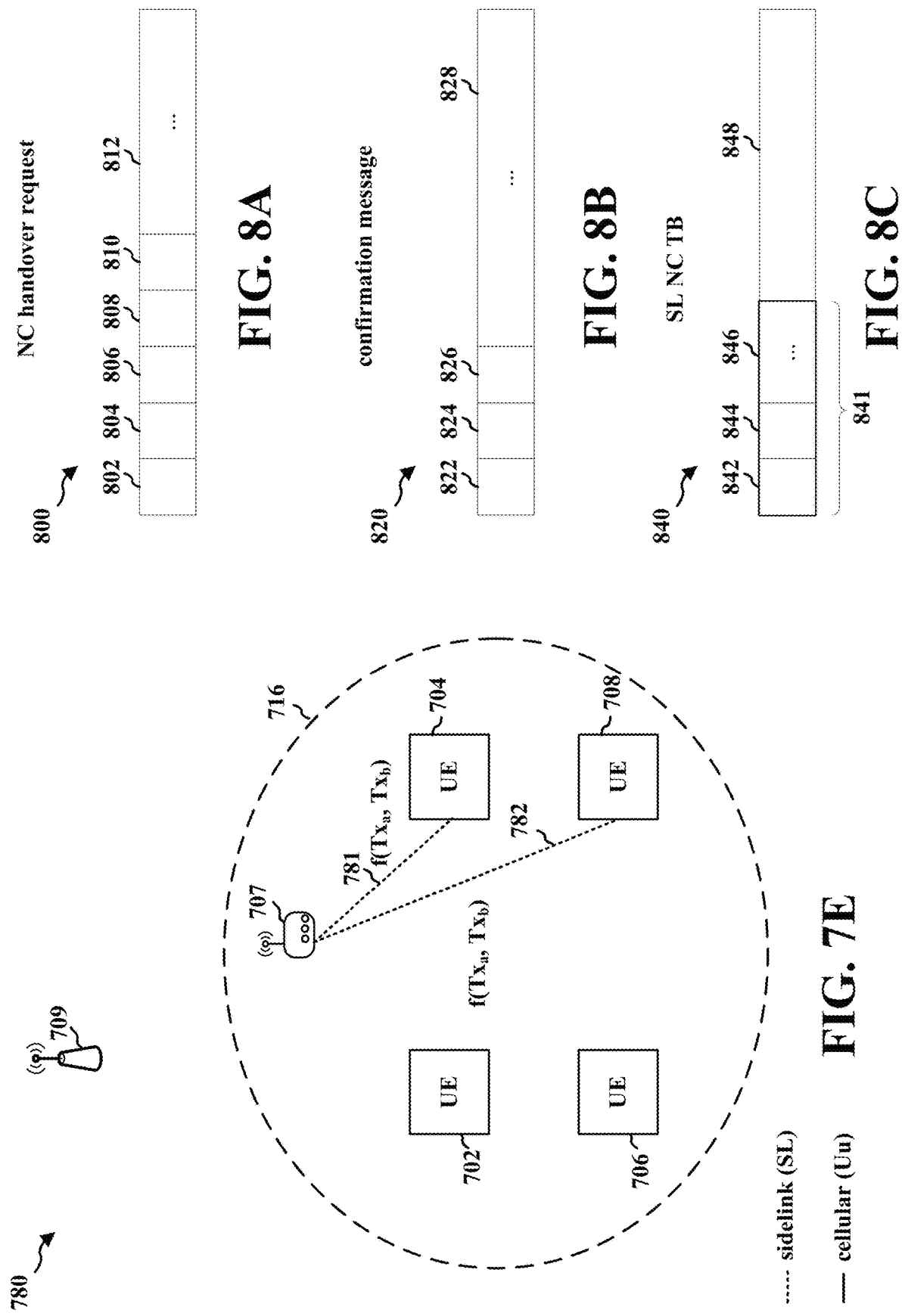

MODE 1 NETWORK ENTITY INITIATED NETWORK CODING HANDOVER

INTRODUCTION

The present disclosure relates generally to communication systems, and more particularly, to a network coding handover system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a first device is provided. The apparatus may have a memory and at least one processor coupled to the memory. Based at least in part on information stored in the memory, the at least one processor may be configured to communicate, with a second device, a sidelink (SL) transport block (TB) for network coding (NC) At least one of the first device or the second device may include a user equipment (UE). Based at least in part on information stored in the memory, the at least one processor may be configured to transmit, to a network entity, a first message including a first location information that indicates a movement of the UE from a first zone to a second zone.

In an aspect of the disclosure, an apparatus for wireless communication at a first device is provided. The apparatus may include means for communicating, with a second device, an SL TB for NC At least one of the first device or the second device may include a UE. The apparatus may include means for transmitting, to a network entity, a first message including a first location information that indicates a movement of the UE from a first zone to a second zone.

In an aspect of the disclosure, a method of wireless communication at a first device is provided. The method may include communicating, with a second device, an SL TB for NC At least one of the first device or the second device may include a UE. The method may include transmitting, to a network entity, a first message including a first location information that indicates a movement of the UE from a first zone to a second zone.

In an aspect of the disclosure, a computer-readable storage medium storing computer executable code at a first device is provided, the code when executed by a processor may cause the processor to communicate, with a second device, an SL TB for NC At least one of the first device or the second device may include a UE. The code when executed by a processor may cause the processor to transmit, to a network entity, a first message including a first location information that indicates a movement of the UE from a first zone to a second zone.

In an aspect of the disclosure, a method, a computer-readable medium, and an apparatus for wireless communication at a network entity is provided. The apparatus may have a memory and at least one processor coupled to the memory. Based at least in part on information stored in the memory, the at least one processor may be configured to obtain, from a first device, a first message including a first location information associated with a UE in SL communication with a first encoder associated with a first zone. Based at least in part on information stored in the memory, the at least one processor may be configured to initialize an NC handover of the UE to a second encoder in a second zone in response to the first location information indicating a movement of the UE from the first zone to the second zone.

In an aspect of the disclosure, an apparatus for wireless communication at a network entity is provided. The apparatus may include means for obtaining, from a first device, a first message including a first location information associated with a UE in SL communication with a first encoder associated with a first zone. The apparatus may include means for initializing an NC handover of the UE to a second encoder in a second zone in response to the first location information indicating a movement of the UE from the first zone to the second zone.

In an aspect of the disclosure, a method of wireless communication at a network entity is provided. The method may include obtaining, from a first device, a first message including a first location information associated with a UE in SL communication with a first encoder associated with a first zone. The method may include initializing an NC handover of the UE to a second encoder in a second zone in response to the first location information indicating a movement of the UE from the first zone to the second zone.

In an aspect of the disclosure, a computer-readable storage medium storing computer executable code at a network entity is provided, the code when executed by a processor may cause the processor to obtain, from a first device, a first message including a first location information associated with a UE in SL communication with a first encoder associated with a first zone. The code when executed by a processor may cause the processor to initialize an NC handover of the UE to a second encoder in a second zone in response to the first location information indicating a movement of the UE from the first zone to the second zone.

In an aspect of the disclosure, a method, a computer-readable medium, and an apparatus for wireless communication at a second encoder is provided. The apparatus may have a memory and at least one processor coupled to the memory. Based at least in part on information stored in the memory, the at least one processor may be configured to receive, from a network entity, an NC handover request. Based at least in part on information stored in the memory, the at least one processor may be configured to transmit, to a UE an SL NC TB based on the NC handover request.

In an aspect of the disclosure, an apparatus for wireless communication at a second encoder is provided. The apparatus may include means for receiving, from a network entity, an NC handover request. The apparatus may include means for transmitting, to a UE an SL NC TB based on the NC handover request.

In an aspect of the disclosure, a method of wireless communication at a second encoder is provided. The method may include receiving, from a network entity, an NC handover request. The method may include transmitting, to a UE an SL NC TB based on the NC handover request.

In an aspect of the disclosure, a computer-readable storage medium storing computer executable code at a second encoder is provided, the code when executed by a processor may cause the processor to receive, from a network entity, an NC handover request. The code when executed by a processor may cause the processor to transmit, to a UE an SL NC TB based on the NC handover request.

In an aspect of the disclosure, a method, a computer-readable medium, and an apparatus for wireless communication at a network entity is provided. The apparatus may have a memory and at least one processor coupled to the memory. Based at least in part on information stored in the memory, the at least one processor may be configured to output, to a second encoder, a first NC handover request for the second encoder to communicate an SL TB with a UE. Based at least in part on information stored in the memory, the at least one processor may be configured to output, to the second encoder, a first grant to transmit an SL NC TB using a first SL resource or a second grant to the UE to transmit the SL TB using a second SL resource.

In an aspect of the disclosure, an apparatus for wireless communication at a network entity is provided. The apparatus may include means for outputting, to a second encoder, a first NC handover request for the second encoder to communicate an SL TB with a UE. The apparatus may include means for outputting, to the second encoder, a first grant to transmit an SL NC TB using a first SL resource or a second grant to the UE to transmit the SL TB using a second SL resource.

In an aspect of the disclosure, a method of wireless communication at a network entity is provided. The method may include outputting, to a second encoder, a first NC handover request for the second encoder to communicate an SL TB with a UE. The method may include outputting, to the second encoder, a first grant to transmit an SL NC TB using a first SL resource or a second grant to the UE to transmit the SL TB using a second SL resource.

In an aspect of the disclosure, a computer-readable storage medium storing computer executable code at a network entity is provided, the code when executed by a processor may cause the processor to output, to a second encoder, a first NC handover request for the second encoder to communicate an SL TB with a UE. The code when executed by a processor may cause the processor to output, to the second encoder, a first grant to transmit an SL NC TB using a first SL resource or a second grant to the UE to transmit the SL TB using a second SL resource.

In an aspect of the disclosure, a method, a computer-readable medium, and an apparatus for wireless communication at a first device is provided. The apparatus may have a memory and at least one processor coupled to the memory. Based at least in part on information stored in the memory, the at least one processor may be configured to transmit or receive, a sidelink (SL) transport block (TB) to or from a second device for network coding (NC), respectively, where at least one of the first device or the second device may include a user equipment (UE). Based at least in part on information stored in the memory, the at least one processor may be further configured to transmit, to a network entity, a first message having a first location information that indicates a movement of the UE from a first zone to a second zone.

In an aspect of the disclosure, an apparatus for wireless communication at a first device is provided. The apparatus includes means for transmitting or receiving, an SL TB to or from a second device for NC, respectively, where at least one of the first device or the second device includes a UE. The apparatus includes means for transmitting, to a network entity, a first message having a first location information that indicates a movement of the UE from a first zone to a second zone.

In an aspect of the disclosure, a method of wireless communication at a first device is provided. The method includes transmitting or receiving, an SL TB to or from a second device for NC, respectively, where at least one of the first device and the second device includes a UE. The method further includes transmitting, to a network entity, a first message having a first location information that indicates a movement of the UE from a first zone to a second zone.

In an aspect of the disclosure, a computer-readable storage medium storing computer executable code at a first device is provided, the code when executed by a processor causes the processor to transmit or receive, an SL TB to or from a second device for NC, respectively, where at least one of the first device and the second device includes a UE. The code, when executed by the processor, further causes the processor to transmit, to a network entity, a first message having a first location information that indicates a movement of the UE from a first zone to a second zone.

In an aspect of the disclosure, an apparatus for wireless communication at a network entity is provided. The apparatus may have a memory and at least one processor coupled to the memory. The at least one processor may be configured to obtain, from a first device, a first message including a location of a UE involved in SL communication with a first encoder in a first transmission zone. Based at least in part on information stored in the memory, the at least one processor may be further configured to initialize an NC handover of the UE to a second encoder in a second transmission zone in response to the location indicating a movement of the UE from the first transmission zone to the second transmission zone.

In an aspect of the disclosure, an apparatus for wireless communication at a network entity is provided. The apparatus includes means for obtaining, from a first device, a first message including a location of a UE involved in SL communication with a first encoder in a first transmission zone. The apparatus includes means for initializing an NC handover of the UE to a second encoder in a second transmission zone in response to the location indicating a movement of the UE from the first transmission zone to the second transmission zone.

In an aspect of the disclosure, a method of wireless communication at a network entity is provided. The method includes obtaining, from a first device, a first message including a location of a UE involved in SL communication with a first encoder in a first transmission zone. The method further includes initializing an NC handover of the UE to a second encoder in a second transmission zone in response to the location indicating a movement of the UE from the first transmission zone to the second transmission zone.

In an aspect of the disclosure, a computer-readable storage medium storing computer executable code at a network entity is provided, the code when executed by a processor causes the processor to obtain, from a first device, a first message including a location of a UE involved in SL communication with a first encoder in a first transmission zone. The code when executed by a processor further causes the processor to initialize an NC handover of the UE to a second encoder in a second transmission zone in response to the location indicating a movement of the UE from the first transmission zone to the second transmission zone.

In an aspect of the disclosure, an apparatus for wireless communication at a destination encoder are provided. Network coding for a UE may be handed over to the destination encoder. The apparatus may have a memory and at least one processor coupled to the memory. Based at least in part on information stored in the memory, the at least one processor may be configured to receive, from a network entity, an NC handover request. Based at least in part on information stored in the memory, the at least one processor may be further configured to transmit an SL NC TB with a UE based on the NC handover request.

In an aspect of the disclosure, an apparatus for wireless communication at a destination encoder is provided. Network coding for a UE may be handed over to the destination encoder. The apparatus includes means for receiving, from a network entity, an NC handover request. The apparatus includes means for transmitting an SL NC TB with a UE based on the NC handover request.

In an aspect of the disclosure, a method of wireless communication at a destination encoder is provided. Network coding for a UE may be handed over to the destination encoder. The method includes receiving, from a network entity, an NC handover request. The method further includes transmitting an SL NC TB with a UE based on the NC handover request.

In an aspect of the disclosure, a computer-readable storage medium storing computer executable code at a destination encoder is provided, the code when executed by a processor causes the processor to receive, from a network entity, an NC handover request and to transmit an SL NC TB with a UE based on the NC handover request.

In an aspect of the disclosure, an apparatus for wireless communication at a network entity is provided. The apparatus may have a memory and at least one processor coupled to the memory. Based at least in part on information stored in the memory, the at least one processor may be configured to output, to a destination encoder, a first NC handover request for the destination encoder to transmit or receive an SL NC TB to or from a UE, respectively. Based at least in part on information stored in the memory, the at least one processor may be further configured to output, to one of the destination encoder or the UE, a grant to transmit the SL NC TB using an SL resource. In an aspect of the disclosure, a method, a computer-readable medium, and an apparatus for wireless communication at a network entity are provided. The apparatus may have a memory and at least one processor coupled to the memory. Based at least in part on information stored in the memory, the at least one processor may be configured to output, to a destination encoder, a first NC handover request for the destination encoder to transmit or receive an SL NC TB to or from a UE, respectively. Based at least in part on information stored in the memory, the at least one processor may be further configured to output, to one of the destination encoder or the UE, a grant to transmit the SL NC TB using an SL resource.

In an aspect of the disclosure, an apparatus for wireless communication at a network entity is provided. The apparatus includes means for outputting, to a destination encoder, a first NC handover request for the destination encoder to transmit or receive an SL NC TB to or from a UE, respectively. The apparatus includes means for outputting, to one of the destination encoder or the UE, a grant to transmit the SL NC TB using an SL resource.

In an aspect of the disclosure, a method of wireless communication at a network entity is provided. The method includes outputting, to a destination encoder, a first NC handover request for the destination encoder to transmit or receive an SL NC TB to or from a UE, respectively. The method further includes outputting, to one of the destination encoder or the UE, a grant to transmit the SL NC TB using an SL resource. To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4A is a diagram illustrating examples of sidelink slot structures.

FIG. 4B is a diagram illustrating examples of sidelink slot structures.

FIG. 6C is a diagram illustrating communication links between wireless devices of FIG. 6A.

FIG. 6D is a diagram illustrating communication links between wireless devices of FIG. 6A.

FIG. 7A is a diagram illustrating an example aspect of sidelink communication between devices in a network using NC.

FIG. 7B is a diagram illustrating communication links between wireless devices of FIG. 7A.

FIG. 7E is a diagram illustrating communication links between wireless devices of FIG. 7A.

FIG. 8A is a diagram illustrating an example aspect of an NC handover request, in accordance with various aspects of the present disclosure.

FIG. 8B is a diagram illustrating an example aspect of a confirmation message that may be transmitted in response to an NC handover request, in accordance with various aspects of the present disclosure.

FIG. 8C is a diagram illustrating an example aspect of an SL NC TB, in accordance with various aspects of the present disclosure.

DETAILED DESCRIPTION

Figure 1:
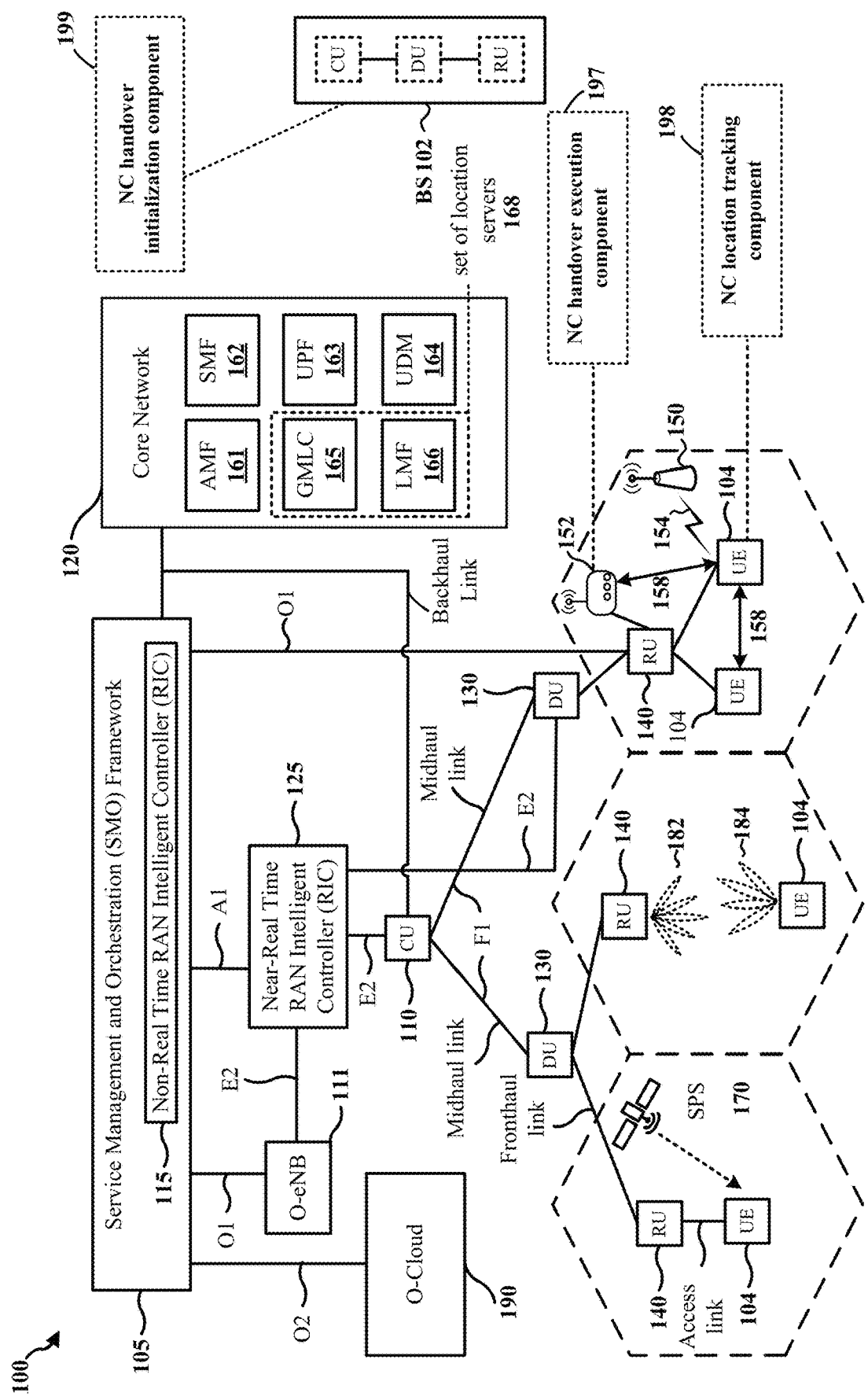
FIG. 1 is a diagram illustrating an example of a wireless communications system and an access network.

Wireless signals that are scheduled to overlap in time, to overlap in frequency, or to be adjacent in frequency, may interfere with one another. Such interference may occur between wireless devices that transmit sidelink (SL) messages scheduled to overlap in time, to overlap in frequency, or to be adjacent in frequency. For example, a first user equipment (UE) broadcasting a first SL message may interfere with the first UE receiving a second SL message broadcast by a second UE when the first and second SL messages are scheduled to overlap in time, to overlap in frequency, or to be adjacent in frequency.

Network coding (NC) is a network technique that uses an encoder that receives two or more messages transmitted by UEs in a network, encodes the two or more messages to generate a joint message, and transmits an NC transmission containing the joint message. A message transmitted by a UE may be referred to as a transport block (TB). The NC transmission may also be referred to as an NC TB. In other words, the encoder may combine packets from TBs that were previously transmitted by two or more UEs in the network to create an NC TB, and may transmit the combined packets as an NC TB after receipt of the TBs transmitted by the UEs. The encoder may also retransmit the original two or more TBs transmitted by the UEs in the network as part of the NC TB. Thus, in one aspect, an encoder that transmits an NC TB after receiving two or more TBs transmitted by UEs in the network may provide a layer of redundancy for the two or more TBs, as the NC TB may contain a joint message of the two or more TBs. The NC TB may also contain the two or more TBs separately from the joint message, adding yet another layer of redundancy.

In one aspect, a wireless device may receive the two or more TBs transmitted by UEs in the network, and may also receive the NC TB transmitted by the encoder. The wireless device may be another UE. If the wireless device had missed receiving, or had failed to successfully decode, one of the two or more TBs transmitted by UEs in the network, the wireless device may use the NC TB to recover the missing TB or may use the NC TB to decode the TB that failed to be decoded. Retransmitting two or more TBs in an NC TB by an encoder that receives the TBs may increase system capacity and improve resource utilization, as UEs may not retransmit TB s to other UEs within a zone if a UE may recover a missing TB using an NC TB. Retransmitting the two or more TBs in an NC TB may improve the latency for retransmission by the original UEs, as UEs may not retransmit TBs to other UEs as often. Retransmitting the two or more TBs in an NC TB may improve reception of TBs by a wireless device receiving the TBs in a zone, as UEs may receive redundant TBs from encoders to recover missing TBs or TBs that failed to decode successfully.

When a first UE moves from a first geographic location (i.e., a first zone) with a first encoder to a second geographic location (i.e., a second zone) with a second encoder, NC may not function properly. For example, the first encoder in the first zone may receive TBs from other UEs in the first zone, but may not receive a first TB from the first UE. The first UE may be moving away from the first encoder in the first zone so quickly that the first encoder may not receive the first TB transmitted by the first UE. This may prevent the first encoder from generating a joint message for the NC transmission that includes the first TB. In another example, the first UE may not receive an NC TB from the first encoder. The first UE may be moving away from the first encoder in the first zone so quickly that the first UE may not receive the NC TB that contains redundant TBs transmitted by the UEs in the first zone. A network entity, such as a base station or a component of a base station, may coordinate with UEs and encoders using NC to perform a handover from a first encoder in a first zone to a second encoder in a second zone when a UE moves from the first zone having the first encoder to the second zone having the second encoder. A request to handover communication with a UE from one encoder to another encoder in an NC system may be referred to as an NC handover request.

In order to initiate a handover of a designated UE from a first encoder to a second encoder, a network entity, such as a base station or a component of a base station, may periodically receive location information associated with the designated UE. In one aspect, the designated UE may transmit location information associated with the designated UE to the network entity. In another aspect, an encoder, such as a road side unit (RSU), may transmit location information associated with its affiliated UEs (e.g., including location information associated with the designated UE) to the network entity. The network entity may use the reported location information to initiate a handover of the designated UE from the first encoder (i.e., a source encoder) to the second encoder (i.e., a destination encoder) when the network entity determines that the designated UE is moving from a first zone with the first encoder to a second zone with the second encoder. In one aspect, the network entity may initiate the handover by providing an NC handover request to the second encoder. The network entity may optionally provide an NC handover request to the first encoder. The second encoder may send a confirmation message to the network entity indicating whether the NC handover request associated with the designated UE is accepted, whether the second encoder has a TB from the designate UE buffered, and/or whether the second encoder successfully received and decoded a TB from the first encoder. In some aspects, the second encoder may send a confirmation message to the first encoder to confirm acceptance of the NC handover request. In some aspects, the first encoder may retransmit a TB to the designated UE after a handover has been initiated. The retransmitted TB may be, for example, a TB previously transmitted by a UE in the first zone or an NC TB previously transmitted by the first encoder that contains a joint message of TBs previously transmitted by UEs in the first zone. The header of the retransmitted TB may indicate the NC handover. The retransmission of the TB may provide the second encoder with an additional opportunity to receive the TB at a later time.

A set of UEs and a first encoder may be configured to communicate TBs with one another using SL in a first zone. Such TBs may be referred to as SL TBs. In other words, each UE of the set of UEs may transmit or receive SL TBs to or from the first encoder, respectively, and vice versa. The first encoder may encode SL TBs received from the set of UEs to generate a joint transmission for an NC TB based on SL TBs received by the first encoder from the set of UEs. The joint transmission may be referred to as an SL NC TB. The joint transmission may include a joint message of two or more SL TBs received by the first encoder and encoded to form a joint message. The joint transmission may include a set of two or more SL TBs received by the first encoder. A network entity may track a location of the set of UEs in the first zone using location information associated with the set of UEs. The location information may be transmitted to the network entity via messages from each UE of the set of UEs or from the first encoder that keeps track of location information associated with the set of UEs. Such messages having the location information may be, for example, uplink transmissions to the network entity.

A message having location information associated with one of the set of UEs may indicate a movement of the UE from the first zone associated with the first encoder to the second zone associated with the second encoder. For example, a first message having a first location information associated with a UE may be transmitted to a network entity after a second message having a second location information associated with the UE. The network entity receiving the first message after the second message may determine that the UE is moving towards the second zone from the first zone, or has moved to the second zone from the first zone, based on the first location information. In response to the first location information indicating a movement of the UE from the first zone to the second zone, the network entity may initialize an NC handover of the UE from the first encoder associated with the first zone to the second encoder associated with the second zone. The network entity may transmit an NC handover request to the second encoder and, optionally, to the first encoder. The second encoder may receive the NC handover request and, in response, may transmit an SL NC TB to the UE or may receive an SL TB from the UE. The network entity may transmit a grant to the second encoder to transmit the SL NC TB to the UE using a SL resource or a grant to the UE to transmit the SL TB to the second encoder using a SL resource. The first encoder may receive the NC handover request and, in response, may retransmit the SL TB or the SL NC TB for receipt by the second encoder.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN), also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units.

Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. Such UEs 104 may also communicate with encoders 152 using a D2D communication link 158. An RU 140 may also be configured to communicate with UEs 104 or encoders 152 using either a D2D communication link 158 or a cellular (Uu) link, such as an uplink or a downlink. The D2D communication link 158 may use the DL/UL wireless wide area network (WWAN) spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

Some examples of SL communication may include vehicle-based communication devices that can communicate from vehicle-to-vehicle (V2V), vehicle-to-infrastructure (V2I) (e.g., from the vehicle-based communication device to encoders such as a Road Side Unit (RSU) or road infrastructure nodes), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, SL communication may also be transmitted and received by other transmitting and receiving devices, such as encoder 152 or base stations 102, etc. Sidelink communication may be exchanged using a PC5 interface, such as described in connection with the example in FIGS. 4A and 4B. Although the following description, including the example slot structure of FIGS. 4A and 4B, may provide examples for SL communication in connection with NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, an SL node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an NC location tracking component 198 configured to communicate an SL TB with a second device for NC. At least one of the first device or the second device may include a UE. At least one of the first device or the second device may include an encoder. Communicating an SL TB with a device may include transmitting the SL TB to the device, or receiving the SL TB from the device. The NC location tracking component 198 may be configured to transmit, to a network entity, a first message including a first location information that indicates a movement of the UE from a first zone to a second zone. While one UE 104 is shown in diagram 100 to have the NC location tracking component 198, each of the UE 104 shown in diagram 100 may have the NC location tracking component 198. The UE 104 may also be configured to transmit or receive an SL NC TB to or from a second device, respectively, such as another UE or an encoder, using NC location tracking component 198. In certain aspects, the base station 102 may have an NC handover initialization component 199 configured to obtain, from a first device, a first message including a first location information associated with a UE in SL communication with a first encoder. The first encoder may be associated with a first zone. The NC handover initialization component 199 may be configured to initialize an NC handover of the UE to a second encoder in a second zone in response to the first location information indicating a movement of the UE from the first zone to the second zone. The NC handover initialization component 199 may be configured to output, to the second encoder, a first NC handover request for the second encoder to communicate an SL TB with a UE. The NC handover initialization component 199 may be configured to output a first grant to the second encoder to transmit an SL NC TB using a first SL resource or a second grant to the UE to transmit the SL TB using a second SL resource. In certain aspects, the encoder 152 may have an NC handover execution component 197 configured to receive, from a network entity, an NC handover request. The NC handover request may be a downlink transmission. The NC handover execution component 197 may be configured to transmit an SL NC TB to a UE based on the NC handover request. Although the following description may be focused on V2X, the concepts described herein may be applicable to other similar areas, such as any devices that communicate with one another using a D2D communication link, such as SL. Although the following description may be focused on 5G NR, the concepts described herein may be applicable to other similar areas, such as LTE, LTE-A, CDMA, GSM, and other wireless technologies.

Figures 2A, 2B, 2C, 2D:
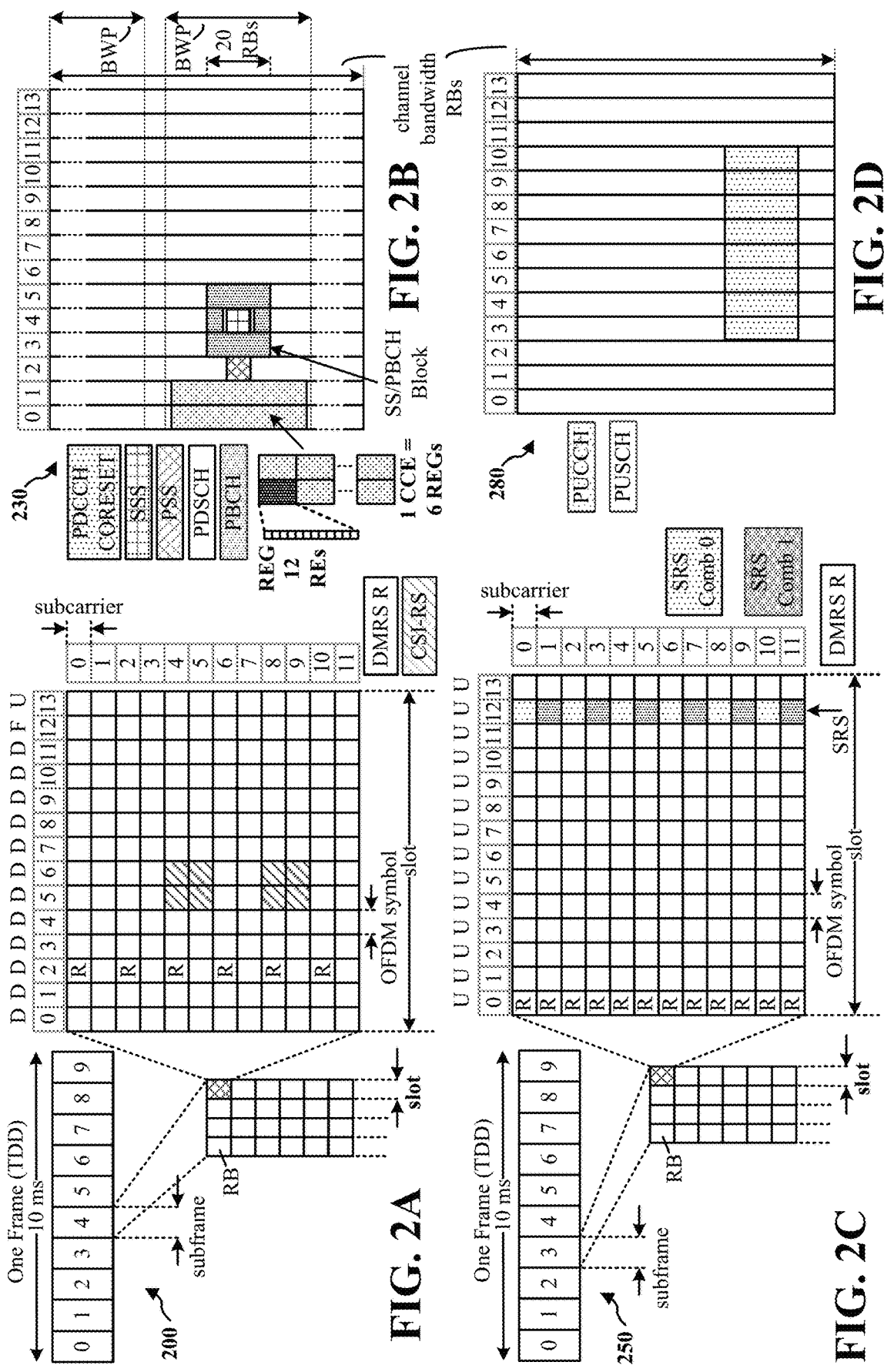
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate an exemplary frame structure, and the aspects of the present disclosure may be applicable to other wireless communication technologies, which may have a different frame structure and/or different channels. The frame structure may be used for communications between a UE and a network entity, or between an encoder and a network entity. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe may be based on the CP and the numerology. The numerology defines the subcarrier spacing (SCS) (see Table 1). The numerology may also define the symbol length/duration, as the symbol length/duration may scale with 1/SCS.

TABLE 1

Numerology, SCS, and CP

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In one aspect, the numerology, SCS, and cyclic prefix of a subframe may be defined by Table 1 above. For normal CP (14 symbols/slot), different numerologies μ0 to 4 may allow for 1, 2, 4, 8, and 16 slots, respectively, per subframe. For extended CP, the numerology 2 may allow for 4 slots per subframe. Accordingly, for normal CP and numerology μ, there may be 14 symbols/slot and $2^\mu$ slots/subframe. The subcarrier spacing may be equal to $2^\mu*15$ kHz, where μ is the numerology 0 to 4. As such, the numerology μ=0 may have a subcarrier spacing of 15 kHz and the numerology μ=4 may have a subcarrier spacing of 240 kHz. The symbol length/duration may be inversely related to the subcarrier spacing. FIGS. 2A-2D provide an example of normal CP with 14 symbols per slot and numerology μ=2 with 4 slots per subframe. The slot duration may be 0.25 ms, the subcarrier spacing may be 60 kHz, and the symbol duration may be approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
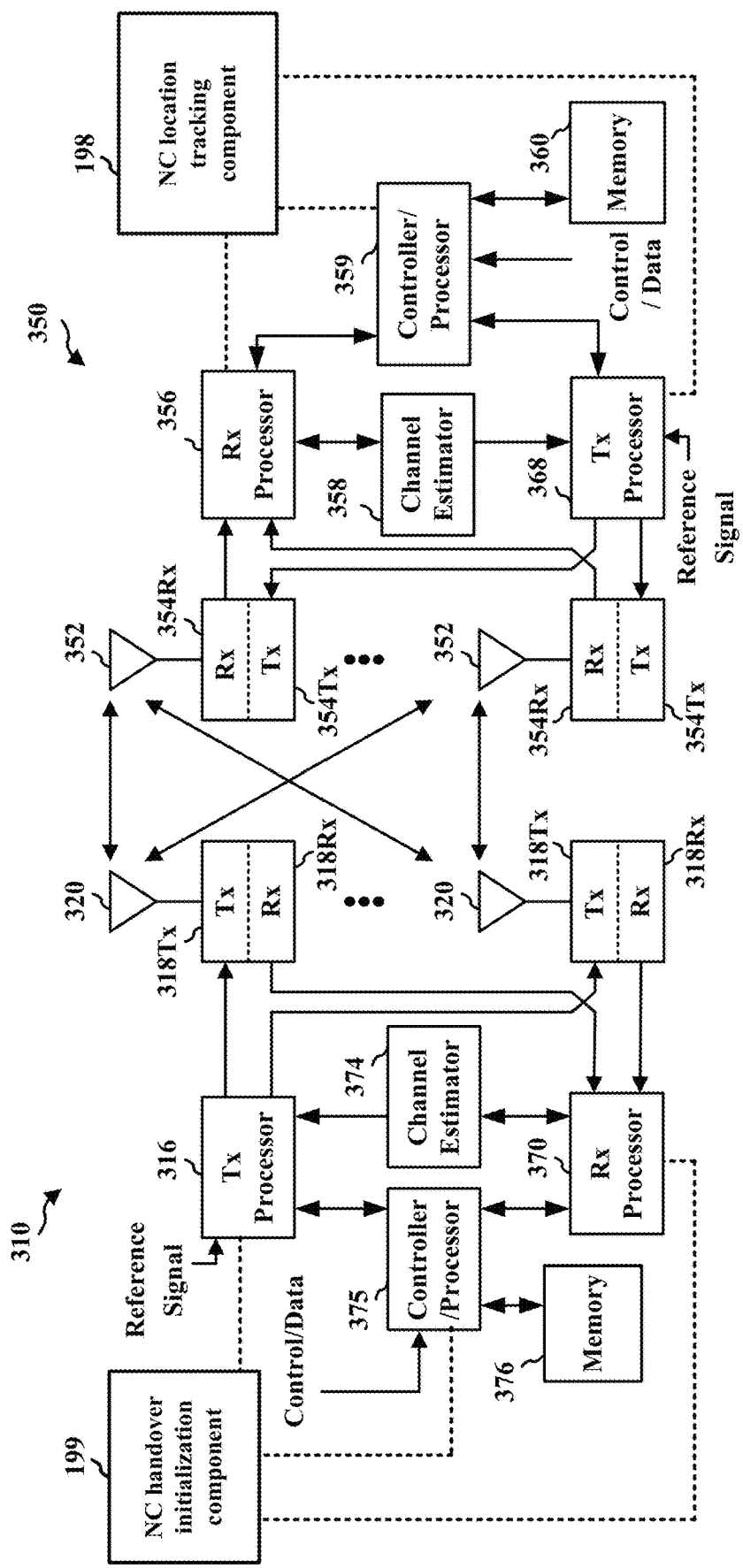
FIG. 3 is a diagram illustrating an example of a base station and a user equipment (UE) in an access network.

FIG. 3 is a block diagram of a base station 310 in communication with a UE 350 in an access network. The base station 310 and the UE 350 may communicate using a Uu link or using a D2D communication link (e.g., SL, V2X). The communication may be based on SL using a PC5 interface. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the NC location tracking component 198 of FIG. 1.

At least one of the Tx processor 316, the Rx processor 370, and the controller/processor 375 may be configured to perform aspects in connection with the NC handover initialization component 199 of FIG. 1.

Figure 24:
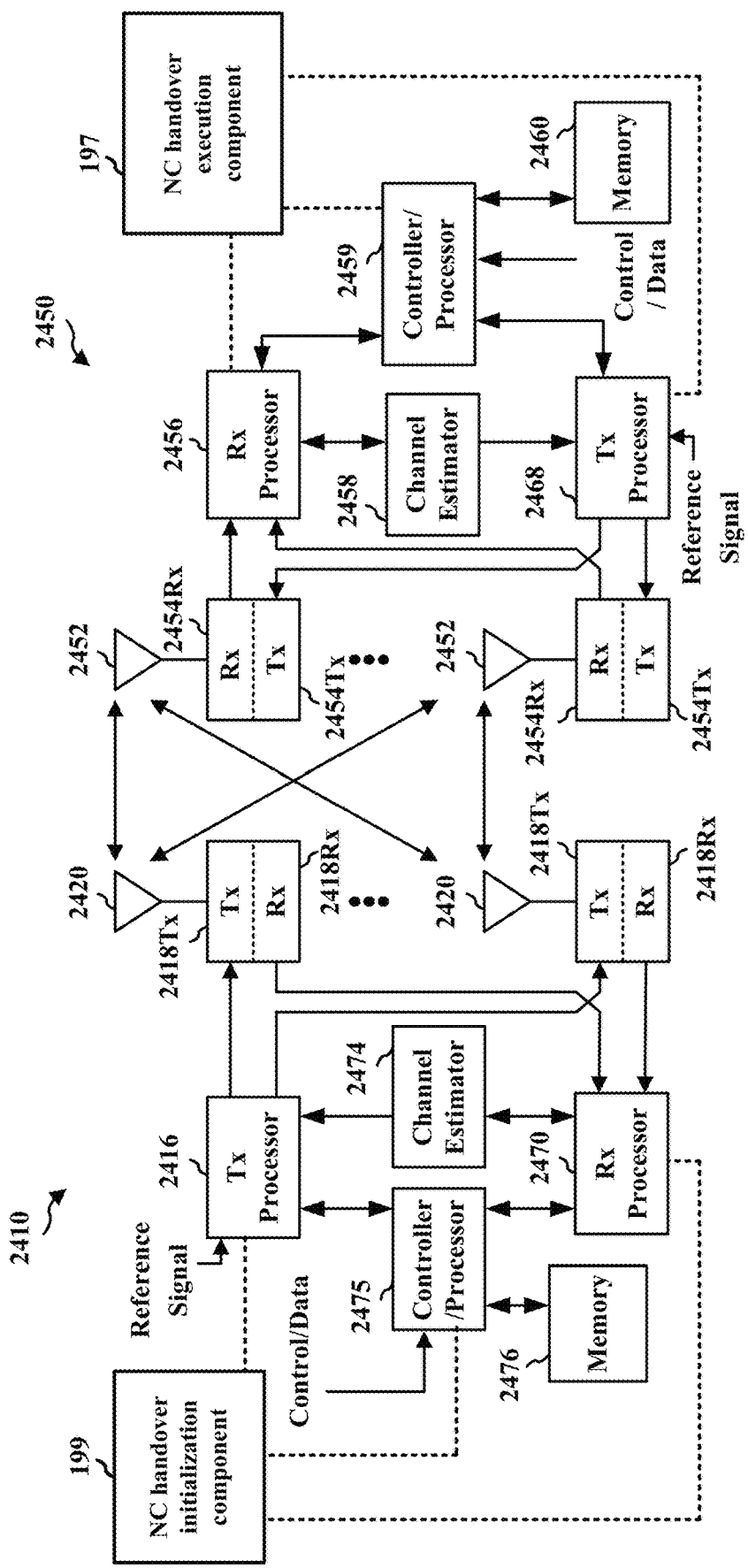
FIG. 24 is a diagram illustrating an example of an encoder and a UE in an access network.

FIG. 24 is a block diagram of a base station 2410 in communication with a encoder 2450 in an access network. The base station 2410 and the encoder 2450 may communicate using a Uu link or using a D2D communication link (e.g., SL, V2X). The communication may be based on SL using a PC5 interface. In the DL, Internet protocol (IP) packets may be provided to a controller/processor 2475. The controller/processor 2475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 2475 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 2416 and the receive (Rx) processor 2470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 2416 handles mapping to signal constellations based on various modulation schemes (e.g., binary phase-shift keying (BPSK), quadrature phase-shift keying (QPSK), M-phase-shift keying (M-PSK), or M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 2474 may be used to determine the coding and modulation scheme, as well as for spatial processing. The channel estimate may be derived from a reference signal and/or channel condition feedback transmitted by the encoder 2450. Each spatial stream may then be provided to a different antenna 2420 via a separate transmitter 2418Tx. Each transmitter 2418Tx may modulate a radio frequency (RF) carrier with a respective spatial stream for transmission.

At the encoder 2450, each receiver 2454Rx receives a signal through its respective antenna 2452. Each receiver 2454Rx recovers information modulated onto an RF carrier and provides the information to the receive (Rx) processor 2456. The Tx processor 2468 and the Rx processor 2456 implement layer 1 functionality associated with various signal processing functions. The Rx processor 2456 may perform spatial processing on the information to recover any spatial streams destined for the encoder 2450. If multiple spatial streams are destined for the encoder 2450, they may be combined by the Rx processor 2456 into a single OFDM symbol stream. The Rx processor 2456 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 2410. These soft decisions may be based on channel estimates computed by the channel estimator 2458. The soft decisions are then decoded and deinterleaved to recover the data and control signals that were originally transmitted by the base station 2410 on the physical channel. The data and control signals are then provided to the controller/processor 2459, which implements layer 24 and layer 2 functionality.

The controller/processor 2459 can be associated with a memory 2460 that stores program codes and data. The memory 2460 may be referred to as a computer-readable medium. In the UL, the controller/processor 2459 provides demultiplexing between transport and logical channels, packet reassembly, deciphering, header decompression, and control signal processing to recover IP packets. The controller/processor 2459 is also responsible for error detection using an ACK and/or NACK protocol to support HARQ operations.

Similar to the functionality described in connection with the DL transmission by the base station 2410, the controller/processor 2459 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 2458 from a reference signal or feedback transmitted by the base station 2410 may be used by the Tx processor 2468 to select the appropriate coding and modulation schemes, and to facilitate spatial processing. The spatial streams generated by the Tx processor 2468 may be provided to different antenna 2452 via separate transmitters 2454Tx. Each transmitter 2454Tx may modulate an RF carrier with a respective spatial stream for transmission.

The UL transmission is processed at the base station 2410 in a manner similar to that described in connection with the receiver function at the encoder 2450. Each receiver 2418Rx receives a signal through its respective antenna 2420. Each receiver 2418Rx recovers information modulated onto an RF carrier and provides the information to a Rx processor 2470.

The controller/processor 2475 can be associated with a memory 2476 that stores program codes and data. The memory 2476 may be referred to as a computer-readable medium. In the UL, the controller/processor 2475 provides demultiplexing between transport and logical channels, packet reassembly, deciphering, header decompression, control signal processing to recover IP packets. The controller/processor 2475 is also responsible for error detection using an ACK and/or NACK protocol to support HARQ operations.

At least one of the Tx processor 2468, the Rx processor 2456, and the controller/processor 2459 may be configured to perform aspects in connection with the NC handover execution component 197 of FIG. 1.

At least one of the Tx processor 2416, the Rx processor 2470, and the controller/processor 2475 may be configured to perform aspects in connection with the NC handover initialization component 199 of FIG. 1.

FIG. 4A includes diagram 400 and FIG. 4B includes diagram 410 illustrating example aspects of slot structures that may be used for SL communication (e.g., between UEs 104, encoder 152, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIGS. 4A and 4B is merely one example, and other SL communication may have a different frame structure and/or different channels for SL communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical SL control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for an SL transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4A illustrates an example in which the PSCCH occupies about 50% of a subchannel, as one example to illustrate the concept of PSCCH occupying a portion of a subchannel. The physical SL shared channel (PSSCH) occupies at least one subchannel. The PSCCH may include a first portion of SL control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIGS. 4A and 4B, some of the REs may include control information in PSCCH and some REs may include demodulation RS (DMRS). At least one symbol may be used for feedback. FIGS. 4A and 4B illustrate examples with two symbols for a physical SL feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or listen-before-talk (LBT) symbols may be different than the example illustrated in FIGS. 4A and 4B. Multiple slots may be aggregated together in some aspects.

Figure 5:
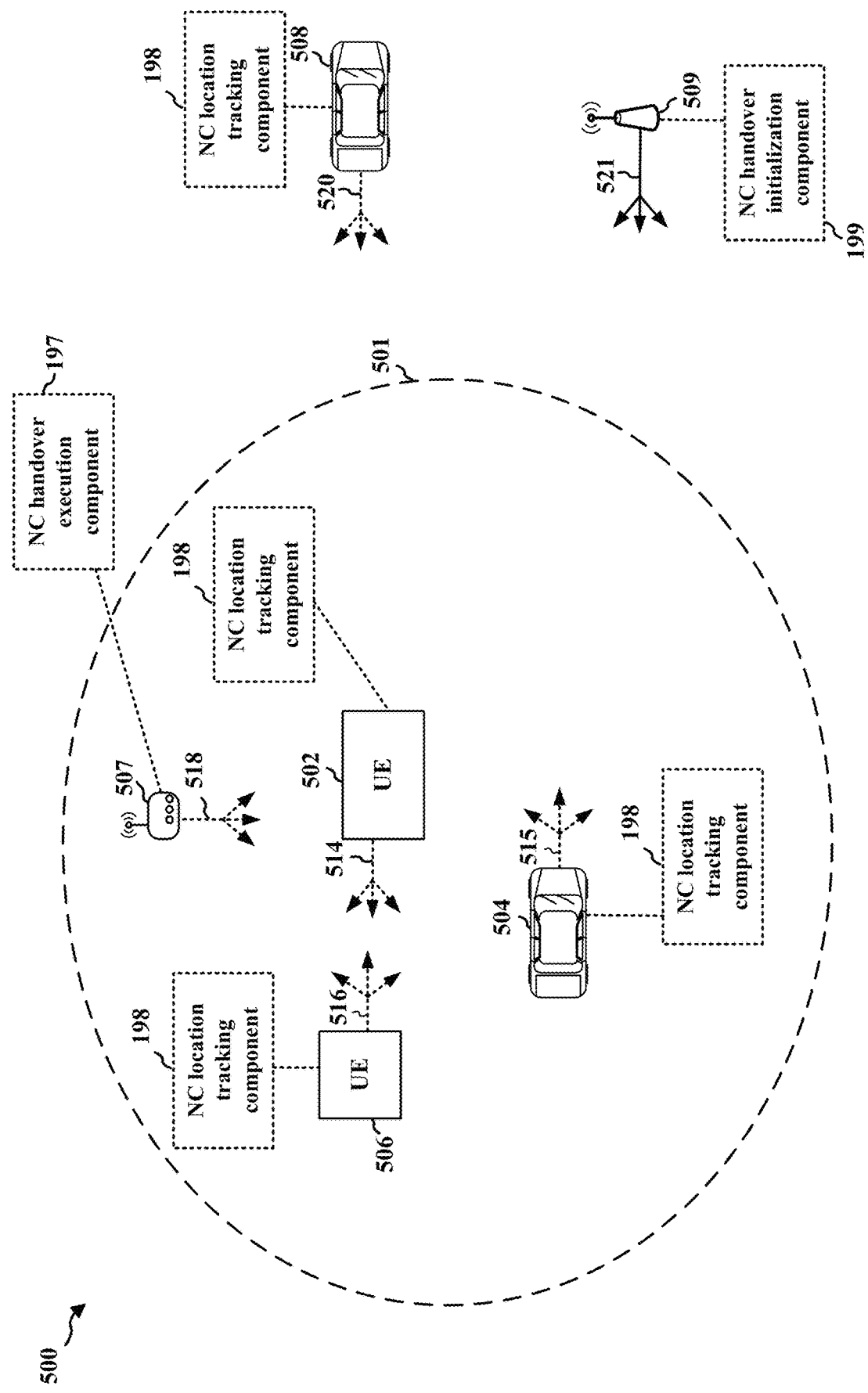
FIG. 5 is a diagram illustrating an example of sidelink communication between devices.

FIG. 5 illustrates an example 500 of SL communication between devices. The communication may be based on a slot structure including aspects described in connection with FIGS. 4A and 4B. For example, the UE 502 may transmit an SL TB 514, e.g., including a control channel (e.g., PSCCH) and/or a corresponding data channel (e.g., PSSCH), that may be received by UE 504, UE 506, or UE 508. A control channel may include information (e.g., SL control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UE 502, UE 504, UE 506, or UE 508 may each have the capability of SL transmission in addition to SL reception. Thus, the UE 504, UE 506, and UE 508 are illustrated as transmitting SL TB s 515, SL TB s 516, and SL TB s 520, respectively. The SL TBs 514, SL TBs 515, SL TBs 516, or SL TBs 520 may be unicast, broadcast or multicast to nearby devices. For example, UE 504 may transmit SL TBs 515 intended for receipt by other UEs within a zone 501 of UE 504, and UE 506 may transmit SL TB 516. UEs outside of the zone 501 may not receive SL TBs transmitted within the zone 501. For example, UE 504 may transmit SL TBs 515 intended for receipt by the UE 502 and the UE 506 within the zone 501, but the UE 508 may not receive the SL TBs 515. An encoder may have a larger transmission and reception range than a UE. For example, the encoder 507 may be able to transmit SL TBs 518 that may be received by each of the UE 502, UE 504, UE 506, and UE 508, whether or not the UEs are in the zone 501. The encoder 507 may communicate TBs with the UE 502, UE 504, UE 506, and UE 508. For example, the encoder 507 may broadcast SL TBs 518 to the UE 502, UE 504, UE 506, and UE 508. The UE 502, UE 504, UE 506, and UE 508 may receive SL TBs 518 from the encoder 507. The UE 502 may transmit SL TBs 514 to the encoder 507, and the encoder 507 may receive SL TBs 514 from the UE 502. The UE 504 may transmit the SL TBs 515 to the encoder 507, and the encoder 507 may receive the SL TBs 515 from the UE 504. The UE 506 may transmit SL TBs 516 to the encoder 507, and the encoder 507 may receive SL TBs 516 from the UE 506. The UE 508 may transmit SL TBs 520 to the encoder 507, and the encoder 507 may receive SL TBs 520 from the UE 508. Transmission or reception of one or more TBs or messages between the encoder 507 and one or more of the UE 502, UE 504, UE 506, or UE 508 may be referred to as communication with one of the UEs. The encoder 507 may be, for example, an RSU or a base station. One or more of the UE 502, UE 504, UE 506, or UE 508 may include a component 198 as described in connection with FIG. 1. The encoder 507 may include a component 197 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a network entity 509 may determine resources for SL communication and may allocate resources to the UE 502, UE 504, UE 506, UE 508, or encoder 507 to use for SL TBs. The network entity 509 may provide the allocated SL resources in one or more downlink TB s 521. A network may provide a grant of an SL resource in at least one of a time or a frequency that a UE or an encoder may use to transmit an SL TB via the network entity 509. For example, the SL resources shown in diagram 400 in FIG. 4A and/or the SL resources shown in diagram 410 in FIG. 4B. In this first mode, a UE receives the allocation of SL resources from a wireless device designated to allocate SL resources, such as network entity 509. In this first mode, an encoder receives the allocation of SL resources from a wireless device designated to allocate SL resources, such as network entity 509. The network entity 509 may be a base station, such as the base station 102 in FIG. 1, another UE designated by a base station to allocate SL resources, such as the UE 104 in FIG. 1, or an RSU designated by a base station to allocate SL resources, such as the encoder 152 in FIG. 1.

In a second resource allocation mode (which may be referred to herein as "Mode 2"), distributed resource allocation may be provided. In Mode 2, each UE may autonomously determine resources to use for SL TBs. In order to coordinate the selection of SL resources by individual UEs, each UE may use a sensing technique to monitor for resource reservations by other SL UEs and may select resources for SL TBs from unreserved resources. Devices communicating based on SL, may determine one or more radio resources in the time and frequency domain that are used by other devices in order to select SL TB resources that avoid collisions with other devices. The SL communication and/or the resource reservation may be periodic or aperiodic, where a UE may reserve resources for TB s in a current slot and up to two future slots (discussed below).

In the second mode (e.g., Mode 2), individual UEs may autonomously select resources for SL communication, e.g., without a central entity such as a base station indicating the resources for the device. A first UE may reserve the selected resources in order to inform other UEs about the resources that the first UE intends to use for SL TB(s).

In some examples, the resource selection for SL communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected SL resource has been reserved by other UE(s) before selecting an SL resource for a data transmission. If the UE determines that the SL resource has not been reserved by other UEs, the UE may use the selected SL resource for transmitting the data, e.g., in a PSSCH transmission. The UE may estimate or determine which radio resources (e.g., SL resources) may be in-use and/or reserved by others by detecting and decoding SL control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for SL transmission by the UE, and the UE may select/reserve resources for an SL transmission from the resources that are unused and therefore form the set of candidate resources. The UE may continuously perform sensing for SCI with resource reservations in order to maintain a set of candidate resources from which the UE may select one or more resources for an SL transmission. Once the UE selects a candidate resource, the UE may transmit SCI indicating its own reservation of the resource for an SL transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on SL.

At least one of the UE 502, UE 504, UE 506, or UE 508, may be configured to perform aspects in connection with the NC location tracking component 198 of FIG. 1.

The network entity 509 may be configured to perform aspects in connection with the NC handover initialization component 199 of FIG. 1.

The encoder 507 may be configured to perform aspects in connection with the NC handover execution component 197 of FIG. 1.

When multiple wireless devices receive transmissions at the same time, the transmissions may interfere with one another. In one aspect, a first transmission sent from a first wireless device to a second wireless device may interfere with a second transmission being sent from a third wireless device to the second wireless device. For example, in FIG. 5, the SL TBs 515 sent from the UE 504 to the UE 502 may interfere with the SL TBs 516 sent from the UE 506 to the UE 502.

Figure 6B:
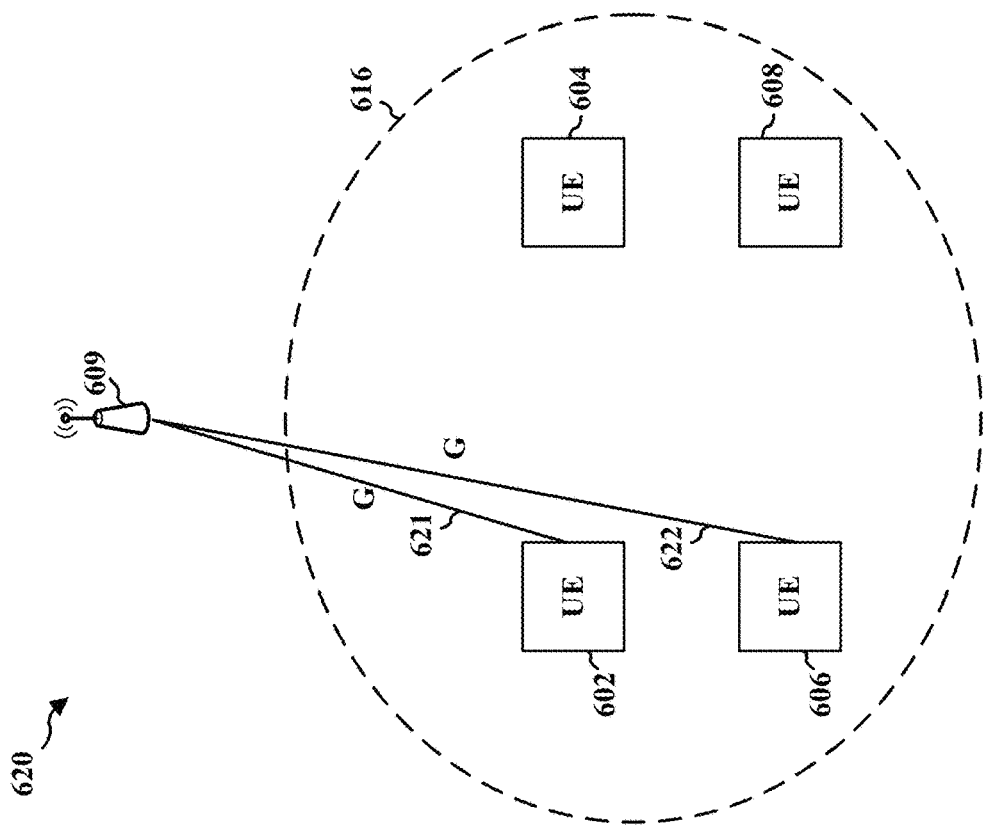
FIG. 6B is a diagram illustrating communication links between wireless devices of FIG. 6A.
Figure 6A:
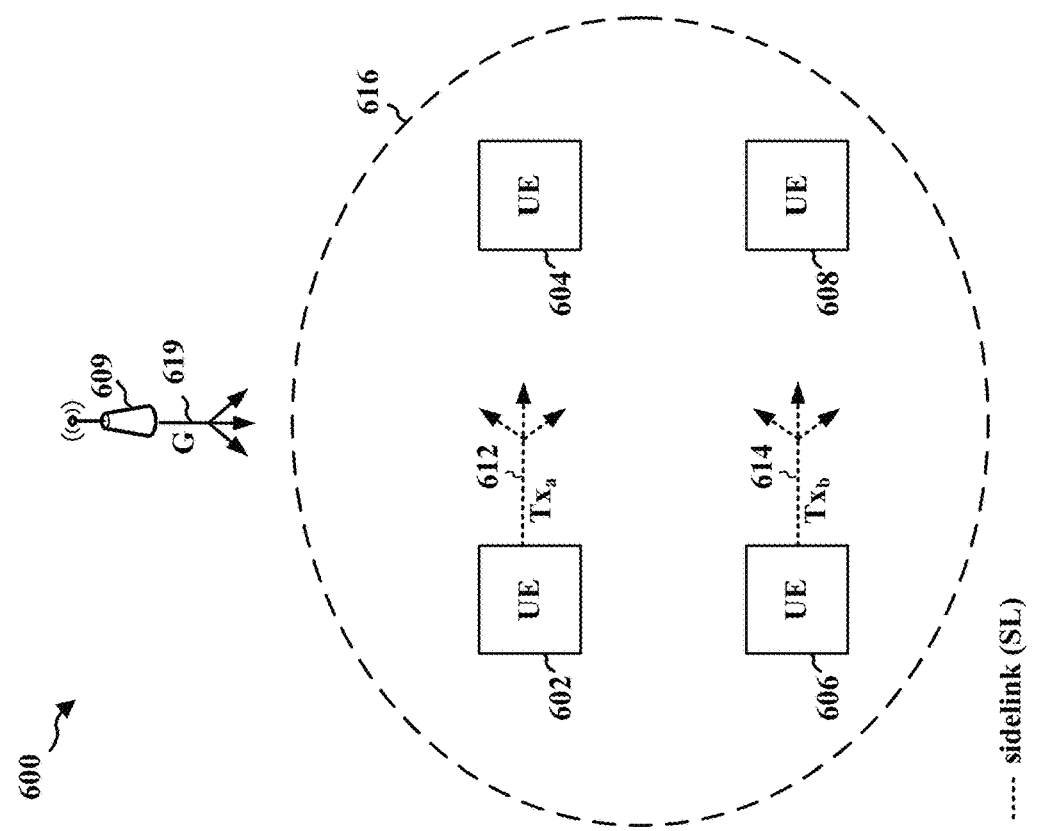
FIG. 6A is a diagram illustrating an example aspect of sidelink communication between devices in a network.

FIG. 6A shows a diagram 600 illustrating a network having a UE 602 configured to transmit SL signals 612 (e.g., SL TB s), a UE 606 configured to transmit SL signals 614 (e.g., SL TB s), and a network entity 609 configured to transmit downlink signals 619 to UEs within zone 616. The downlink signals 619 may contain SL resource grants. FIGS.

6B-6D show communication links between the wireless devices in FIG. 6A, in some aspects. The FIGS. 6B-6D may not show all possible communication links between the wireless devices in FIG. 6A, as a data transmission to a device in zone 616 may be received by one, some, or all of the devices in zone 616.

The network entity 609 may determine resources for SL communication (e.g., under mode 1 SL resource allocation) and may allocate SL resources to the UEs 602 and 606 using the downlink signals 619, which may include SL resource grants. FIG. 6B shows a diagram 620 with a communication link 621 between the UE 602 and the network entity 609 and a communication link 622 between the UE 606 and the network entity 609. The communication link 621 may be a Uu communication link that enables DL transmissions from the network entity 609 to the UE 602 and enables UL transmissions from the UE 602 to the network entity 609. The communication link 622 may be a Uu communication link that enables DL transmissions from the network entity 609 to the UE 606 and enables UL transmissions from the UE 606 to the network entity 609. The UE 602 may request one or more SL resource grants from the network entity 609 using the communication link 621. The network entity 609 may transmit one of the SL resource grants as the downlink signals 619 to the UE 602 using the communication link 621 (i.e., G) to grant SL resources to the UE 602 that the UE 602 may use for SL communication. The SL resource grant may be used by the UE 602 to transmit SL transmissions, such as the SL signals 612 in FIG. 6A. The UE 606 may request one or more SL resource grants from the network entity 609 using the communication link 622. The network entity 609 may transmit one of the SL resource grants as the downlink signals 619 to the UE 606 using the communication link 622 (i.e., G) to grant SL resources to the UE 606 that the UE 606 may use for SL communication. The SL resource grant may be used by the UE 606 to transmit SL transmissions, such as the SL signals 614 in FIG. 6A.

The UEs may transmit SL TBs to one another using the SL resource grants obtained from the network entity 609. FIG. 6C shows a diagram 640 with a communication link 641 between the UE 602 and the UE 604 and a communication link 642 between the UE 602 and the UE 608. The communication link 641 may be an SL communication link that enables SL transmissions from the UE 602 to the UE 604 and enables SL transmissions from the UE 604 to the UE 602. For example, the communication link 641 may enable the transmissions of the SL signals 612 from the UE 602 to be received by the UE 604. The communication link 642 may be an SL communication link that enables SL transmissions from the UE 602 to the UE 608 and enables SL transmissions from the UE 608 to the UE 602. For example, the communication link 642 may enable the transmissions of the SL signals 612 from the UE 602 to be received by the UE 608. The UE 602 may broadcast, unicast, or groupcast one or more of the SL signals 612 in FIG. 6A using the communication links 641 and 642 in FIG. 6C.

FIG. 6D shows a diagram 660 with a communication link 661 between the UE 606 and the UE 604 and a communication link 662 between the UE 606 and the UE 608. The communication link 661 may be an SL communication link that enables SL transmissions from the UE 606 to the UE 604 and enables SL transmissions from the UE 604 to the UE 606. For example, the communication link 661 may enable the transmissions of the SL signals 614 from the UE 606 to be received by the UE 604. The communication link 662 may be an SL communication link that enables SL transmissions from the UE 606 to the UE 608 and enables SL transmissions from the UE 608 to the UE 606. For example, the communication link 662 may enable the transmissions of the SL signals 614 from the UE 606 to be received by the UE 608. The UE 606 may broadcast, unicast, or groupcast one or more of the SL signals 614 in FIG. 6A using the communication links 661 and 662 in FIG. 6C.

If the transmissions of the SL signals 612 and the SL signals 614 have overlapping resources (e.g., overlapping frequency and overlapping time), one or more receiving devices may fail at decoding one or more TBs of the SL signals 612 and the SL signals 614. The UE 602 may groupcast or unicast one of the SL signals 612, such as $T_{xa}$, to the UE 604 and UE 608 in zone 616 using SL resources allocated by the network entity 609 via downlink signals 619. The UE 606 may also groupcast or unicast one of the SL signals 614, such as $T_{xb}$, to the UE 604 and UE 608 in zone 616 using SL resources allocated by the network entity 609 via downlink signals 619 during an overlapping time period using a frequency that may interfere with the SL signals 612. Because the UE 602 and the UE 606 may transmit SL TBs using overlapping SL resources, the UE 604 and the UE 608 may miss receiving (i.e., successfully decoding) one of the SL signals 612 and/or one of the SL signals 614.

In one aspect, the UE 602 may groupcast one of the SL signals 612 in FIG. 6A as $T_{xa}$ to the UE 604 using the communication link 641 in FIG. 6C and to the UE 608 using the communication link 642 in FIG. 6C. At the same time, the UE 606 may groupcast one of the SL signals 614 in FIG. 6A as $T_{xb}$ to the UE 604 using the communication link 661 in FIG. 6D and to the UE 608 using the communication link 642 in FIG. 6D. The broadcast of one of the SL signals 612 and/or one of the SL signals 614 may be using V2X or another type of SL communication. Since the broadcast of the $T_{xa}$ and the $T_{xb}$ may have overlapping SL resources (overlapping time domain and overlapping frequency domain), reception of the $T_{xa}$ or the $T_{xb}$ by the UE 604 may fail, and/or reception of the $T_{xa}$ or the $T_{xb}$ by the UE 604 may fail. Alternatively, the UE 604 and/or the UE 608 may fail to decode $T_{xa}$, and/or may fail to decode $T_{xb}$ due to the interference. The UE 602 may attempt to use error correction by repeatedly groupcasting or unicasting the $T_{xa}$ (an SL TB of the SL signals 612) until the UE 604 and the UE 608 acknowledge receipt of the $T_{xa}$. Similarly, the UE 606 may attempt to use error correction by repeatedly groupcasting or unicasting the $T_{xb}$ (an SL TB of the SL signals 614) until the UE 604 and the UE 608 acknowledge receipt of the $T_{xb}$. Such retransmissions may waste resources, particularly if the zone 616 has many other UEs (not shown) performing such transmissions.

Figure 7D:
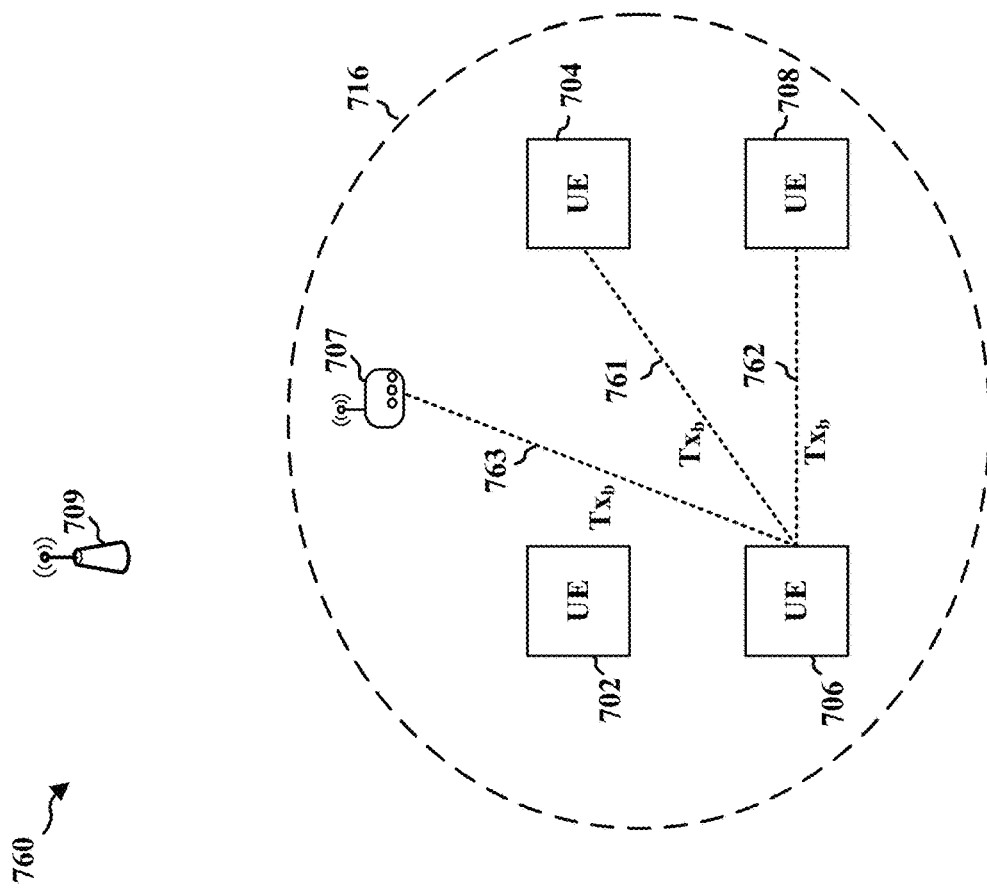
FIG. 7D is a diagram illustrating communication links between wireless devices of FIG. 7A.

FIG. 7A shows a diagram 700 illustrating a network similar to the network of FIG. 6A. The UEs 702, 704, 706, and 708 in FIG. 7A may be similar to the UEs 602, 604, 606, and 608 in FIGS. 6A-6D. The network entity 709 in FIG. 7A may be similar to the network entity 609 in FIGS. 6A-6D. The network in FIG. 7A may have an encoder 707 configured to encode TBs using NC to increase system capacity and improve resource utilization. FIGS. 7B-7E show communication links between the wireless devices in FIG. 7A, in some aspects. The FIGS. 7B-7E may not show all possible communication links between the wireless devices in FIG. 7A, as a data transmission to a device in zone 716 may be received by one, some, or all of the devices in zone 716.

Similar to the network entity 609 in FIG. 6A, the network entity 709 in FIG. 7A may also determine resources for SL communication and may allocate resources to one or more of the UEs 702, 704, 706, and 708 using the downlink signals 719. The downlink signals 719 may include SL resource grants. FIG. 7B shows a diagram 720 with a communication link 721 between the UE 702 and the network entity 709, a communication link 722 between the UE 706 and the network entity 709, and a communication link 723 between the encoder 707 and the network entity 709. The communication link 721 may be a Uu communication link that enables DL transmissions from the network entity 709 to the UE 702 and enables UL transmissions from the UE 702 to the network entity 709. The communication link 722 may be a Uu communication link that enables DL transmissions from the network entity 709 to the UE 706 and enables UL transmissions from the UE 706 to the network entity 709. The communication link 723 may be a Uu communication link that enables DL transmissions from the network entity 709 to the encoder 707 and enables UL transmissions from the encoder 707 to the network entity 709. The UE 702 may request one or more SL resource grants from the network entity 709 using the communication link 721. The network entity 709 may transmit one or more SL resource grants as the downlink signals 719 to the UE 702 using the communication link 721 (i.e., G) to grant SL resources to the UE 702 that the UE 702 may use for SL communication. One or more SL resource grants may be used by the UE 702 to transmit SL transmissions, such as the SL signals 712 (e.g., SL TBs) in FIG. 7A. The UE 706 may request one or more SL resource grants from the network entity 709 using the communication link 722. The network entity 709 may transmit one or more of the SL resource grants as the downlink signals 719 to the UE 706 using the communication link 722 (i.e., G) to grant SL resources to the UE 706 that the UE 706 may use for SL communication. The one or more SL resource grants may be used by the UE 706 to transmit SL transmissions, such as the SL signals 714 (e.g., SL TBs) in FIG. 7A. The encoder 707 may request one or more SL resource grants from the network entity 709 using the communication link 723. The network entity 709 may transmit one or more of the SL resource grants as the downlink signals 719 to the encoder 707 using the communication link 723 (i.e., G) to grant SL resources to the encoder 707 that the encoder 707 may use for SL communication. The SL resource grant may be used by the encoder 707 to transmit SL transmissions, such as the SL signals 717 (e.g., SL TBs or SL NC TBs) in FIG. 7A.

Figure 7C:
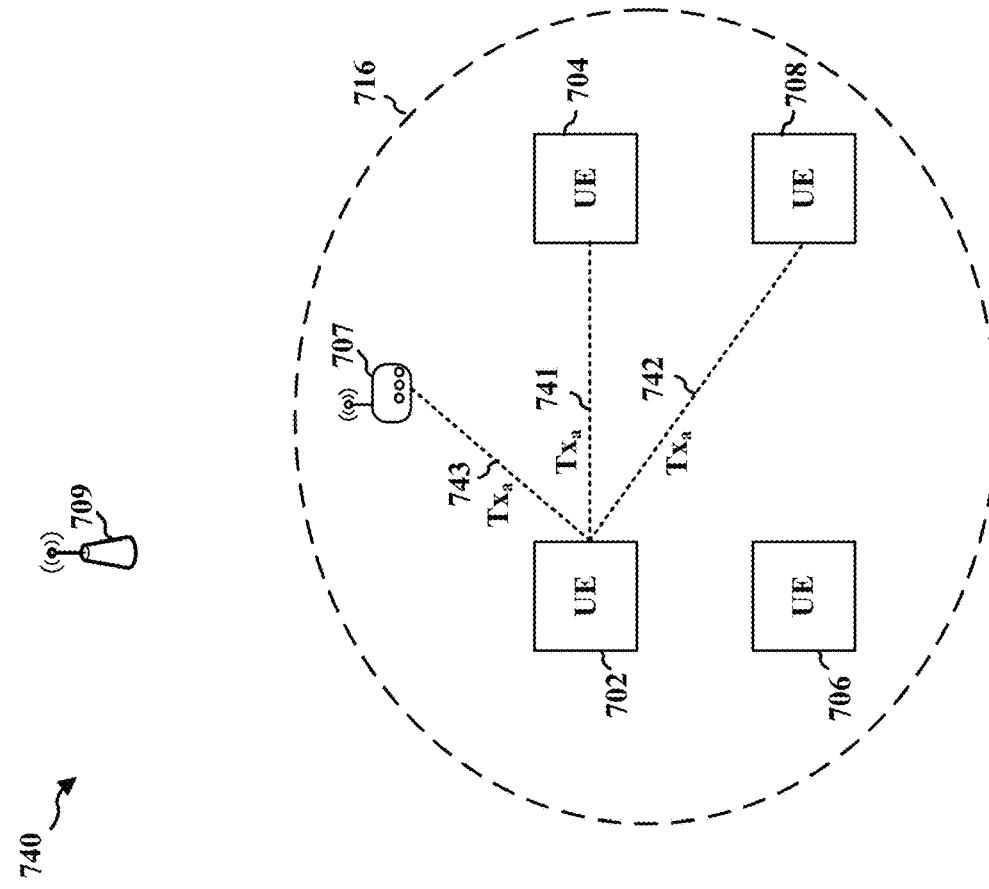
FIG. 7C is a diagram illustrating communication links between wireless devices of FIG. 7A.

Similar to the UEs in FIG. 6A, the UEs in FIG. 7B may transmit SL TB s to one another using the SL resource grants obtained from the network entity 709. FIG. 7C shows a diagram 740 with a communication link 741 between the UE 702 and the UE 704, a communication link 742 between the UE 702 and the UE 708, and a communication link 743 between the UE 702 and the encoder 707. The communication link 741 may be an SL communication link that enables SL transmissions from the UE 702 to the UE 704 and enables SL transmissions from the UE 704 to the UE 702. The communication link 742 may be an SL communication link that enables SL transmissions from the UE 702 to the UE 708 and enables SL transmissions from the UE 708 to the UE 702. The communication link 743 may be an SL communication link that enables SL transmissions from the UE 702 to the encoder 707 and enables SL transmissions from the encoder 707 to the UE 702. The UE 702 may broadcast, unicast, or groupcast one or more of the SL signals 712 in FIG. 7A using the communication links 741, 742, and 743 in FIG. 7C.

FIG. 7D shows a diagram 760 with a communication link 761 between the UE 706 and the UE 704, a communication link 762 between the UE 706 and the UE 708, and a communication link 763 between the UE 706 and the encoder 707. The communication link 761 may be an SL communication link that enables SL transmissions from the UE 706 to the UE 704 and enables SL transmissions from the UE 704 to the UE 706. The communication link 762 may be an SL communication link that enables SL transmissions from the UE 706 to the UE 708 and enables SL transmissions from the UE 708 to the UE 706. The communication link 763 may be an SL communication link that enables SL transmissions from the UE 706 to the encoder 707 and enables SL transmissions from the encoder 707 to the UE 706. The UE 706 may broadcast, unicast, or groupcast one or more of the SL signals 714 in FIG. 7A using the communication links 761, 762, 763 in FIG. 7D.

Similar to the transmissions of the SL signals 612 and the SL signals 614 in FIG. 6A, the transmissions of the SL signals 712 and the SL signals 714 in FIG. 7A may have overlapping resources in a time domain or a frequency domain, or may have resources in a frequency domain that are close enough to one another to interfere with one another. Transmitting the SL signals 712 and the SL signals 714 using overlapping, or interfering, resources may cause one or more receiving devices to miss receiving one or more TBs of the SL signals 712 and the SL signals 714, or to fail at decoding one or more TBs of the SL signals 712 and the SL signals 714. The UE 702 may groupcast or unicast one of the SL signals 712, such as $T_{xa}$, to the UE 704, UE 708, and the encoder 707 in zone 716 using SL resources allocated by the network entity 709. The UE 706 may also groupcast or unicast one of the SL signals 714, such as $T_{xb}$, to the UE 704, UE 708, and the encoder 707 in zone 716 using SL resources allocated by the network entity 709 during an overlapping time period. Because the UE 702 and the UE 706 may transmit SL TBs using overlapping, or interfering, SL resources, the UE 704 and the UE 708 may miss receiving, or successfully decoding, one of the SL signals 712 and/or one of the SL signals 714, such as the $T_{xa}$ of the SL signals 712 or the $T_{xb}$ of the SL signals 714.

The encoder 707 may be a device, such as an RSU or a UE, configured to encode TB s in accordance with an NC algorithm, as explained in more detail below, to generate an NC transmission (i.e., an SL NC TB or an NC TB) that may be transmitted to the UE 704 and the UE 708. FIG. 7E shows a diagram 780 with a communication link 781 between the encoder 707 and the UE 704 and a communication link 782 between the encoder 707 and the UE 708. The communication link 781 may be an SL communication link that enables SL transmissions from the encoder 707 to the UE 704 and enables SL transmissions from the UE 704 to the encoder 707. The communication link 782 may be an SL communication link that enables SL transmissions from the encoder 707 to the UE 708 and enables SL transmissions from the encoder 707 to the UE 706. The encoder 707 may broadcast, unicast, or groupcast one or more of the SL signals 717 in FIG. 7A using the communication links 781 and 782 in FIG. 7E.

As explained in more detail below the NC TB may be generated using an NC algorithm. An NC algorithm may use single parity check codes to correct one erasure. For example, an additional linearly independent constraint may be added to a linear system over a Galois field by the encoder to recover an erasure. An NC algorithm may be described as follows. An input to the encoder may be a set of messages, such as a vector [a, b] where a is a first message and b is a second message or a vector [a, b, c] where a is a first message, b is a second message, and c is a third message. An output to the encoder may be a vector of the same messages in addition to a combination of the same messages (i.e., a joint message of the messages), for example [a, b, a ⊕ b], or [a, b, c, a ⊕ b ⊕ c]. The combination of the messages may be generated in any suitable manner, for example via an AND (a+b), an OR (a or b), or an XOR (a ⊕ b) function. The output [a, b, c, a ⊕ b ⊕ c] of the encoder may be viewed as a linear system over a Galois field with three variables and four linearly independent constraints, such as:

$$\begin{bmatrix} 1 & 0 & 0 \\ 0 & 1 & 0 \\ 0 & 0 & 1 \\ 1 & 1 & 1 \end{bmatrix} \times [a \ b \ c]^T = [a \ b \ c \ a \oplus b \oplus c]^T$$

Any three of the four linearly independent constraints [a, b, c, a ⊕ b ⊕ c] may be used to determine one of the three variables [a, b, c]. For example, if a receiving device successfully decodes a and b and does not successfully decode c, the receiving device may use a, b, and a ⊕ b ⊕ c to recover the missing c. In another aspect, if a receiving device successfully decodes a and c and does not successfully decode b, the receiving device may use a, c, and a ⊕ b ⊕ c to recover the missing b.

With respect to the diagram 700 in FIG. 7A, an input vector to the encoder 707 may be the TB $T_{xa}$ and the TB $T_{xb}$ (i.e., the input vector [$T_{xa}$, $T_{xb}$]), and the encoder 707 may encode those inputs to generate an NC TB f($T_{xa}$, $T_{xb}$). In one aspect, f($T_{xa}$, $T_{xb}$) may be defined as the vector [$T_{xa}$, $T_{xb}$, $T_{xa}$ ⊕ $T_{xb}$], with the $T_{xa}$ ⊕ $T_{xb}$ value being the additional linearly dependent constraint added to the system. In another aspect, f($T_{xa}$, $T_{xb}$) may be defined as the vector [$T_{xa}$ ⊕ $T_{xb}$] without the TB $T_{xa}$ and the TB $T_{xb}$. The encoder 707 may output the vector [$T_{xa}$, $T_{xb}$, $T_{xa}$ ⊕ $T_{xb}$] to a receiving device, such as the UE 704 or the UE 708.

If the UE 704 or the UE 708 is missing a TB, such as the TB $T_{xa}$ and the TB $T_{xb}$, the UE may reconstruct the missing message using the output vector of the encoder 707. For example, if the received vector is [$T_{xa}$, ?, $T_{xa}$ ⊕ $T_{xb}$], the erased element $T_{xb}$ may be recovered by summing the other values $T_{xa}$ ⊕ ($T_{xa}$ ⊕ $T_{xb}$)=$T_{xb}$. In other words, the NC of the diagram 700 in FIG. 7A may be viewed as an overdetermined linear system (over a Galois field) with two variables and three linearly independent constraints where any two constraints (one erasure) is sufficient to determine the value of a missing variable.

The encoder 707 may transmit an NC TB f($T_{xa}$, $T_{xb}$) as one of the SL signals 717 in FIG. 7A. The encoder 707 may transmit the NC TB f($T_{xa}$, $T_{xb}$) to the UE 704 or the UE 708 as shown in FIG. 7E, allowing the receiving device to retrieve one of the TB $T_{xa}$ of the SL signals 712 or the TB $T_{xb}$ of the SL signals 714. In one aspect, the NC TB f($T_{xa}$, $T_{xb}$) may be the output vector [$T_{xa}$, $T_{xb}$, $T_{xa}$ ⊕ $T_{xb}$] transmitted as one of the SL signals 717. In one aspect, the encoder 707 may transmit the added constraint (e.g., $T_{xa}$ ⊕ $T_{xb}$) as one of the SL signals 717 without retransmitting the SL TBs $T_{xa}$ and $T_{xb}$, since the value $T_{xa}$ was transmitted by the UE 702 as shown in FIG. 7C, and $T_{xb}$ was transmitted by the UE 706 as shown in FIG. 7D. Either of the UE 704 or the UE 708 may then be able to retrieve a missing value so long as the UE knows two out of the three constraints [$T_{xa}$, $T_{xb}$, $T_{xa}$ ⊕ $T_{xb}$]. While two SL TB variables are shown in FIG. 7A ($T_{xa}$ of SL signals 712 and $T_{xb}$ of SL signals 714), any number of SL TBs may be used for an NC system in a similar manner. For example, in a system with three simultaneously transmitting UEs, where a first UE transmits SL TB a, a second UE transmits SL TB b, and a third UE transmits SL TB c, the input [a, b, c] may be encoded to [a, b, c, a ⊕ b ⊕ c]. A received vector [a, ?, c, a ⊕ b ⊕ c] may be used to recover the erased SL TB b by summing the others a ⊕ c ⊕ (a ⊕ b ⊕ c)=b.

The NC may be centralized, meaning that designated devices, such as an encoder for a zone, may perform the NC for devices in the zone, and non-designated devices may not perform the NC for devices in the zone. For example, the encoder 707 may be an encoder designated for the zone 716 such that the encoder 707 performs the NC for the UEs 702, 704, 706, and 708 in the zone 716. As explained above, the encoder 707 may provide an NC TB that combines packets (e.g., the $T_{xa}$ of the SL signals 712 and the $T_{xb}$ of the SL signals 714) that were previously transmitted by the UE 702 and 706 to receiving devices in the zone 716, such as the UE 704 and the UE 708. For example, an NC TB of the SL signals 717 may include a combination of one of the SL signals 712 and one of the SL signals 714. The combination of one of the SL signals 712 and one of the SL signals 714 is shown in the diagram 700 in FIG. 7A as the function f($T_{xa}$, $T_{xb}$). In one aspect, the encoder 707 may apply an NC algorithm to one or more of the SL signals 712 and one or more of the SL signals 714 by performing an XOR on $T_{xa}$ and $T_{xb}$ to generate $T_{xa}$ ⊕ $T_{xb}$. In other words, the function f($T_{xa}$, $T_{xb}$) may be an XOR of the inputs $T_{xa}$ and $T_{xb}$. Having an encoder 707 configured to retransmit the SL signals 712 and the SL signals 714 as the SL signals 717 may improve the latency for retransmission, as the SL messages from the UE 702 and the UE 706 are retransmitted by the encoder 707 as an NC TB. As well, the NC system shown in FIG. 7A may improve reception. As an example of how the joint transmission of the NC TB may improve reception, if the UE 704 received one of the SL signals 714 as $T_{xb}$ from the UE 706, but did not receive one of the SL signals 712 as $T_{xa}$ from the UE 702, the UE 704 may receive one of the SL signals 717 as f($T_{xa}$, $T_{xb}$) from the encoder 707 that contains a joint message of $T_{xb}$ and $T_{xa}$. The UE 704 may use the previously received $T_{xb}$ with the f($T_{xa}$, $T_{xb}$) to determine the missing $T_{xa}$. Since the f($T_{xa}$, $T_{xb}$) may be an XOR combination of the $T_{xa}$ and the $T_{xb}$ (e.g., $T_{xa}$ ⊕ $T_{xb}$), the missing $T_{xa}$ may be derived by reversing the XOR combination of the $T_{xb}$ on $T_{xa}$ ⊕ $T_{xb}$. The network entity 709 may be configured to designate one or more devices to perform the NC within the zone 716, such as the encoder 707 within the zone 716.

The NC system increases system capacity and improves resource utilization by reducing the number of retransmissions in the system while maintaining performance. This may enable an increase in the number of UEs or in traffic per UE, as more UEs may be able to transmit messages to one another within a zone with the increased reliability that the encoder provides. After the initial transmissions (e.g., one of SL signals 712 by UE 702 and one of SL signals 714 by UE 706), individual retransmissions by the original transmitter may be replaced, or supplemented, by one of the NC TB s (e.g., SL signals 717) transmitted by an encoder (e.g., the encoder 707) using NC.

Each of the transmissions of SL signals 712, SL signals 714, and SL signals 717 may take place using SL resources allocated by the network entity 709 using SL resource grants transmitted using the downlink signals 719. Communications with the network entity 709 (e.g., downlink signals 719) may take place using Uu resources. In some aspects, communications with the network entity 709 may take place using other resources, such as SL resources using SL signals or other signals. The encoder 707 may be an element of another wireless device, such as an element of the network entity 709 or an element of the UE 702. Thus, in one aspect, the SL signals 717 may include both the SL signals 712 and the SL signals 714.

Figure 9:
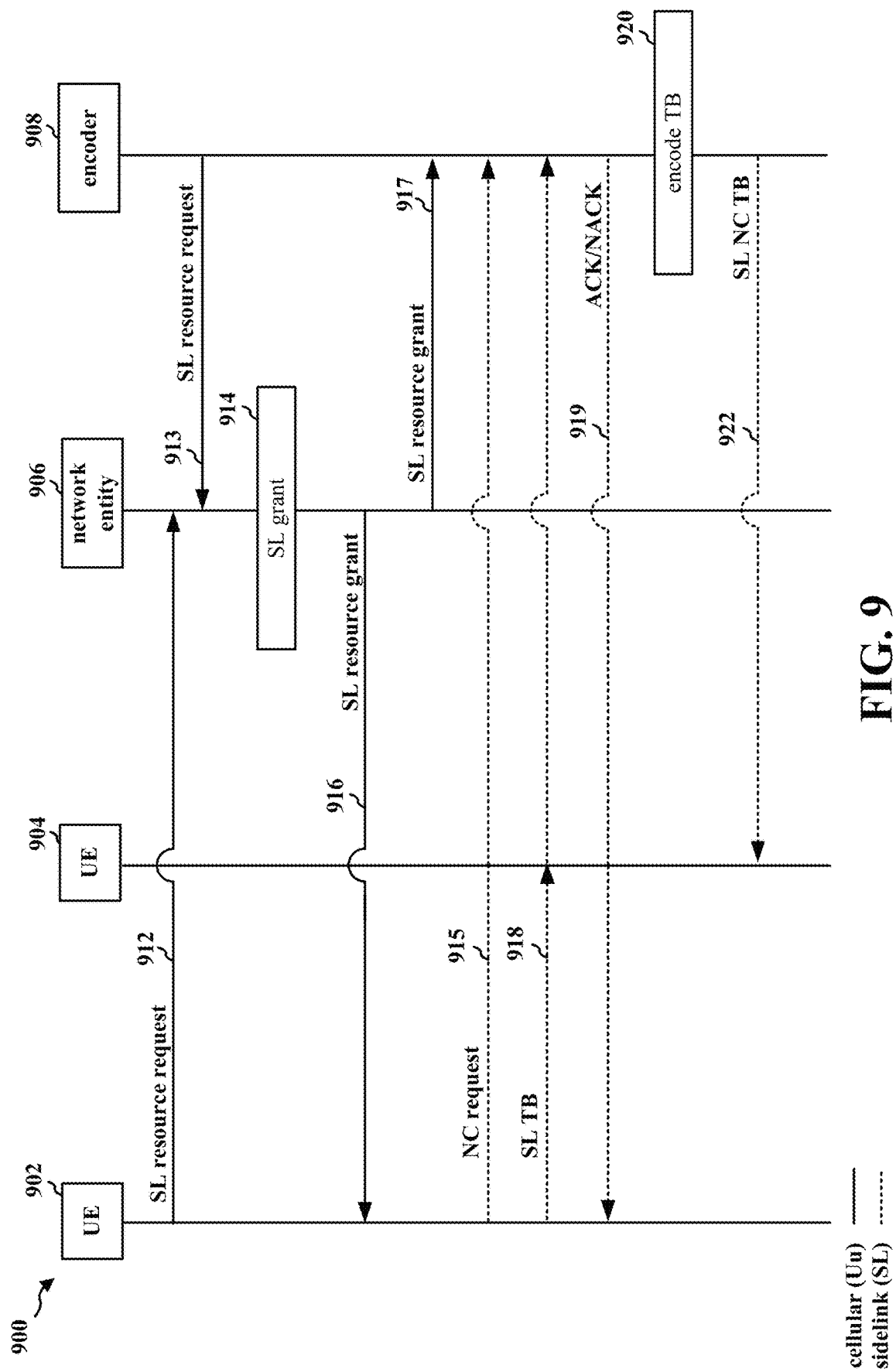
FIG. 9 is a connection flow diagram illustrating an example aspect of sidelink communication between devices using NC.

FIG. 9 shows a connection flow diagram 900 illustrating an example of sidelink communication between UE 902, UE 904, and encoder 908 with a network entity 906 that coordinates NC between the UE 902, the UE 904, and the encoder 908. The UE 902, UE 904, network entity 906, and encoder 908 may be similar to the UE 702, the UE 704, the network entity 709, and the encoder 707 in FIG. 7A, respectively. The UE 902 may transmit an SL resource request 912 to the network entity 906 and the encoder 908 may transmit an SL resource request 913 to the network entity 906. At 914, in response to receiving an SL resource request, the network entity 906 may provide a grant of an SL resource to the UE 902 and the encoder 908. In one aspect, the network entity 906 may provide a grant of an SL resource to a device without first receiving an SL resource request, for example by determining that a wireless device is configured to transmit a message using an SL resource. The network entity 906 may transmit an SL resource grant 916 to the UE 902 to allow the UE 902 to transmit one or more SL messages, and the network entity 906 may transmit an SL resource grant 917 to the encoder 908 to allow the encoder 908 to transmit one or more SL messages. The downlink and uplink transmissions with the network entity 906 and the UE 902 and with the network entity 906 and the encoder 908 may be performed using Uu resources.

The UE 902 may transmit an SL TB 918 to wireless devices that may receive the signal within a zone, such as the UE 904 and the encoder 908. The UE 902 may transmit the SL TB 918 using SL resources provided by the SL resource grant 916 received from the network entity 906. The UE 902 may transmit the SL TB 918 with a network coding request flag, which may be used to instruct a device, such as the encoder 908, to encode the SL TB. The UE 902 may transmit the SL TB 918 separate from a network coding request flag which also may be transmitted to the encoder 908. For example, the UE 902 may transmit an NC request 915 to the encoder 908 to request that the encoder 908 use NC to encode the SL TB 918. The encoder 908 may be any suitable device configured to code a TB, such as an RSU, a UE relay, another UE, or a base station (e.g., gNB). The encoder 908 may transmit an ACK/NACK 919 of the request to code the SL TB 918 to the UE 902. For example, the encoder 908 may transmit an ACK to acknowledge receipt or to accept coding the SL TB 918, and may transmit a NACK to indicate a failure to receive the SL TB 918. The encoder 908 may transmit the ACK/NACK 919 of the request using SL resources provided by the SL resource grant 917 from the network entity 906. At 920, in response to receiving the SL TB 918, the encoder 908 may encode the SL TB 918 with other TBs received by UEs in a zone of the encoder 908, such as the UE 706 in FIG. 7A. The encoder 908 may transmit the SL NC TB 922 to the UE 904. The encoder may transmit the SL NC TB 922 using SL resources provided by the SL resource grant 917 from the network entity 906.

The UE 902 may use one or both of the received SL TB 918 and the SL NC TB 922 to recover an erasure of a failed transmission. For example, the UE 902 may use the SL NC TB 922 to recover a failed decode of the SL TB 918 by summing the SL NC TB 922 with other TB values received from other UEs in the same zone. In another aspect, the UE 902 may use the SL NC TB 922 and the SL TB 918 to recover a failed decode of a TB received from another UE in the same zone by summing the SL NC TB 922 and the SL TB 918 with other TB values received from other UEs in the same zone to recover the erased TB.

While the network entity 906 may coordinate with UEs and encoders within the same zone, when devices migrate from one zone to another, transmissions may be lost. Additional coordination may be used to enable a network entity to handover network coding from an encoder in one zone to an encoder in another zone. The network entity may play a coordinating part and may not be transparent to the devices (e.g., the devices may not transmit any of their TBs to the coordinating network entity). For example, the network entity may transmit an NC handover request to one or more encoders to coordinate a handover from one encoder to another encoder, an encoder may transmit a confirmation message to a network entity to provide contextual information about the handover to the network entity, and the SL NC TB (NC transmission) may include one or more indicators in its header to provide contextual information to a receiving encoder or UE.

FIG. 8A shows a diagram of an NC handover request 800 including an encoder ID field 802, an encoder ID field 804, an encoder transmission field 806, a UE transmission field 808, a transmission type field 810, and a set of additional handover request fields 812. Each of the fields may have one or more bits used to indicate contextual information associated with the NC handover request 800. The encoder ID field 802 may be used to provide an identifier (ID) of a first encoder, or a source encoder, for the NC handover request 800. The encoder ID field 804 may be used to provide an ID of a second encoder, or a destination encoder, for the NC handover request 800. The encoder transmission field 806 may be used to provide an indication of whether an encoder should transmit an SL NC TB to another encoder, for example a first encoder associated with a first zone transmitting an SL NC TB to a second encoder associated with a second zone, or a second encoder associated with a second zone transmitting an SL NC TB to a first encoder associated with a first zone, where a UE is moving from the first zone to the second zone. The UE transmission field 808 may be used to provide an indication of whether an encoder should transmit, or retransmit, an SL TB to a UE in the zone associated with the encoder. The transmission type field 810 may be used to indicate whether the encoder should transmit a TB for NC purposes (e.g., whether a TB is an NC transmission or not, whether the encoder should encode an SL NC TB for transmission). The set of additional handover request fields 812 may be used to provide additional information to an encoder that may be used to perform an NC handover from the encoder to another encoder, such as a UE ID, a zone ID of a zone the UE is moving from, a zone ID of a zone the UE is moving to, or a size of an SL TB associated with the UE. While the NC handover request 800 is shown as having the encoder ID field 802, the encoder ID field 804, the encoder transmission field 806, the UE transmission field 808, the transmission type field 810, and the set of additional handover request fields 812, in some aspects the NC handover request 800 may have more or less fields. For example, in one aspect an NC handover request may not have a transmission type field.

FIG. 8B shows a diagram of a confirmation message 820 including a handover acceptance field 822, a buffering field 824, an acknowledgement (ACK) negative ACK (ACK/NACK) field 826, and a set of additional confirmation fields 828. The confirmation message 820 may be in an uplink control information (UCI) format. Each of the fields may have one or more bits used to indicate contextual information associated with the confirmation message 820. The handover acceptance field 822 may be used to provide an indication of whether the transmitting encoder has accepted an incoming NC handover request. The buffering field 824 may be used to provide an indication of whether the transmitting encoder has buffered an SL NC TB for transmission to a UE. The ACK/NACK field 826 may be used to provide an indication of whether the transmitting encoder has successfully received an SL NC TB from another encoder. The set of additional confirmation fields 828 may be used to provide feedback to a network entity or to another encoder in response to receiving an NC handover request. While the confirmation message 820 is shown as having the handover acceptance field 822, the buffering field 824, the ACK/NACK field 826, and the set of additional confirmation fields 828, in some aspects the confirmation message 820 may have more or less fields. For example, in one aspect a confirmation message may not have a buffering field.

FIG. 8C shows a diagram of an SL NC TB 840 including a header 841 and a payload 848. The payload may include data that may be used by a receiving UE to reconstruct a missing message, such as the $f(T_{xa}, T_{xb})$ of the SL signals 717 in FIG. 7A, or a vector [a, b, c, a $\oplus$ b $\oplus$ c] for received messages a, b, and c. The header 841 may include an NC handover request ID field 842, an encoder ID field 844, and a set of additional NC transmission fields 846. Each of the fields may have one or more bits used to indicate contextual information associated with the SL NC TB 840. The NC handover request ID field 842 may be used to provide an identifier of an NC handover request, such as the NC handover request 800 in FIG. 8A. The encoder ID field 844 may be used to provide an identifier of a first encoder associated with a first zone or a second encoder associated with a second zone, where a UE is moving from the first zone to the second zone. The set of additional NC transmission fields 846 may be used to provide contextual information to a device that receives the SL NC TB 840, such as an identifier of a set of UEs that the SL NC TB is addressed to, or a checksum. While the SL NC TB 840 is shown as having the header 841 including the NC handover request ID field 842, the encoder ID field 844, and the set of additional NC transmission fields 846, the header 841 of the SL NC TB 840 may have more or less fields. For example, in one aspect a header of an SL NC TB may not have an encoder ID field.

Figure 10A:
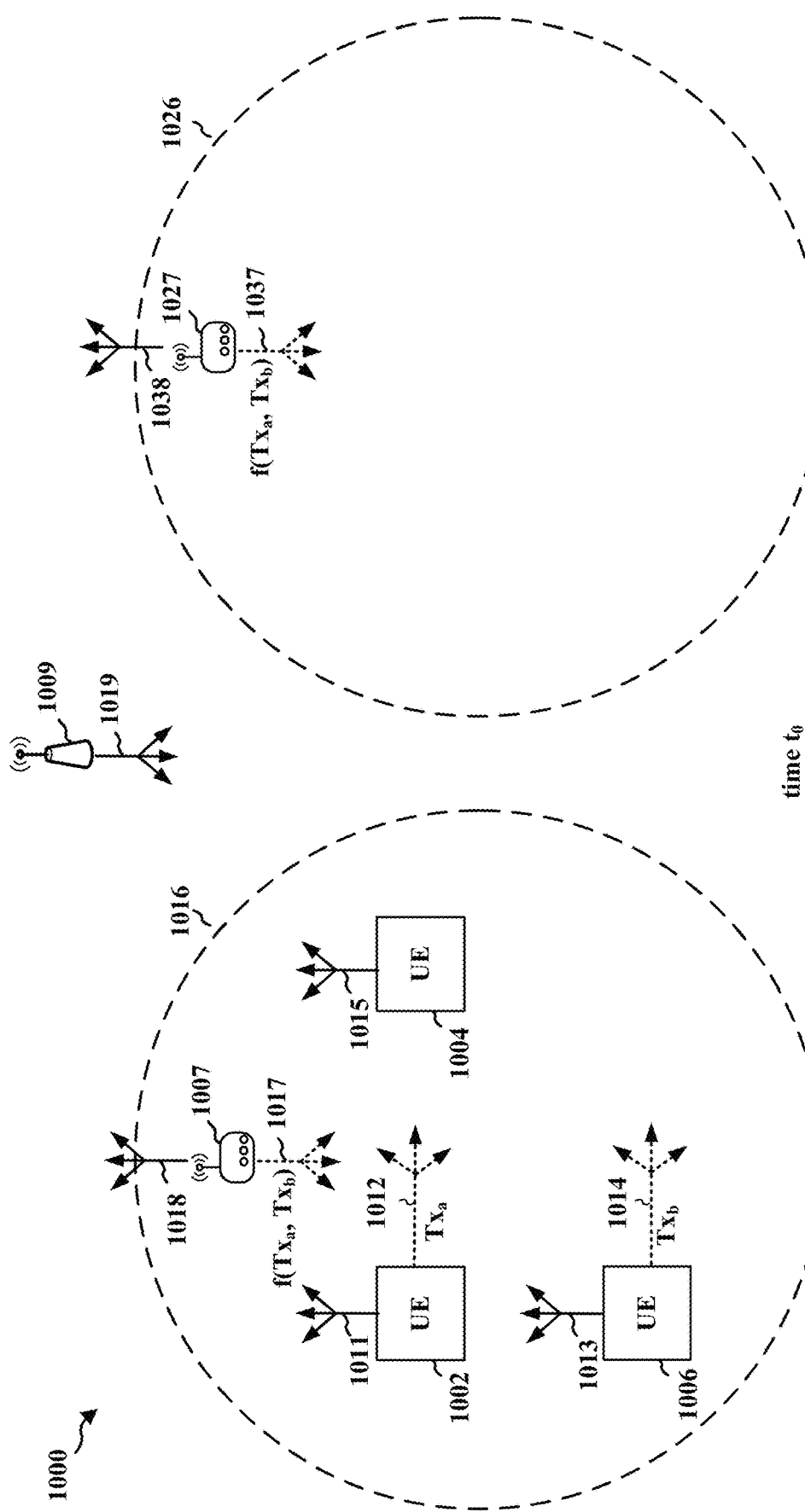
FIG. 10A is a diagram illustrating an example aspect of sidelink communication between devices using NC at a first time.
Figure 10B:
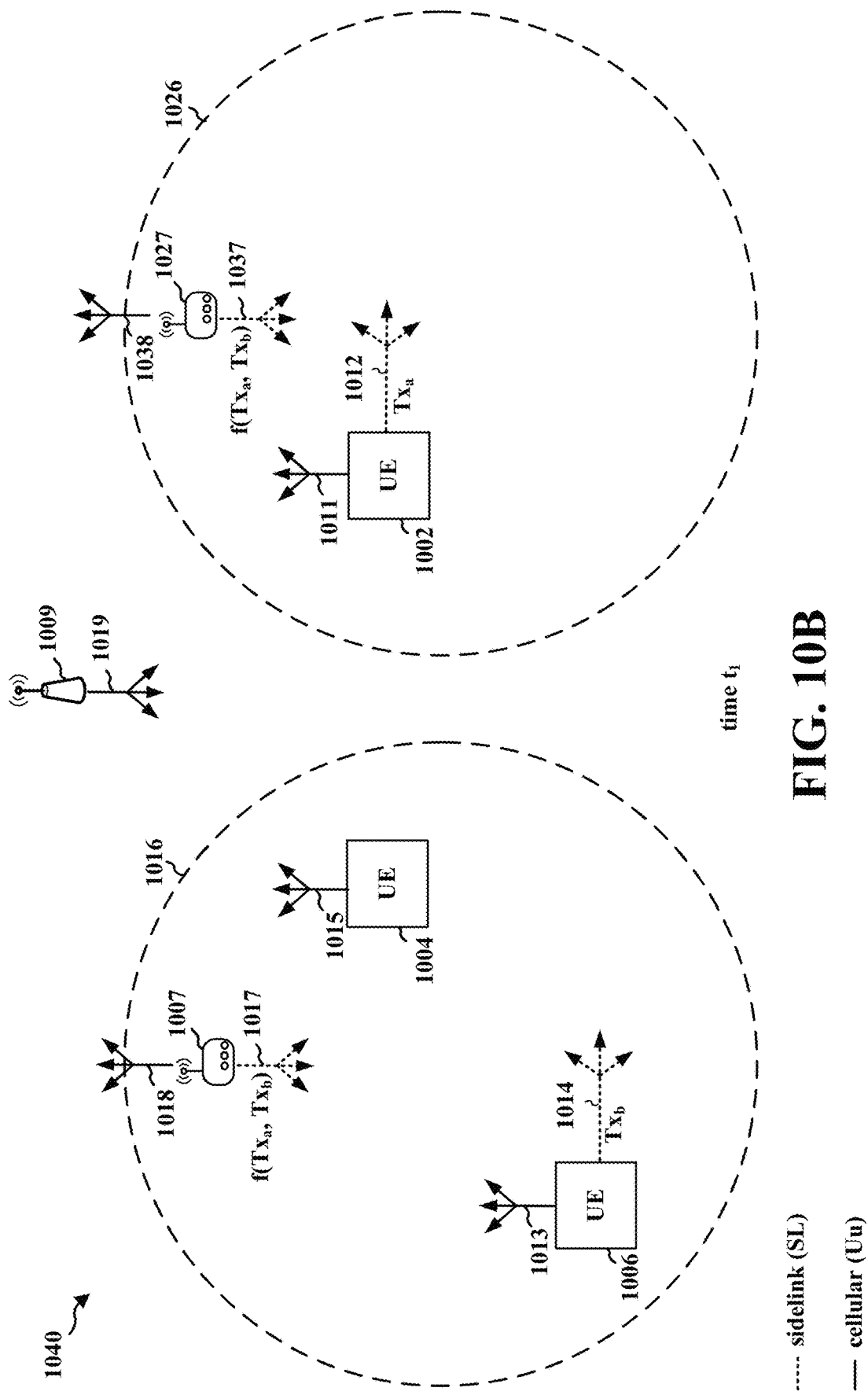
FIG. 10B is a diagram illustrating the example aspect in FIG. 10A at a second time.
Figure 10C:
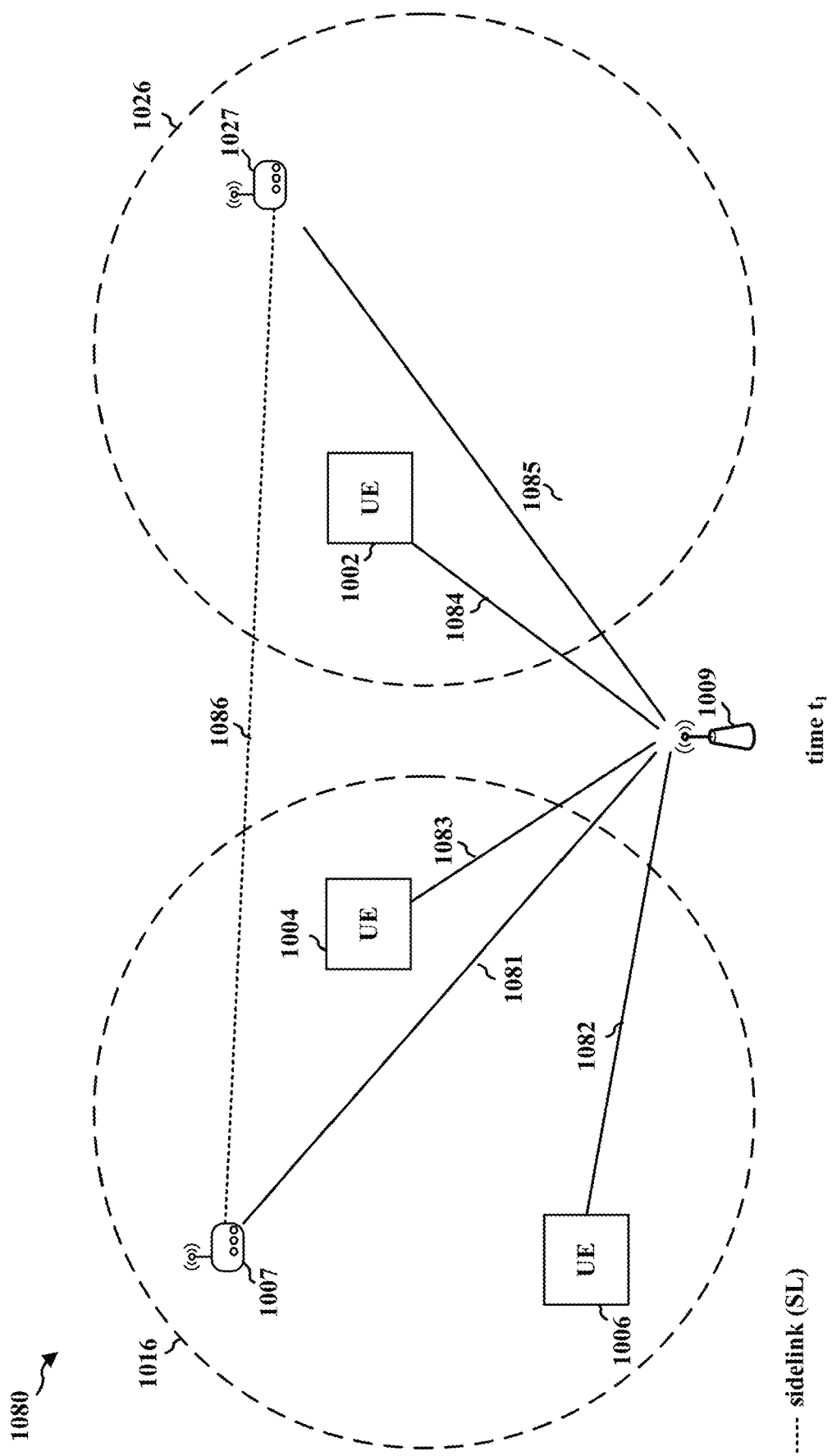
FIG. 10C is a diagram illustrating communication links between wireless devices of FIG. 10B.

FIG. 10A shows a diagram 1000 illustrating a network having a zone 1016 with UEs 1002, 1004 and 1006 and an encoder 1007, and a zone 1026 with an encoder 1027 at a time $t_0$. FIG. 10B shows a diagram 1040 illustrating the network of FIG. 10A, where a UE 1002 moves from the zone 1016 to the zone 1026 at a time $t_1$. The UEs 1002, 1004, and 1006 may be similar to the UEs 702, 704, and 706 in FIGS. 7A-7E, respectively. The encoders 1007 and 1027 may be similar to the encoder 707 in FIGS. 7A-7E. FIG. 10C show communication links between the network entity 1009 and the UEs 1002, 1004, 1006, and encoders 1007 and 1027 at the time $t_1$.

As shown in the diagram 1000 in FIG. 10A, a UE 1002 may transmit SL signals 1012 (e.g., SL TBs, such as SL TB $T_{xa}$) to the UE 1004 and the encoder 1007. A UE 1006 may transmit SL signals 1014 (e.g., SL TBs, such as SL TB $T_{xb}$) to the UE 1004 and the encoder 1007. As shown in the diagram 1000 in FIG. 10A and the diagram 1040 in FIG. 10B, the UE 1002 may move from the zone 1016 at time to in FIG. 10A to the zone 1026 at time $t_1$ in FIG. 10B. The UE 1002 may transmit SL signals 1012 (e.g., SL TBs, such as SL TB $T_{xa}$) to the UE 1004 and the encoder 1007. The UE 1006 may also transmit SL signals 1014 (e.g., SL TBs, such as SL TB $T_{xb}$) to the UE 1004 and the encoder 1007 while the UE 1002 moves from the zone 1016 to the zone 1026. The UE 1006 may not move outside of the zone 1016 from time to in FIG. 10A to time $t_1$ in FIG. 10B.

If the UE 1002 stays within the zone 1016 long enough such that the UE 1004 may successfully receive (i.e., not fail at decoding) at least two of the $T_{xa}$ of the SL signals 1012, the $T_{xb}$ of the SL signals 1014, or the $f(T_{xa}, T_{xb})$ of the SL signals 1017 (e.g., SL NC TBs) before moving to the zone 1026 at time $t_1$ in FIG. 10B, the UE 1004 may successfully receive the $T_{xa}$ of the SL signals 1012 and the $T_{xb}$ of the SL signals 1014 using NC techniques. For example, in one aspect, if the UE 1004 successfully receives the $T_{xa}$ of the SL signals 1012 and the $T_{xb}$ of the SL signals 1014 without receiving the $f(T_{xa}, T_{xb})$ of the SL signals 1017, the UE 1004 has successfully received the $T_{xa}$ of the SL signals 1012 and the $T_{xb}$ of the SL signals 1014. In another aspect, if the UE 1004 successfully receives the $T_{xa}$ of the SL signals 1012 and the $f(T_{xa}, T_{xb})$ of the SL signals 1017 without receiving the $T_{xb}$ of the SL signals 1014, the UE 1004 may derive $T_{xb}$ by reversing the function of $f(T_{xa}, T_{xb})$ using $T_{xa}$. In another aspect, if the UE 1004 successfully receives the $T_{xb}$ of the SL signals 1014 and the $f(T_{xa}, T_{xb})$ of the SL signals 1017 without receiving the $T_{xa}$ of the SL signals 1012, the UE 1004 may derive $T_{xa}$ by reversing the function of $f(T_{xa}, T_{xb})$ using $T_{xb}$.

However, if the UE 1002 moves from the zone 1016 to the zone 1026 before the UE 1004 successfully receives at least two of the $T_{xa}$ of the SL signals 1012, the $T_{xb}$ of the SL signals 1014, or the $f(T_{xa}, T_{xb})$ of the SL signals 1017, the UE 1004 may not successfully receive the $T_{xa}$ of the SL signals 1012 and the $T_{xb}$ of the SL signals 1014 without additional coordination from the network entity 1009. For example, the UE 1004 may move to the zone 1026 before the UE 1004 may receive the $T_{xa}$ of the SL signals 1012, preventing the UE 1004 from receiving the $T_{xa}$ of the SL signals 1012. In another aspect, the UE 1004 may move to the zone 1026 before the encoder 1007 may receive the $T_{xa}$ of the SL signals 1012, preventing the encoder 1007 from generating the $f(T_{xa}, T_{xb})$ of the SL signals 1017.

The network entity 1009 may communicate with any of UE 1002, the UE 1004, the UE 1006, the encoder 1007, and/or the encoder 1027 to coordinate a successful transmission of the SL signals 1012, SL signals 1014, and the SL signals 1017 to the UE 1004, even if the UE 1002 moves from the zone 1016 to the zone 1026 before the UE 1004 may successfully receive the SL signals 1012 or the SL signals 1017. FIG. shows a diagram 1080 with a communication link 1081 between the encoder 1007 and the network entity 1009, a communication link 1082 between the UE 1006 and the network entity 1009, a communication link 1083 between the UE 1004 and the network entity 1009, a communication link 1084 between the UE 1002 and the network entity 1009, a communication link 1085 between the encoder 1027 and the network entity 1009, and a communication link 1086 between the encoder 1007 and the encoder 1027. The communication link 1081 may be a Uu communication link that enables DL signals 1019 from the network entity 1009 to the encoder 1007 and enables UL transmissions 1018 from the encoder 1007 to the network entity 1009. The communication link 1082 may be a Uu communication link that enables DL signals 1019 from the network entity 1009 to the UE 1006 and enables UL transmissions 1013 from the UE 1006 to the network entity 1009. The communication link 1083 may be a Uu communication link that enables DL signals 1019 from the network entity 1009 to the UE 1004 and enables UL transmissions 1015 from the UE 1004 to the network entity 1009. The communication link 1084 may be a Uu communication link that enables DL signals 1019 from the network entity 1009 to the UE 1002 and enables UL transmissions 1011 from the UE 1002 to the network entity 1009. The communication link 1085 may be a Uu communication link that enables DL signals 1019 from the network entity 1009 to the encoder 1027 and enables UL transmissions 1038 from the encoder 1027 to the network entity 1009. The DL signals 1019 may be, for example, an SL resource grant or an NC handover request. The UL transmissions 1011 from the UE 1002 may be, for example, a request for SL resources or location information (e.g., a BSR, a UE ID, a current zone ID, GNSS location information, a geographic location) associated with the UE 1002. The UL transmissions 1013 from the UE 1006 may be, for example, a request for SL resources or location information associated with the UE 1006. The UL transmissions 1015 from the UE 1004 may be, for example, a request for SL resources or location information associated with the UE 1004. The UL transmissions 1018 from the encoder 1007 may be, for example, a request for SL resources, location information associated with UEs in the zone 1016 (e.g., UEs 1002, 1004, and 1006 at time to, UEs 1004 and 1006 at time $t_1$), or a confirmation message associated with an NC handover request. The UL transmissions 1038 from the encoder 1027 may be, for example, a request for SL resources, location information associated with UEs in the zone 1016 (e.g., UE 1002 at time $t_1$), or a confirmation message associated with an NC handover request.

The communication link 1086 may be an SL communication link that enables SL transmissions from the encoder 1007 to the encoder 1027 and enables SL transmissions from the encoder 1027 to the encoder 1007. In another aspect, the communication link 1086 may be a backhaul link or a midhaul link between the encoder 1007 and the encoder 1027. The encoder 1007 may broadcast, unicast, or groupcast one or more of the SL signals 1017 (e.g., SL TBs or SL NC TBs) in FIG. using the communication link 1086 in FIG. 10C. The encoder 1027 (e.g., SL TBs or SL NC TBs) may broadcast, unicast, or groupcast one or more of the SL signals 1037 in FIG. 10A using the communication link 1086 in FIG. 10C. The SL signals 1017 from the encoder 1007 may be, for example, an SL TB, an SL NC TB, or a confirmation message. The SL signals 1037 from the encoder 1027 may be, for example, an SL TB, an SL NC TB, or a confirmation message.

The network entity 1009 may transmit DL signals 1019 to any of the UE 1002, the UE 1004, the UE 1006, the encoder 1007, and/or the encoder 1027 to coordinate a successful transmission of the SL signals 1012, SL signals 1014, and the SL signals 1017 to the UE 1004, even if the UE 1002 moves from the zone 1016 to the zone 1026 before the UE 1004 may successfully receive the SL signals 1012 or the SL signals 1017. For example, at time $t_1$, the UE 1002 may transmit one or more of the SL signals 1012 to the encoder 1027, and the encoder 1027 may transmit one or more of the SL signals 1012 as the SL signals 1037 to the encoder 1007. The encoder 1027 may have a larger sidelink transmission range than the UE 1002, or may be able to communicate with the encoder 1007 via other means, such as a backhaul or a midhaul link. The network entity 1009 may be configured to obtain information that the UE 1002 is moving from the zone 1016 to the zone 1026 and initiate NC handover from the encoder 1007 to the encoder 1027. An NC handover is a handover from one encoder to another encoder where each encoder is configured to retransmit received transmissions using NC. The network entity 1009 may receive periodic location information from the UE 1002, or may receive periodic location information from the encoder 1007 about UEs in the zone 1016, or may receive periodic location information from the encoder 1027 about UEs in the zone 1026. The periodic location information may indicate to the network entity 1009 of the movement of the UE 1002 from the zone 1016 to the zone 1026. The encoder 1007 may receive the SL signals 1012 from UE 1002 and the SL signals 1014 from UE 1006, and retransmit the received transmissions as the SL signals 1017. The network entity 1009 may also be configured to allocate appropriate SL resources to each device, for example allocating SL resources to the encoder 1027 to allow the encoder 1027 to forward the SL signals from the UE 1002 to the encoder 1007.

Figure 11:
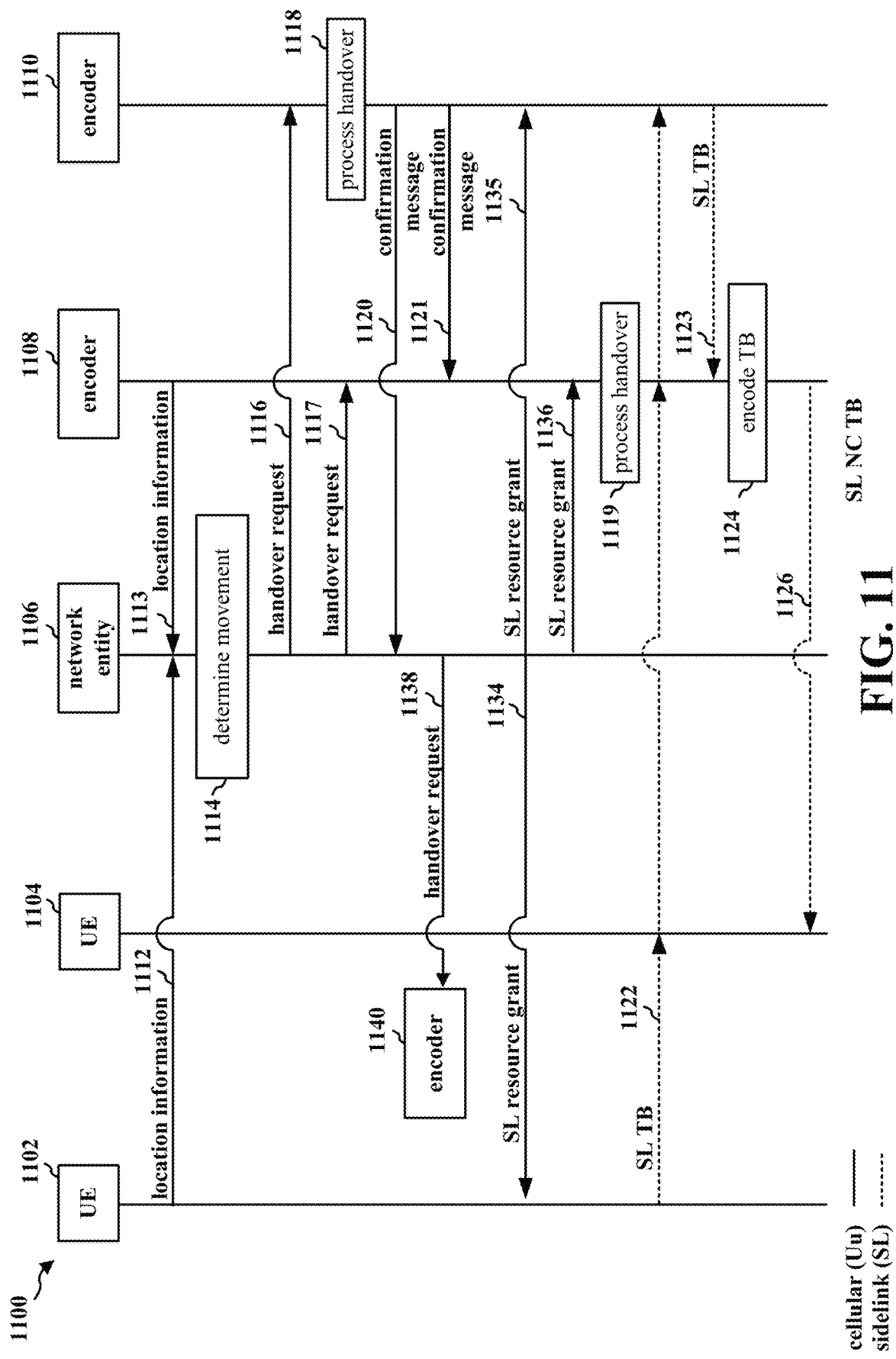
FIG. 11 is a connection flow diagram illustrating an example aspect of sidelink communication between devices using NC where a source UE moves between zones.

FIG. 11 shows a connection flow diagram 1100 illustrating an example of sidelink communication between UE 1102, UE 1104, encoder 1108, and encoder 1110 with a network entity 1106 that coordinates NC between the UE 1102, the UE 1104, the encoder 1108, and the encoder 1110. The UE 1102, UE 1104, network entity 1106, encoder 1108, and encoder 1110 may be similar to the UE 1002, the UE 1004, the network entity 1009, the encoder 1007, and the encoder 1027 in FIGS. 10A-10C, respectively. The network entity 1106 may coordinate NC between the encoder 1108 and the encoder 1110 when the UE 1102 moves from a zone covered by the encoder 1108 to a zone covered by the encoder 1110. The encoder 1108 and the encoder 1110 may communicate with one another using PSCCH or PSFCH.

The UE 1102 may provide a location information 1112 to the network entity 1106 via a message, such as an uplink transmission. This may allow the network entity 1106 to be aware of the moves of the UE 1102. The location information 1112 may include, for example, a BSR. The BSR may include, for example, a UE identifier (ID), a new zone ID (e.g., an identifier of the zone 1016 or the zone 1026 in FIGS. 10A-10C), a GNSS location, or a geographic location of the UE. The zone ID may be a lossy and/or compressed form of the GNSS location or geographic location of a UE. The UE 1102 may be configured to periodically provide the location information 1112 to the network entity 1106 (e.g., every 100 ms, every second, or every 10 seconds), or may be configured to provide the location information 1112 to the network entity 1106 in response to an event, such as a movement that meets or exceeds a threshold value (e.g., 20 m) from its last reported or transmitted location.

The encoder 1108 may provide a location information 1113 to the network entity 1106 via a message, such as an uplink transmission. This may allow the network entity 1106 to be aware of the moves of any UE in SL communication with the encoder 1108. The location information 1113 may provide location information on any UEs affiliated with the encoder 1108. The location information 1113 may include a report the location of any UEs affiliated with the encoder 1108 (e.g., that communicated with the encoder 1108 within a threshold period of time, such as 10 seconds). The location information 1113 may include, for example, a zone ID, a GNSS location, or geographic location of each UE of the set of UEs associated with the encoder 1108. The zone ID may be a lossy and/or compressed form of the GNSS location or geographic location of a UE. The zone ID may identify the first zone. The location information 1113 may also include location information associated with the encoder 1108. The encoder 1108 may be configured to periodically provide the location information 1113 to the network entity 1106, or may be configured to provide the location information 1113 to the network entity 1106 in response to an event, such as a movement of a UE or the encoder 1108 that meets or exceeds a threshold value (e.g., 20 m) from its last reported location or a request from the network entity 1106. The location information 1113 may also include a number of UEs that the encoder 1108 is affiliated with in its zone.

At 1114, the network entity 1106 may determine a movement of the UE 1102 from a first zone to the second zone using at least a portion of one or both of the location information 1112 and/or the location information 1113. In one aspect, the network entity 1106 may process a plurality of received location information transmissions to generate a map of moving UEs (e.g., vehicles) which the network entity 1106 may use to determine that a UE is moving from one zone to another zone. At 1114, the network entity 1106 may determine that the UE 1102 is moving from a zone of the encoder 1108 to a zone of the encoder 1110 using such a map.

In response to determining that the UE 1102 is moving from a zone of the encoder 1108 to a zone of the encoder 1110, the network entity 1106 may initialize a handover request, for example the NC handover request 800 in FIG. 8A. The network entity 1106 may transmit a handover request 1116 as a downlink transmission to the encoder 1110 (i.e., the destination encoder). The network entity 1106 may transmit a handover request 1117 as a downlink transmission to the encoder 1108 (i.e., the source encoder). The handover request 1116 and handover request 1117 may be the same or different. For example, the handover request 1116 may have an encoder ID of the encoder 1110 and the handover request 1117 may have an encoder ID of the encoder 1108, or the handover request 1116 may have a subset of the information of the handover request 1117, or vice-versa. The handover request 1116 and/or 1117 may be in any suitable format, for example a DCI format, a MAC-CE format, or a newly defined format for NC handovers.

The handover request 1116 and/or 1117 may include an indication of the destination encoder (e.g., a second encoder in a second zone where the UE 1102 moves from a first zone having a first encoder to the second zone having the second encoder). The destination encoder may be the encoder 1110. In one aspect, the handover request 1116 and/or 1117 may include a destination encoder ID field for the TB. For example, the encoder ID field 804 of the NC handover request 800 in FIG. 8A. may store an encoder ID of the encoder 1110. The handover request 1116 and/or 1117 may include an indication of the encoder 1108 in a source encoder ID field for the TB. In one aspect, the handover request 1116 and/or 1117 may include a source encoder ID field for the TB. For example, the encoder ID field 802 of the NC handover request 800 in FIG. 8A. may store an encoder ID of the encoder 1108. The handover request 1116 and/or 1117 may include an indication for the encoder 1108 to transmit the SL NC TB to the encoder 1110. For example, the encoder transmission field 806 of the NC handover request 800 in FIG. 8A may store an indication of whether the encoder 1110 should transmit an SL NC TB to the encoder 1108. In one aspect, the handover request 1116 and/or 1117 may include a bit to indicate that the encoder 1108 should transmit the TB to the encoder 1110 for NC purposes, for example in a transmission type field. For example, when the bit is set, the handover request 1116 and/or 1117 may indicate that the encoder 1108 should transmit the SL NC TB 1126 to the encoder 1110. In one aspect, the encoder transmission field 806 of the NC handover request 800 in FIG. 8A may store such a bit. The network entity 1106 may be configured to set the bit in response to the encoder 1110 not having the TB in its buffer. The handover request 1116 and/or 1117 may include an indication that the handover request 1116 and/or 1117, respectively is for NC purposes. In one aspect the handover request 1116 and/or 1117 may include a bit to indicate that the handover request 1116 and/or 1117, respectively, is for NC. For example, the transmission type field 810 of the NC handover request 800 in FIG. 8A may include such a bit. In one aspect, the handover request 1116 and/or 1117 may include an instruction to the encoder 1108 to transmit the SL NC TB 1126 to the UE 1104. For example, such an instruction may be included in the set of additional handover request fields 812 of the NC handover request 800 in FIG. 8A.

The handover request 1116 and/or 1117 may include a grant of an SL resource in at least one of time or frequency to the encoder 1110 and/or the encoder 1108, respectively. The network entity 1106 may provide the grant of the SL resource in a separate transmission, for example like the SL resource grant 917 in FIG. 9. The grant of the SL resource may be a time domain resource allocation (TDRA) and/or a frequency domain resource allocation (FDRA). The TDRA and/or the FDRA may indicate what resource the encoder 1110 may use to conduct NC containing the SL TB 1122 being handed over. The handover request 1116 and handover request 1117 may be transmitted by unicast to each of the encoder 1110 and the encoder 1108, respectively. If the handover request 1116 is identical to the handover request 1117, the handover requests may be transmitted by groupcast to the encoder 1110 and the encoder 1108. The handover request 1116 and the handover request 1117 may compose a groupcast or a broadcast transmission. In other words, the handover requests may be combined in a single transmission.

At 1118, the encoder 1110 may process the handover. The encoder 1110 may transmit a confirmation message 1120, such as the confirmation message 820 in FIG. 8B, to the network entity 1106 in response to the handover request 1116. The encoder 1110 may also transmit a confirmation message 1121 to the encoder 1108 in response to the handover request 1116, which may contain the same, or different, elements as the confirmation message 1120. The confirmation message 1120 and/or confirmation message 1121 may be transmitted as a message, such as an uplink transmission to the network entity 1106. The confirmation message 1120 and/or confirmation message 1121 may be transmitted in an uplink control information (UCI) format. The confirmation message 1120 and/or confirmation message 1121 may be transmitted in a custom format created for NC handover, such as the confirmation message 820 in FIG. 8B. The confirmation message 1121 may be transmitted using an SL resource. While the confirmation message 1121 and the confirmation message 1121 are shown in connection flow diagram 1100 as being transmitted before the UE 1102 transmits the SL TB 1122, the confirmation message 1121 and the confirmation message 1121 may be transmitted after the encoder 1108 encodes the SL TB at 1124.

The confirmation message 1120 and/or confirmation message 1121 may include at least one of (a) an indication of acceptance for the NC handover request, (b) an indication of rejection for the NC handover request, (c) an indication of buffering of the SL NC TB, (d) an indication of no buffering of the SL NC TB, (e) an indication of a successful receipt of the SL NC TB, or (f) an indication of a failed receipt of the SL NC TB. Such indications may be stored in, for example, the handover acceptance field 822, the buffering field 824, the ACK/NACK field 826, or the set of additional confirmation fields 828 of the confirmation message 820 in FIG. 8B. The encoder 1110 may be configured to respond differently to an NC handover request than to other handover requests. The encoder 1110 may be configured to decline a handover request identified as an NC in the handover request 1116 based on the number of UEs associated with the encoder 1110 meeting or exceeding a lower threshold number and may be configured to decline a handover request identified as a different type of handover based on the number of UEs associated with the encoder 1110 meeting or exceeding a higher threshold number higher than the lower threshold number. The encoder 1110 may be configured to accept a handover request identified as an NC in the handover request 1116 based on the number of UEs associated with the encoder 1110 meeting or falling below the lower threshold number and may be configured to accept a handover request identified as the different type of handover based on the number of UEs associated with the encoder 1110 meeting or falling below the higher threshold number. In other words, the encoder 1110 may have different threshold numbers associated with different types of handover requests.

If the network entity 1106 receives a confirmation message 1120 that indicates that the encoder 1110 cannot execute the NC handover (e.g., the network entity 1106 receives an indication of rejection for the NC handover request transmission, an indication of no buffering of the SL NC TB, or an indication of a failed receipt of the SL NC TB), the network entity 1106 may be configured to use a different encoder than the encoder 1110. The network entity 1106 may then transmit a new handover request similar to the handover request 1116 to the newly selected encoder. For example, the network entity 1106 may transmit the handover request 1138 to the encoder 1140. The encoder 1140 may also be in the second zone that the UE 1104 is traveling towards.

If the network entity 1106 receives a confirmation message 1120 that indicates that the encoder 1110 can execute the NC handover, the network entity 1106 may be configured to output an SL resource grant 1135 to the encoder 1110 to transmit the SL TB 1123 to the encoder 1108 if the SL resource grant was not included in the handover request 1116. The encoder 1110 may have a more powerful transmitter or transceiver than the UE 1102 and the UE 1104, allowing the encoder 1110 to transmit the SL TB 1123 to wireless devices outside of the second zone. The network entity 1106 may also output an SL resource grant 1136 to the encoder 1108 to transmit the SL NC TB 1126 to the UE 1104.

At 1119, the encoder 1108 may process the handover request 1117 and/or the confirmation message 1121. For example, the encoder 1108 may retransmit the SL TB 1122 to ensure that the encoder 1110 receives it. The retransmission of the SL TB 1122 may contain an NC command for the encoder 1110 to encode the TB. The retransmission of the SL TB 1122 may contain at least a portion of the handover request 1117, allowing for the encoder 1110 to receive both the TB and the handover request if the encoder 1110 missed one or both. The handover request may contain a bit indicating an NC handover. The handover request may contain an encoder ID that indicates that the encoder 1110 should take over NC coding. This saves signaling, and gives another try from the original encoder to transmit the TB. If the encoder 1110 does not have the TB in its buffer, the encoder 1110 now has the TB.

The network entity 1106 may transmit an SL resource grant 1134 to the UE 1102 to transmit the SL TB 1122. The SL resource grant 1134 may enable the UE 1102 to transmit the SL TB 1122 to the UE 1104 and the encoder 1108 in the first zone. The SL resource grant 1134 may enable the UE 1102 to transmit the SL TB 1122 to the encoder 1110 in the second zone. The UE 1102 may transmit the SL TB 1122. The UE 1104 may receive the SL TB 1122, which may be within range of the UE 1102 that is moving to a different zone. The encoder 1108 may receive the SL TB 1122, which may be within range of the UE 1102 that is moving to a different zone. The encoder 1110 may receive the SL TB 1122, which may now be within range of the UE 1102 if the UE 1102 is moving towards the zone of the encoder 1110. If the encoder 1110 receives the SL TB 1122, the encoder 1110 may transmit the SL TB 1122 to the encoder 1108 as the SL TB 1123—essentially forwarding the SL TB 1122 in case the encoder 1108 did not successfully receive the SL TB 1122 from the UE 1102. At 1124, in response to receiving the SL TB 1122 and/or the SL TB 1123, the encoder 1108 may encode the received SL TB with other TBs received by UEs in a zone of the encoder 1108 (e.g., SL TB 1122, SL TB 1123, or other SL TBs received in the first zone). The encoder 1108 may transmit the SL NC TB 1126 to the UE 1104. The SL NC TB 1126 may be, for example, the SL NC TB 840 in FIG. 8C.

Figure 12A:
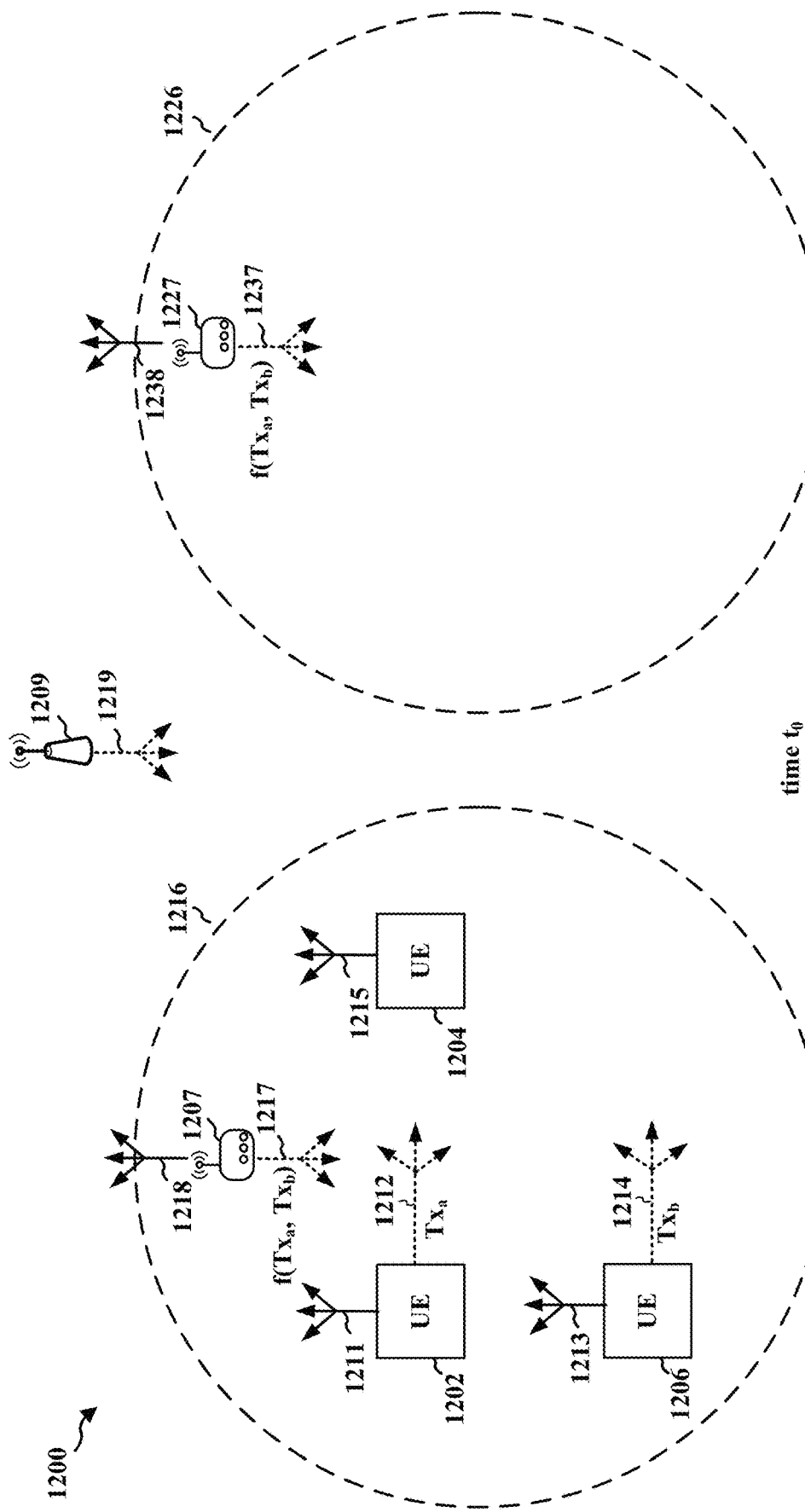
FIG. 12A is a diagram illustrating another example aspect of sidelink communication between devices using NC at a first time.
Figure 12B:
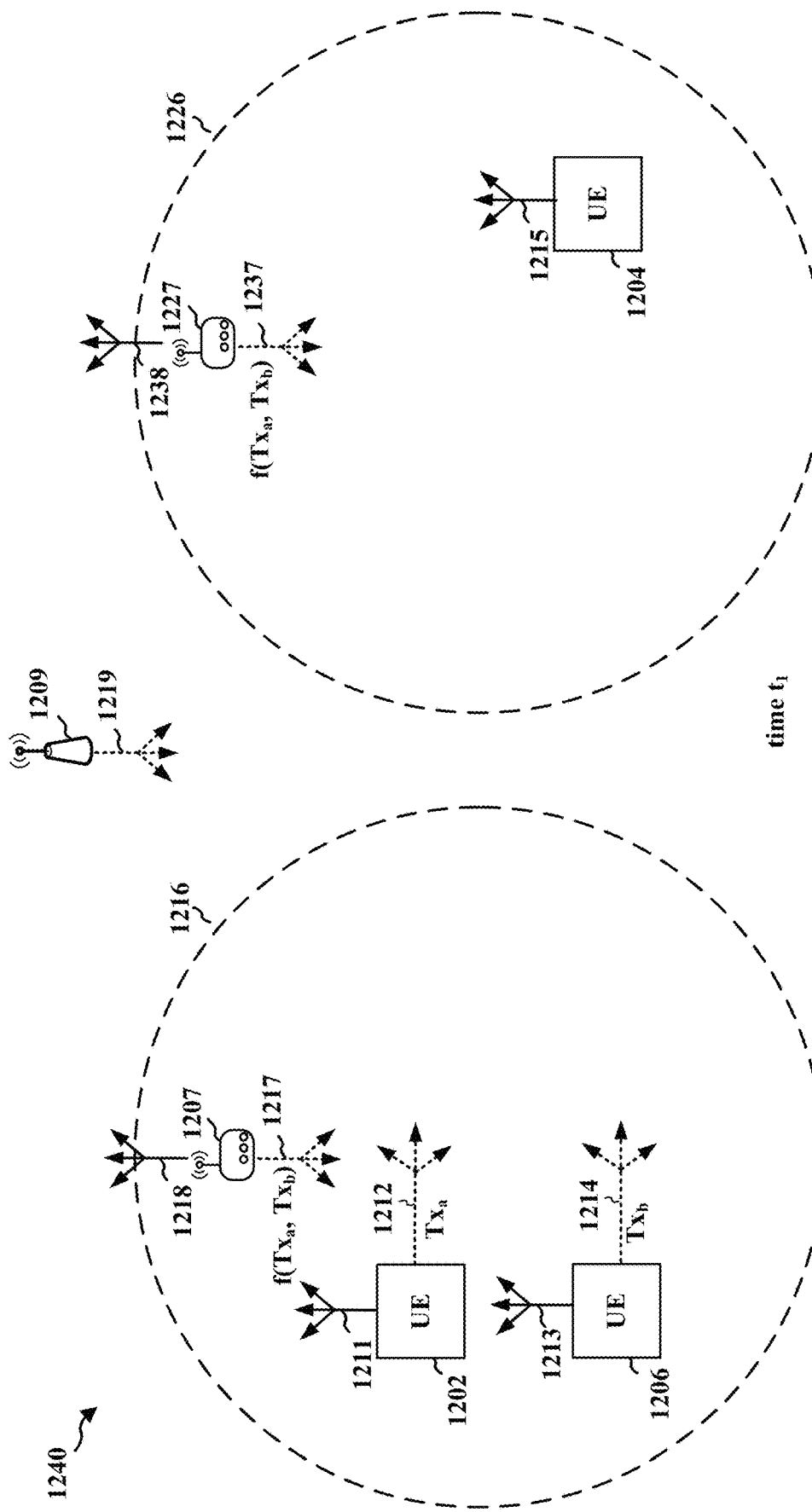
FIG. 12B is a diagram illustrating the example aspect in FIG. 12A at a second time.
Figure 12C:
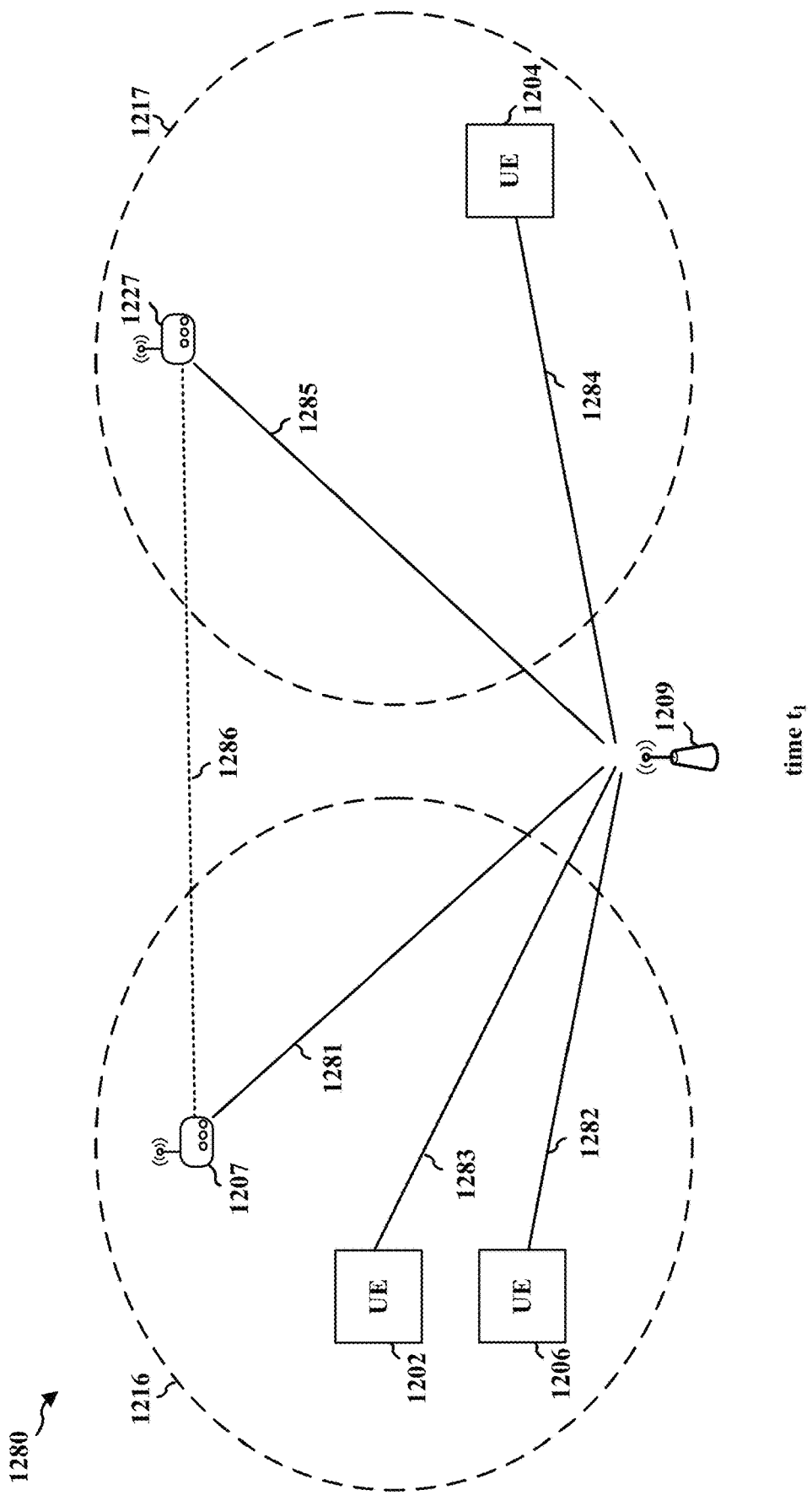
FIG. 12C is a diagram illustrating communication links between wireless devices of FIG. 12B.

FIG. 12A shows a diagram 1200 illustrating a network having a zone 1216 with UEs 1202, 1204 and 1206 and an encoder 1207, and a zone 1226 with an encoder 1227 at a time $t_0$. FIG. 12B shows a diagram 1240 illustrating the network of FIG. 12A, where a UE 1204 moves from the zone 1216 to the zone 1226 at a time $t_1$. The UEs 1202, 1204, and 1206 may be similar to the UEs 1002, 1004, and 1006 in FIGS. 10A-10C, respectively. The encoders 1207 and 1227 may be similar to the encoders 1007 and 1027 in FIGS. 10A-10C. FIG. 12C show communication links between the network entity 1209 and the UEs 1202, 1204, 1206, and encoders 1207 and 1227 at the time $t_1$.

As shown in the diagram 1200 in FIG. 12A, a UE 1202 may transmit SL signals 1212 (e.g., SL TBs, such as SL TB $T_{xa}$) to the UE 1204 and the encoder 1207. A UE 1206 may transmit SL signals 1214 (e.g., SL TBs, such as SL TB $T_{xb}$) to the UE 1204 and the encoder 1207. As shown in the diagram 1200 in FIG. 12A and the diagram 1240 in FIG. 12B, the UE 1204 may move from the zone 1216 at time to in FIG. 12A to the zone 1226 at time $t_1$ in FIG. 12B. The UE 1202 may transmit SL signals 1212 (e.g., SL TBs, such as SL TB $T_{xa}$) to the UE 1204 and the encoder 1207 and the UE 1206 may transmit SL signals 1214 (e.g., SL TBs, such as SL TB $T_{xb}$) to the UE 1204 and the encoder 1207 while the UE 1204 moves from the zone 1216 to the zone 1226. If the UE 1204 stays within the zone 1216 long enough such that the UE 1204 may successfully receive (i.e., not fail at decoding) at least two of the $T_{xa}$ of the SL signals 1212, the $T_{xb}$ of the SL signals 1214, or the $f(T_{xa}, T_{xb})$ of the SL signals 1217 (e.g., SL NC TBs) before moving to the zone 1226 at time $t_1$ in FIG. 12B, the UE 1204 may successfully receive the $T_{xa}$ of the SL signals 1212 and the $T_{xb}$ of the SL signals 1214 using NC techniques. For example, in one aspect, if the UE 1204 successfully receives the $T_{xa}$ of the SL signals 1212 and the $T_{xb}$ of the SL signals 1214 without receiving the $f(T_{xa}, T_{xb})$ of the SL signals 1217, the UE 1204 has successfully received the $T_{xa}$ of the SL signals 1212 and the $T_{xb}$ of the SL signals 1214. In another aspect, if the UE 1204 successfully receives the $T_{xa}$ of the SL signals 1212 and the $f(T_{xa}, T_{xb})$ of the SL signals 1217 without receiving the $T_{xb}$ of the SL signals 1214, the UE 1204 may derive $T_{xb}$ by reversing the function of $f(T_{xa}, T_{xb})$ using $T_{xa}$. In another aspect, if the UE 1204 successfully receives the $T_{xb}$ of the SL signals 1214 and the $f(T_{xa}, T_{xb})$ of the SL signals 1217 without receiving the $T_{xa}$ of the SL signals 1212, the UE 1204 may derive $T_{xa}$ by reversing the function of $f(T_{xa}, T_{xb})$ using $T_{xb}$.

However, if the UE 1204 moves from the zone 1216 to the zone 1226 before the UE 1204 successfully receives at least two of the $T_{xa}$ of the SL signals 1212, the $T_{xb}$ of the SL signals 1214, or the $f(T_{xa}, T_{xb})$ of the SL signals 1217, the UE 1204 may not successfully receive the $T_{xa}$ of the SL signals 1212 and the $T_{xb}$ of the SL signals 1214 without additional coordination from the network entity 1209. For example, the UE 1204 may move to the zone 1226 before the UE 1204 may receive the $T_{xa}$ of the SL signals 1212. In another aspect, the UE 1204 may move to the zone 1226 before the UE 1204 may receive the $T_{xb}$ of the SL signals 1212. In another aspect, the UE 1204 may move to the zone 1226 before the encoder 1207 may transmit the $f(T_{xa}, T_{xb})$ of the SL signals 1217 to the UE 1204.

The network entity 1209 may communicate with any of UE 1202, the UE 1204, the UE 1206, the encoder 1207, and/or the encoder 1227 to coordinate a successful transmission of the SL signals 1212, SL signals 1214, and the SL signals 1217 to the UE 1204, even if the UE 1204 moves from the zone 1216 to the zone 1226 before the UE 1204 may successfully receive the SL signals 1212, the SL signals 1214, or the SL signals 1217. FIG. 12C shows a diagram 1280 with a communication link 1281 between the encoder 1207 and the network entity 1209, a communication link 1282 between the UE 1206 and the network entity 1209, a communication link 1283 between the UE 1202 and the network entity 1209, a communication link 1284 between the UE 1204 and the network entity 1209, a communication link 1285 between the encoder 1227 and the network entity 1209, and a communication link 1286 between the encoder 1207 and the encoder 1227. The communication link 1281 may be a Uu communication link that enables DL signals 1219 from the network entity 1209 to the encoder 1207 and enables UL transmissions 1218 from the encoder 1207 to the network entity 1209. The communication link 1282 may be a Uu communication link that enables DL signals 1219 from the network entity 1209 to the UE 1206 and enables UL transmissions 1213 from the UE 1206 to the network entity 1209. The communication link 1283 may be a Uu communication link that enables DL signals 1219 from the network entity 1209 to the UE 1202 and enables UL transmissions 1215 from the UE 1202 to the network entity 1209. The communication link 1284 may be a Uu communication link that enables DL signals 1219 from the network entity 1209 to the UE 1204 and enables UL signals 1211 from the UE 1204 to the network entity 1209. The communication link 1285 may be a Uu communication link that enables DL signals 1219 from the network entity 1209 to the encoder 1227 and enables UL transmissions 1238 from the encoder 1227 to the network entity 1209. The DL signals 1219 may be, for example, an SL resource grant or an NC handover request. The UL signals 1211 from the UE 1202 may be, for example, a request for SL resources or location information (e.g., a BSR, a UE ID, a current zone ID, a GNSS location information, a geographic location) associated with the UE 1202. The UL transmissions 1213 from the UE 1206 may be, for example, a request for SL resources or location information associated with the UE 1206. The UL transmissions 1215 from the UE 1204 may be, for example, a request for SL resources or location information associated with the UE 1204. The UL transmissions 1218 from the encoder 1207 may be, for example, a request for SL resources, location information associated with UEs in the zone 1216 (e.g., UEs 1202, 1204, and 1206 at time t₀, UEs 1204 and 1206 at time t₁), or a confirmation message associated with an NC handover request. The UL transmissions 1238 from the encoder 1227 may be, for example, a request for SL resources, location information associated with UEs in the zone 1216 (e.g., UE 1202 at time $t_1$), or a confirmation message associated with an NC handover request.

The communication link 1286 may be an SL communication link that enables SL transmissions from the encoder 1207 to the encoder 1227 and enables SL transmissions from the encoder 1227 to the encoder 1207. In another aspect, the communication link 1286 may be a backhaul or a midhaul connection between the encoder 1207 and the encoder 1227. The encoder 1207 may broadcast, unicast, or groupcast one or more of the SL signals 1217 (e.g., SL TBs or SL NC TBs) in FIG. 12A using the communication link 1286 in FIG. 12C. The encoder 1227 (e.g., SL TBs or SL NC TBs) may broadcast, unicast, or groupcast one or more of the SL signals 1237 in FIG. 12A using the communication link 1286 in FIG. 12C. The SL signals 1217 from the encoder 1207 may be, for example, an SL TB, an SL NC TB, or a confirmation message. The SL signals 1237 from the encoder 1227 may be, for example, an SL TB, an SL NC TB, or a confirmation message.

The network entity 1209 may transmit DL signals 1219 to any of the UE 1202, the UE 1204, the UE 1206, the encoder 1207, and/or the encoder 1227 to coordinate a successful transmission of the SL signals 1212, SL signals 1214, and the DL signals 1219 to the UE 1204, even if the UE 1204 moves from the zone 1216 to the zone 1226 before the UE 1204 may successfully receive the SL signals 1212, the SL signals 1214, or the SL signals 1217. For example, at time $t_1$, the encoder 1207 may transmit the $f(T_{xa}, T_{xb})$ of the SL signals 1217 to the encoder 1227, and the encoder 1227 may then transmit the $f(T_{xa}, T_{xb})$ of the SL signals 1217 as the $f(T_{xa}, T_{xb})$ of the SL signals 1237 to the UE 1204. The $f(T_{xa}, T_{xb})$ of the SL signals 1237 may include the complete vector of all linearly independent constants, allowing the UE 1204 to reconstruct the $T_{xa}$ of the SL signals 1212 and the $T_{xb}$ of the SL signals 1214 even if the UE 1204 failed to receive some of the SL signals 1212, the SL signals 1214, and the SL signals 1217. The encoder 1207 may have a larger sidelink transmission range than the UE 1202 or the UE 1206, the encoder 1227 may have a more sensitive antenna or may be better equipped to handle interference than the UE 1204, or the encoder 1207 may be able to communicate with the encoder 1227 via other means, such as a backhaul or a midhaul link. The network entity 1209 may be configured to get information that the UE 1204 is moving from the zone 1216 to the zone 1226 and initiate NC handover from the encoder 1207 to the encoder 1227. The network entity 1209 may also be configured to allocate appropriate SL resources to each device, for example allocating SL resources to the encoder 1227 to allow the encoder 1227 to transmit the SL signals 1237 to the UE 1204.

Figure 13:
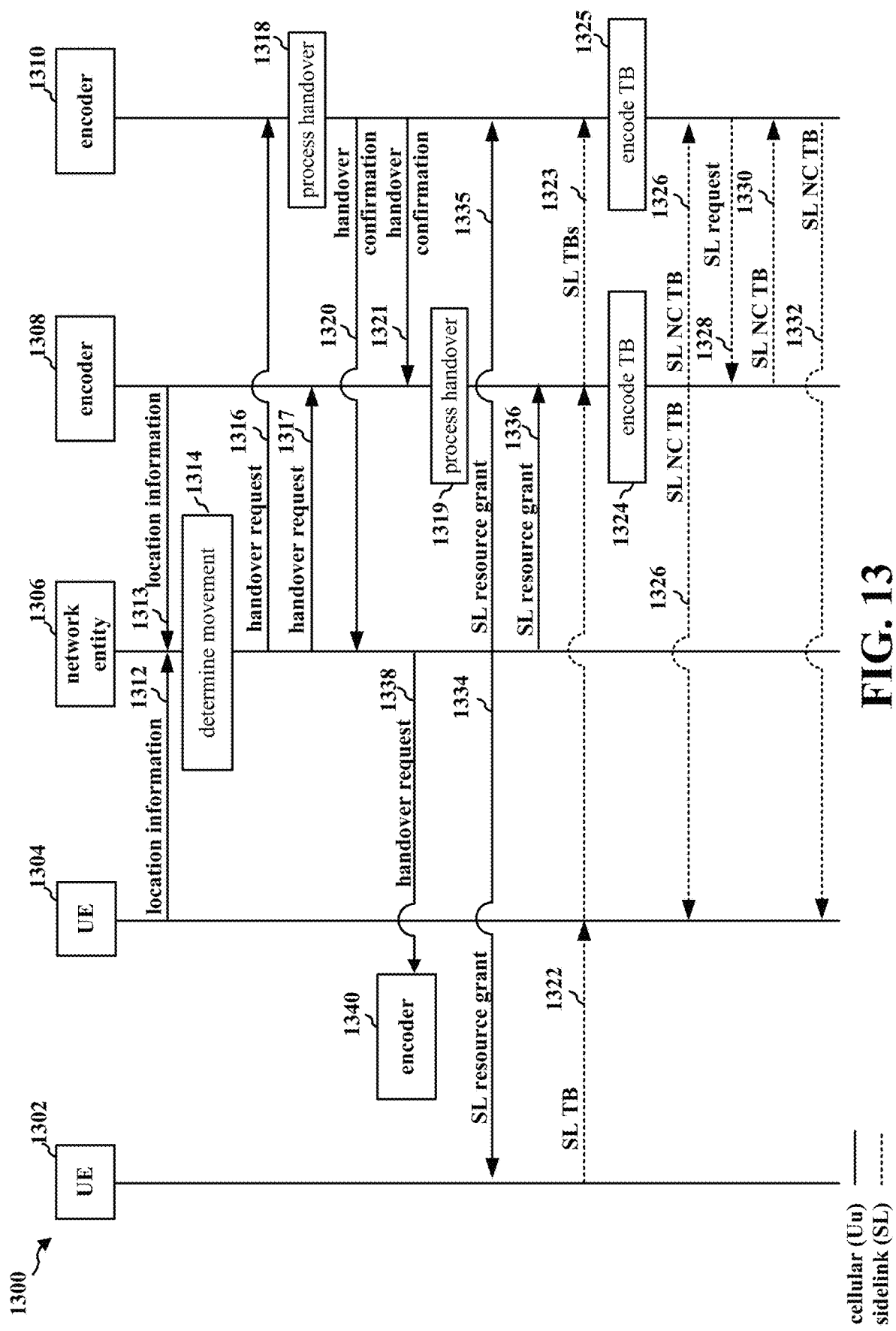
FIG. 13 is a connection flow diagram illustrating another example aspect of sidelink communication between devices using NC where a destination UE moves between zones.

FIG. 13 shows a connection flow diagram 1300 illustrating an example of sidelink communication between UE 1302, UE 1304, encoder 1308, and encoder 1310 with a network entity 1306 that coordinates NC between the UE 1302, the UE 1304, the encoder 1308, and the encoder 1310. The UE 1302, UE 1304, network entity 1306, encoder 1308, and encoder 1310 may be similar to the UE 1002, the UE 1004, the network entity 1009, the encoder 1007, and the encoder 1027 in FIG. 10A, respectively. The network entity 1306 may coordinate NC between the encoder 1308 and the encoder 1310 when the UE 1304 moves from a zone covered by the encoder 1308 to a zone covered by the encoder 1310.

The encoder 1308 and the encoder 1310 may communicate with one another using PSCCH or PSFCH.

The UE 1304 may provide location information 1312 to the network entity 1306 via a first message, such as an uplink transmission. The location information 1312 may be associated with the UE 1304. This may allow the network entity 1306 to be aware of the moves of the UE 1304. The location information 1312 may include, for example, a BSR. The BSR may include, for example, a UE identifier (ID), a new zone ID (e.g., an identifier of the zone 1016 in FIG. 10A), a GNSS location, or a geographic location of the UE. The zone ID may be a lossy and/or compressed form of the GNSS location or geographic location of a UE. The UE 1304 may be configured to periodically provide the location information 1312 to the network entity 1306, or may be configured to provide the location information 1312 to the network entity 1306 in response to an event, such as a movement that meets or exceeds a threshold value (e.g., 20 m) from its last reported location.

The encoder 1308 may provide a location information 1313 to the network entity 1306 via a message, such as an uplink transmission. The location information 1313 may be associated with one or more UEs in SL communication with the encoder 1308. This may allow the network entity 1306 to be aware of the moves of any UE in SL communication with the encoder 1308. The location information 1313 may report the location of any UEs affiliated with the encoder 1308 (e.g., that communicated with the encoder 1308 within a threshold period of time, such as 10 seconds). The location information 1313 may include, for example, a zone ID, a GNSS location, a geographic location of each UE of the set of UEs affiliated with the encoder 1308. The zone ID may be a lossy and/or compressed form of the GNSS location or geographic location of a UE. The location information 1313 may also include a location of the encoder 1308. The encoder 1308 may be configured to periodically provide the location information 1313 to the network entity 1306, or may be configured to provide the location information 1313 to the network entity 1306 in response to an event, such as a movement of a UE or the encoder 1308 that meets or exceeds a threshold value (e.g., 20 m) from its last reported location. The location information 1313 may also include a number of UEs that the encoder 1308 is affiliated with in its zone, which may be used by the network entity 1306 to determine whether the encoder 1308 transmits the SL NC TB 1326 in addition to the encoder 1310 transmitting the SL NC TB 1332 (e.g., if the zone is particularly crowded).

At 1314, the network entity 1306 may determine a movement of the UE 1304 from a first zone to the second zone using at least a portion of one or both of the location information 1312 and/or the location information 1313. In one aspect, the network entity 1306 may process a plurality of received location information transmissions to create a map of moving UEs (e.g., vehicles) which the network entity 1306 may use to determine that a UE is moving from one zone to another zone. At 1314, the network entity 1306 may determine that the UE 1304 is moving from a zone of the encoder 1308 to a zone of the encoder 1310 using such a map.

In response to determining that the UE 1304 is moving from a zone of the encoder 1308 to a zone of the encoder 1310, the network entity 1306 may initialize a handover request. The network entity 1306 may transmit a handover request 1316 as a downlink transmission to the encoder 1310 (i.e., the destination encoder). The network entity 1306 may transmit a handover request 1317 as a downlink transmission to the encoder 1308 (i.e., the source encoder). The handover request 1316 and handover request 1317 may be the same or different. The handover request 1316 and/or 1317 may be in any suitable format, for example a DCI format or a MAC-CE format. The handover request 1316 and/or 1317 may be in the format of the NC handover request 800 in FIG. 8A. The handover request 1316 and/or 1317 may include an indication of the destination encoder, such as the encoder 1310. In one aspect, the handover request 1316 and/or 1317 may include a destination encoder field for the TB, for example an encoder ID of the encoder 1310. The handover request 1316 and/or 1317 may include an indication of a source encoder, such as the encoder 1308. In one aspect, the handover request 1316 and/or 1317 may include a source encoder field for the TB, for example an encoder ID of the encoder 1308. The handover request 1316 and/or 1317 may include an indication for the encoder 1308 to transmit the SL NC TB to the encoder 1310. In one aspect, the handover request 1316 and/or 1317 may include a bit to indicate that the encoder 1308 should transmit the TB to the encoder 1310 for NC purposes. For example, when the bit is set, the handover request 1316 and/or 1317 may indicate that the encoder 1308 should transmit the SL NC TB 1326 to the encoder 1310. The network entity 1306 may be configured to set the bit in response to the encoder 1310 not having the TB in its buffer. The network entity 1306 may know what the encoder 1310 has in its buffer based on previous transmissions with the encoder 1310. The handover request 1316 and/or 1317 may include an indication that the handover request 1316 and/or 1317, respectively is for NC purposes. In one aspect the handover request 1316 and/or 1317 may include a bit to indicate that the handover request 1316 and/or 1317, respectively, is for NC. The handover request 1316 and/or 1317 may include an indication for the encoder 1308 to transmit the SL NC TB to the UE. In one aspect, the handover request 1316 and/or 1317 may include an instruction to the encoder 1308 to transmit the SL NC TB 1326 to the UE 1304.

The handover request 1316 and/or 1317 may include a grant of an SL resource in at least one of time or frequency to the encoder 1310 and/or the encoder 1308, respectively. The network entity 1306 may provide the grant of the SL resource in a separate transmission. The grant of the SL resource may be a TDRA and/or an FDRA. The TDRA and/or the FDRA may indicate what resource the encoder 1310 may use to conduct NC containing the SL TB 1322 being handed over. The handover request 1316 and handover request 1317 may be transmitted by unicast to each of the encoder 1310 and the encoder 1308, respectively. If the handover request 1316 is identical to the handover request 1317, the handover requests may be transmitted by groupcast to the encoder 1310 and the encoder 1308. The handover request 1316 and the handover request 1317 may compose a groupcast or a broadcast transmission. In other words, the handover requests may be combined in a single transmission.

At 1318, the encoder 1310 may process the handover. The encoder 1310 may transmit a handover confirmation 1320 to the network entity 1306 in response to the handover request 1316. The encoder 1310 may also transmit a handover confirmation 1321 to the encoder 1308 in response to the handover request 1316, which may contain the same, or different, elements as the handover confirmation 1320. The handover confirmation 1320 and/or handover confirmation 1321 may be in the format of the confirmation message 820 in FIG. 8B. The handover confirmation 1320 and/or handover confirmation 1321 may be transmitted as a message, such as an uplink transmission to the network entity 1306.

The handover confirmation 1320 and/or handover confirmation 1321 may be transmitted in an uplink control information (UCI) format or a new format. The handover confirmation 1321 may be transmitted using an SL resource. While the handover confirmation 1321 and the handover confirmation 1321 are shown in connection flow diagram 1300 as being transmitted before the UE 1302 transmits the SL TB 1322, the handover confirmation 1321 and the handover confirmation 1321 may be transmitted after the encoder 1308 encodes the SL TB at 1324.

The handover confirmation 1320 and/or handover confirmation 1321 may include at least one of (a) an indication of acceptance for the NC handover request, (b) an indication of rejection for the NC handover request, (c) an indication of buffering of the SL NC TB, (d) an indication of no buffering of the SL NC TB, (e) an indication of a successful receipt of the SL NC TB, or (f) an indication of a failed receipt of the SL NC TB. The encoder 1310 may be configured to respond differently to an NC handover request than to other handover requests. The encoder 1310 may be configured to decline a handover request identified as an NC in the handover request 1316 based on the number of UEs associated with the encoder 1310 meeting or exceeding a lower threshold number and may be configured to decline a handover request identified as a different type of handover based on the number of UEs associated with the encoder 1310 meeting or exceeding a higher threshold number higher than the lower threshold number.

If the network entity 1306 receives a handover confirmation 1320 that indicates that the encoder 1310 cannot execute the NC handover (e.g., the network entity 1306 receives an indication of rejection for the NC handover request transmission, an indication of no buffering of the SL NC TB, or an indication of a failed receipt of the SL NC TB), the network entity 1306 may be configured to use a different encoder than the encoder 1310. The network entity 1306 may then transmit a new handover request similar to the handover request 1316 to the newly selected encoder. For example, the network entity 1306 may transmit the handover request 1338 to the encoder 1340. The encoder 1340 may also be in the second zone that the UE 1304 is traveling towards.

If the network entity 1306 receives a handover confirmation 1320 that indicates that the encoder 1310 can execute the NC handover, the network entity 1306 may be configured to output an SL resource grant 1335 to the encoder 1310 to transmit an SL NC TB if the SL resource grant was not included in the handover request 1316. The network entity 1306 may also output an SL resource grant 1336 to the encoder 1308 to transmit the SL NC TB 1326 to the encoder 1310. The encoder 1308 may have a more powerful transmitter or transceiver than the UE 1302 and the UE 1304, allowing the encoder 1308 to transmit the SL NC TB 1326 to wireless devices outside of the first zone.

At 1319, the encoder 1308 may process the handover request 1317 and/or the handover confirmation 1321. In one aspect, the encoder 1308 may receive an indication of buffering of the SL NC TB 1332 or may receive an indication of a successful receipt of the SL NC TB 1332. In response, the encoder 1308 may remove the TB from its buffer. In another aspect, the encoder 1308 may retransmit the SL NC TB 1326 as the SL NC TB 1330 to ensure that the encoder 1310 receives it. The encoder 1308 may transmit the SL TB 1322 as the SL TB s 1323 to the encoder 1310 along with an indication of an NC command for the encoder 1310 to encode the TB. The retransmission of the SL NC TB 1326 may contain at least a portion of the handover request 1317, allowing for the encoder 1310 to receive both the NC TB and the handover request if the encoder 1310 missed one or both. The handover request may contain a bit indicating an NC handover. The handover request may contain an encoder ID that indicates that the encoder 1310 should take over NC coding. This saves signaling, and gives another try from the original encoder to transmit the TB. If the encoder 1310 does not have the TB in its buffer, the encoder 1310 now has the TB.

The network entity 1306 may transmit an SL resource grant 1334 to the UE 1302 to transmit the SL TB 1322. The SL resource grant 1334 may enable the UE 1302 to transmit the SL TB 1322 to the UE 1304 and the encoder 1308 in the first zone. The UE 1302 may transmit the SL TB 1322. The UE 1304 may receive the SL TB 1322, which may be within range of the UE 1302 as it is moving to a different zone. The encoder 1308 may receive the SL TB 1322. The encoder 1308 may forward the SL TB 1322, along with any other TBs received by the encoder 1308 to allow the encoder 1310 to encode its own NC TB. If the encoder 1310 receives the SL TBs 1323, the encoder 1310 may encode the SL TB 1322 in lieu of the encoder 1308 at 1325. At 1324, in response to receiving the SL TB 1322 and/or the SL TB 1323, the encoder 1308 may encode the received SL TB with other TBs received by UEs in a zone of the encoder 1308. The SL NC TB 1326, the SL NC TB 1330, or the SL NC TB 1332 may be in the format of the SL NC TB 840 in FIG. 8C.

The encoder 1308 may transmit the SL NC TB 1326 to the UE 1304. However, the UE 1304 may not receive the SL NC TB 1326 as the UE 1304 is moving from one zone to another zone. The encoder 1308 may transmit the SL NC TB 1326 to the encoder 1310. The encoder may then buffer the TB to send to the UE 1304 when the UE 1304 moves into its zone.

The encoder 1310 may not have a TB in its buffer. This may occur if the encoder 1308 transmits the SL NC TB 1326 before the encoder processes the handover at 1318. If the encoder 1310 does not have a TB in its buffer, the encoder 1310 may transmit an SL request 1328 to the encoder 1308 to retransmit the SL NC TB 1326. In response to SL request 1328, the encoder 1308 may retransmit the SL NC TB 1326 as SL NC TB 1330 to the encoder 1310. The encoder 1310 may transmit the SL NC TB 1332 to the UE 1304, as the UE 1304 is moving to the zone of the encoder 1310. In one aspect, the encoder 1310 may wait for a time delay before transmitting the SL NC TB 1332 based on a predicted speed of the UE 1304 to ensure that the UE 1304 is in the zone before the encoder 1310 transmits the SL NC TB 1332.

The transmission of the SL NC TB 1326 from the encoder 1308 and the transmission of the SL NC TB 1332 from the encoder 1310 may be location based, distance based, and/or reference signal received power (RSRP) based. For example, while the UE 1304 is moving from the zone of the encoder 1308 to the zone of the encoder 1310, the encoder 1308 may use a distance or timing threshold to determine when to start or stop transmitting the SL NC TB 1326 to the UE 1304. In one aspect, if the encoder 1308 determines that the UE 1304 is within a threshold distance from the encoder 1308, the encoder may transmit the SL NC TB 1326 until the encoder 1308 determines that a location of the UE 1304 meets or is greater than a threshold distance from the encoder 1308. In another aspect, the encoder 1308 may be configured to transmit the SL NC TB 1326 at a first time (or after a threshold period of time has passed), and may be configured to stop transmitting the SL NC TB 1326 at a second time (or after a threshold period of time has passed). In another aspect, if the encoder 1308 determines that the UE 1304 has an RSRP value that meets or exceeds a threshold value, the encoder may transmit the SL NC TB 1326 until the encoder 1308 determines that the UE 1304 has an RSRP value that meets or is less than a threshold value. Such values may be calculated by the encoder 1308 or provided by the network entity 1306.

Similarly, in one aspect, while the UE 1304 is moving from the zone of the encoder 1308 to the zone of the encoder 1310, the encoder 1308 may use a distance or timing threshold to determine when to start transmitting the SL NC TB 1332 to the UE 1304. In one aspect, if the encoder 1310 determines that the distance of the UE 1304 from the encoder 1308 meets or exceeds a threshold distance, the encoder 1310 may start transmitting the SL NC TB 1332 to the UE 1304. In another aspect, if the encoder 1310 determines that the distance of the UE 1304 from the encoder 1310 meets or is less than a threshold distance, the encoder 1310 may start transmitting the SL NC TB 1332 to the UE 1304. In another aspect, the encoder 1310 may be configured to transmit the SL NC TB 1332 at a specified time (or after a threshold period of time has passed). In another aspect, if the encoder 1310 determines that the UE 1304 has an RSRP value that meets or exceeds a threshold value, the encoder 1310 may transmit the SL NC TB 1332 to the UE 1304. Such values may be calculated by the encoder 1308 or provided by the network entity 1306.

Figure 14:
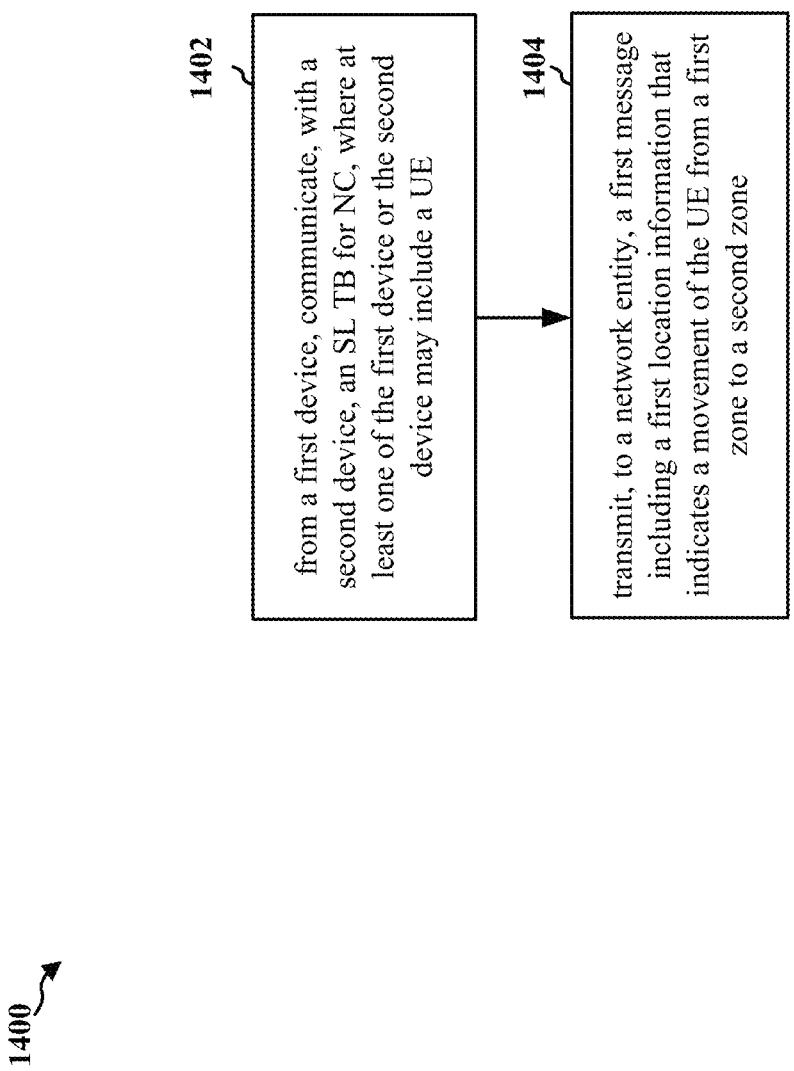
FIG. 14 is a flowchart of a method of wireless communication.

FIG. 14 is a flowchart 1400 of a method of wireless communication at a first device. The first device may be a UE (e.g., the UE 104, 350, 502, 504, 506, 508, 602, 604, 606, 608, 702, 704, 706, 708, 902, 904, 1002, 1004, 1006, 1102, 1104, 1202, 1204, 1206, 1302, 1304, the apparatus 2204). The first device may be an encoder (e.g., the encoder 152, 507, 707, 908, 1007, 1027, 1108, 1110, 1207, 1227, 1108, 1110). At 1402, the first device may communicate, with a second device, an SL TB for NC. At least one of the first device or the second device may include a UE. For example, 1402 may be performed by the UE 1102 in FIG. 11 that transmits an SL TB 1122 to the UE 1104, to the encoder 1108, and to the encoder 1110. The UE 1102 may be a UE. 1402 may also be performed by the encoder 1108 in FIG. 11 that transmits an SL NC TB 1126 to the UE 1104. The UE 1104 may be a UE. 1402 may also be performed by the component 198 of the apparatus 2204 in FIG. 22. 1402 may also be performed by the component 197 of the encoder 2450 in FIG. 24.

At 1404, the first device may transmit, to a network entity, a first message including a first location information that indicates a movement of the UE from a first zone to a second zone. For example, 1404 may be performed by the UE 1102 in FIG. 11 that transmits the location information 1112 to the network entity 1106. The location information 1112 may indicate a movement of the UE 1102 from a first zone to a second zone. 1404 may also be performed by the encoder 1108 that transmits the location information 1113 to the network entity 1106. The location information 1113 may indicate a movement of the UE 1102 from a first zone to a second zone. 1404 may also be performed by the component 198 of the apparatus 2204 in FIG. 22. 1404 may also be performed by the component 197 of the encoder 2450 in FIG. 24.

Figure 15:
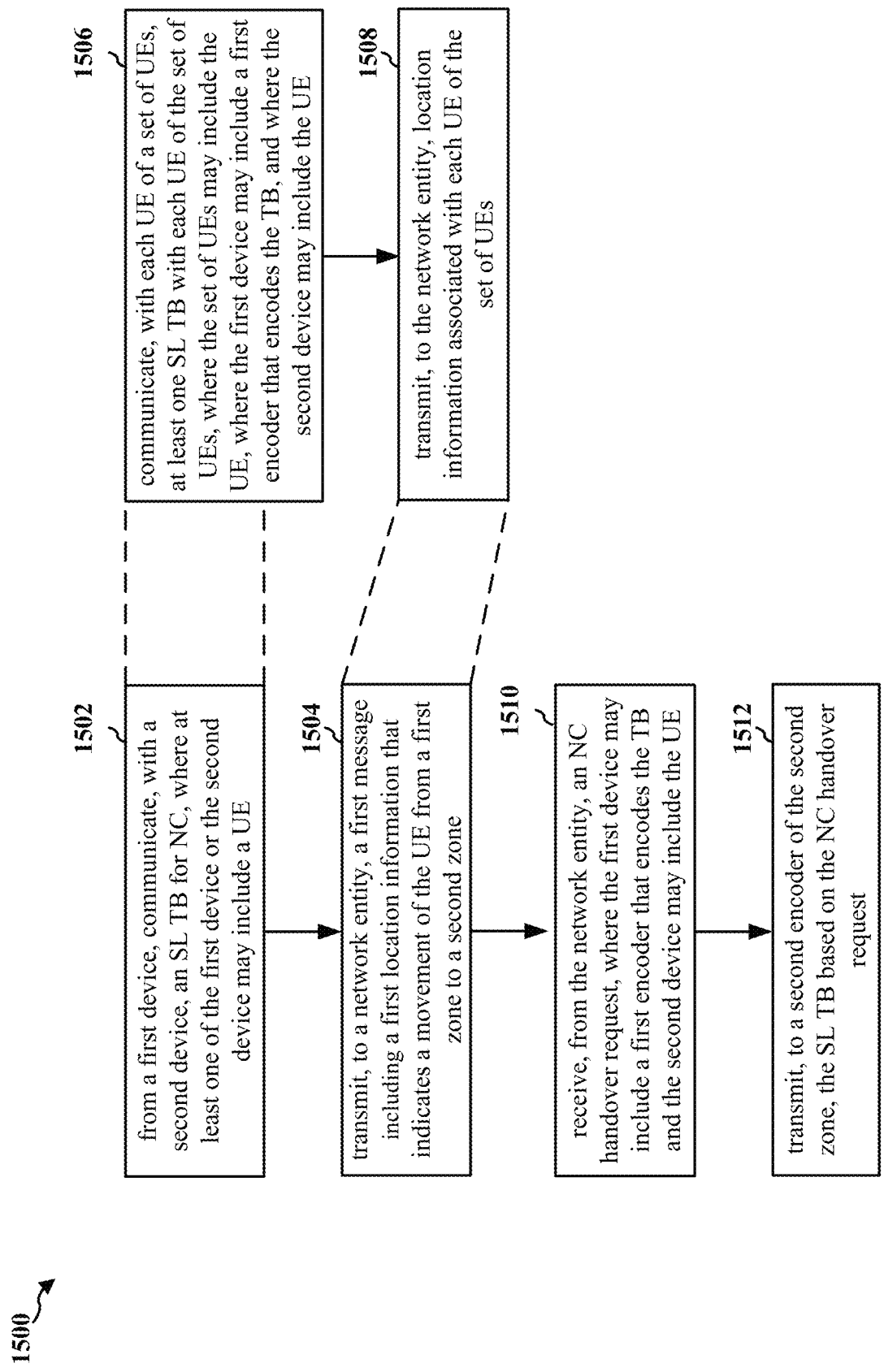
FIG. 15 is a flowchart of a method of wireless communication.

FIG. 15 is a flowchart 1500 of a method of wireless communication at a first device. The first device may be a UE (e.g., the UE 104, 350, 502, 504, 506, 508, 602, 604, 606, 608, 702, 704, 706, 708, 902, 904, 1002, 1004, 1006, 1102, 1104, 1202, 1204, 1206, 1302, 1304, the apparatus 2204). The first device may be an encoder (e.g., the encoder 152, 507, 707, 908, 1007, 1027, 1108, 1110, 1207, 1227, 1108, 1110). At 1502, the first device may communicate, with a second device, an SL TB for NC. At least one of the first device or the second device may include a UE. For example, 1502 may be performed by the UE 1102 in FIG. 11 that transmits an SL TB 1122 to the UE 1104, to the encoder 1108, and to the encoder 1110. The UE 1102 may be a UE. 1502 may also be performed by the encoder 1108 in FIG. 11 that transmits an SL NC TB 1126 to the UE 1104. The UE 1104 may be a UE. 1502 may also be performed by the component 198 of the apparatus 2204 in FIG. 22. 1502 may also be performed by the component 197 of the encoder 2450 in FIG. 24.

At 1504, the first device may transmit, to a network entity, a first message including a first location information that indicates a movement of the UE from a first zone to a second zone. For example, 1504 may be performed by the UE 1102 in FIG. 11 that transmits the location information 1112 to the network entity 1106. The location information 1112 may indicate a movement of the UE 1102 from a first zone to a second zone. 1504 may also be performed by the encoder 1108 that transmits the location information 1113 to the network entity 1106. The location information 1113 may indicate a movement of the UE 1102 from a first zone to a second zone. 1504 may also be performed by the component 198 of the apparatus 2204 in FIG. 22. 1504 may also be performed by the component 197 of the encoder 2450 in FIG. 24.

At 1506, the first device may communicate, with each UE of a set of UEs, at least one SL TB. The set of UEs may include the UE. The first device may include a first encoder that encodes the TB. The second device may include the UE. For example, 1506 may be performed by the encoder 1108 that may communicate with each UE of a set of UEs, such as the UE 1102 and the UE 1104. The encoder 1108 may receive an SL TB 1122 from the UE 1102. The encoder 1108 may transmit an SL NC TB to the UE 1104. The set of UEs may include the UE 1104. The first device may include the encoder 1108. The second device may include the UE 1104. 1506 may also be performed by the component 197 of the encoder 2450 in FIG. 24.

At 1508, the first device may transmit, to the network entity, location information associated with each UE of the set of UEs. For example, 1508 may be performed by the encoder 1108 that transmits the location information 1113 to the network entity 1106. The location information 1113 may include location information associated with each of the UE 1102 and the UE 1104 of the set of UEs. 1508 may also be performed by the component 197 of the encoder 2450 in FIG. 24.

At 1510, the first device may receive, from the network entity, an NC handover request. The first device may include a first encoder that encodes the TB and the second device may include the UE. For example, 1510 may be performed by the encoder 1108 that may receive the handover request 1117 from the network entity 1106. The first device may include the encoder 1108. The second device may include the UE 1102. 1510 may also be performed by the component 197 of the encoder 2450 in FIG. 24.

At 1512, the first device may transmit, to a second encoder of the second zone, the SL TB based on the NC handover request. For example, 1512 may be performed by the encoder 1108 that transmits the SL TB 1122 to the encoder 1110 based on the handover request 1117. 1512 may also be performed by the component 197 of the encoder 2450 in FIG. 24.

Figure 16:
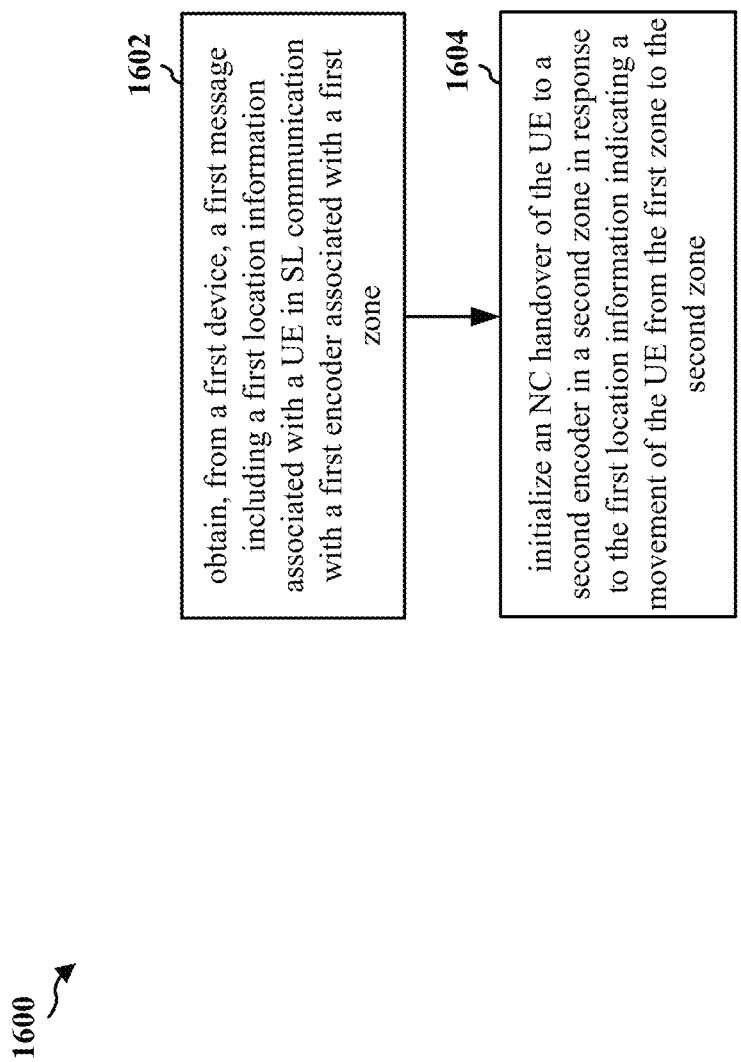
FIG. 16 is a flowchart of a method of wireless communication.

FIG. 16 is a flowchart 1600 of a method of wireless communication at a network entity. The method may be performed by a network entity (e.g., the base station 102, 310; the network entity 509, 609, 709, 906, 1009, 1106, 1209, 1306, 2202, 2302). At 1602, the network entity may obtain, from a first device, a first message including a first location information associated with a UE in SL communication with a first encoder associated with a first zone. For example, 1602 may be performed by the network entity 1106 in FIG. 11, which may obtain, from the UE 1102, a first message as the location information 1112. The location information 1112 may include a location of the UE 1102 involved in SL communication with the encoder 1108 in a first zone. 1602 may also be performed by the network entity 1106 in FIG. 11, which may obtain, from the encoder 1108 a first message as the location information 1113. The location information 1113 may include a location of the UE 1102 involved in SL communication with the encoder 1108 in a first zone. 1602 may also be performed by the component 199 in FIG. 23.

At 1604, the network entity may initialize an NC handover of the UE to a second encoder in a second zone in response to the first location information indicating a movement of the UE from the first zone to the second zone. For example, 1604 may be performed by the network entity 1106 in FIG. 11, which may initialize an NC handover of the UE 1102 from the encoder 1108 in a first zone to the encoder 1110 in a second zone in response to the location information 1112 and/or the location information 1113 indicating a movement of the UE 1102 from the first zone to the second zone. 1604 may also be performed by the component 199 in FIG. 23.

Figure 17:
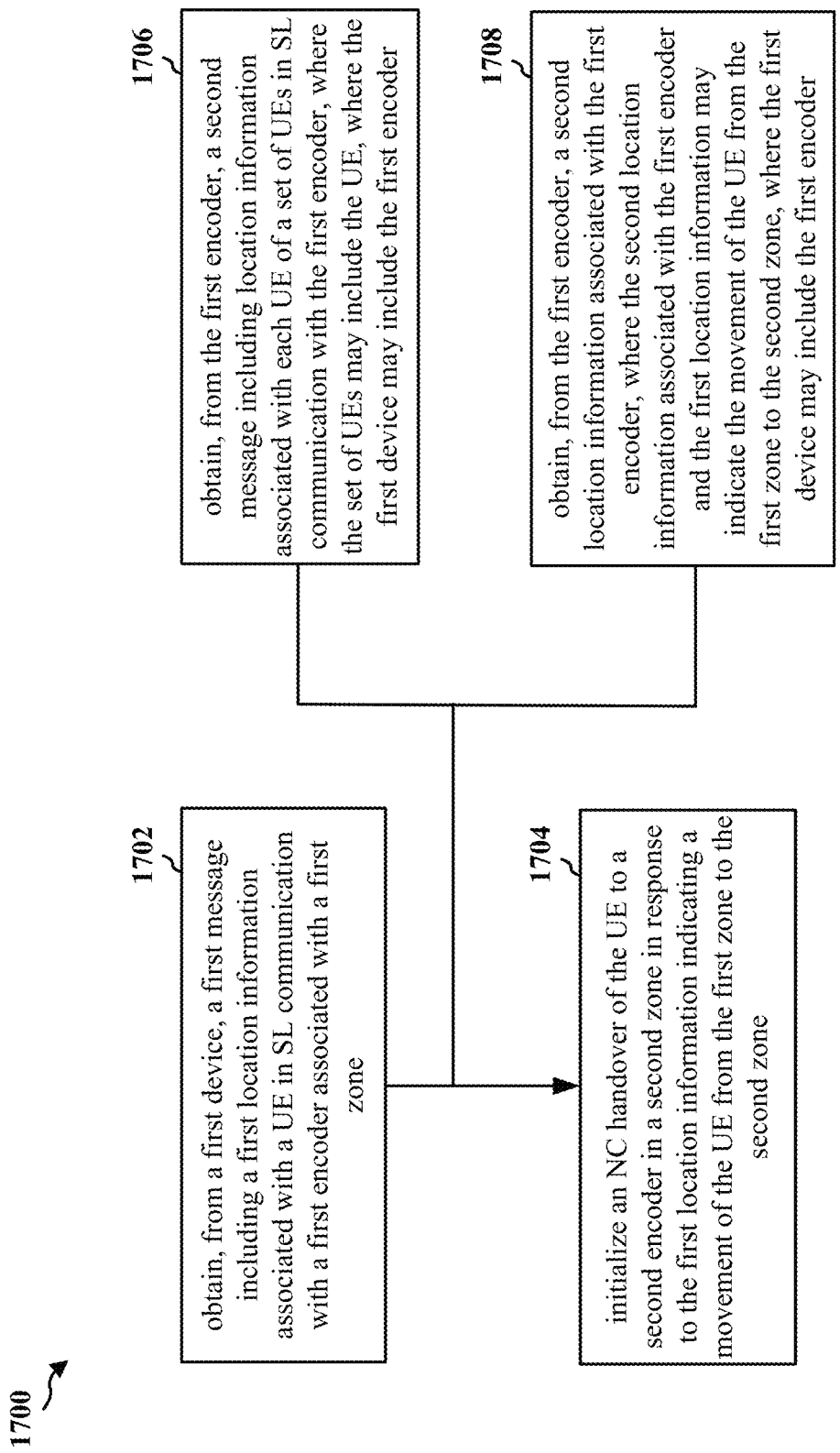
FIG. 17 is a flowchart of a method of wireless communication.

FIG. 17 is a flowchart 1700 of a method of wireless communication at a network entity. The method may be performed by a network entity (e.g., the base station 102, 310; the network entity 509, 609, 709, 906, 1009, 1106, 1209, 1306, 2202, 2302). At 1702, the network entity may obtain, from a first device, a first message including a first location information associated with a UE in SL communication with a first encoder associated with a first zone. For example, 1702 may be performed by the network entity 1106 in FIG. 11, which may obtain, from the UE 1102, a first message as the location information 1112. The location information 1112 may include a location of the UE 1102 involved in SL communication with the encoder 1108 in a first zone. 1702 may also be performed by the network entity 1106 in FIG. 11, which may obtain, from the encoder 1108 a first message as the location information 1113. The location information 1113 may include a location of the UE 1102 involved in SL communication with the encoder 1108 in a first zone. 1702 may also be performed by the component 199 in FIG. 23.

At 1704, the network entity may initialize an NC handover of the UE to a second encoder in a second zone in response to the first location information indicating a movement of the UE from the first zone to the second zone. For example, 1704 may be performed by the network entity 1106 in FIG. 11, which may initialize an NC handover of the UE 1102 from the encoder 1108 in a first zone to the encoder 1110 in a second zone in response to the location information 1112 and/or the location information 1113 indicating a movement of the UE 1102 from the first zone to the second zone. 1704 may also be performed by the component 199 in FIG. 23.

At 1706, the network entity may obtain, from the first encoder, a second message including location information associated with each UE of a set of UEs in SL communication with the first encoder. The set of UEs may include the UE. The first device may include the first encoder. For example, 1706 may be performed by the network entity 1106 in FIG. 11, which may obtain, from the encoder 1108, the location information 1113. The location information 1113 may be associated with each UE of a set of UEs in SL communication with the encoder 1108. The set of UEs may include the UE 1102 and the UE 1104. 1706 may also be performed by the component 199 in FIG. 23.

At 1708, the network entity may obtain, from the first encoder, a second location information associated with the first encoder. The second location information associated with the first encoder and the first location information may indicate the movement of the UE from the first zone to the second zone. The first device may include the first encoder. For example, 1708 may be performed by the network entity 1106 in FIG. 11, which may obtain, from the encoder 1108, the location information 1113 associated with the encoder 1108. The location information 1113 may be used with a previously transmitted location information 1113 (as the location information 1113 may be transmitted periodically), or the location information 1112 from the UE 1102, which may indicate the movement of the UE 1102 from the first zone to the second zone. 1708 may also be performed by the component 199 in FIG. 23.

Figure 18:
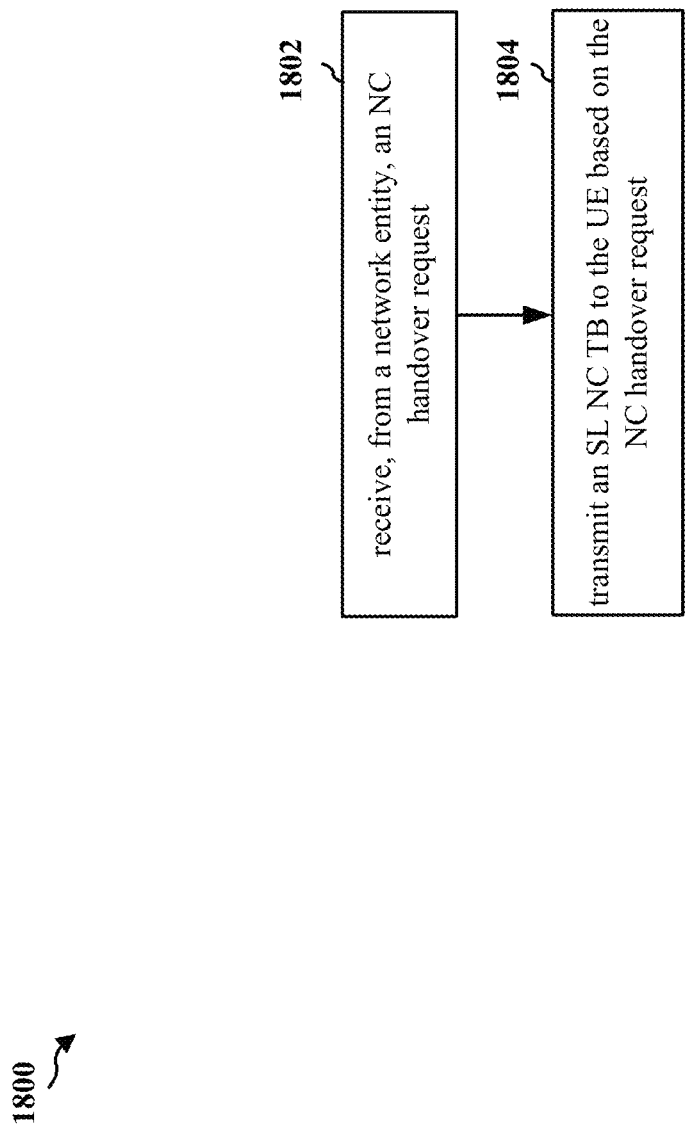
FIG. 18 is a flowchart of a method of wireless communication.

FIG. 18 is a flowchart 1800 of a method of wireless communication at a second encoder. The method may be performed by a second encoder (e.g., the encoder 152, 507, 707, 908, 1027, 1310, 1227, 1310). At 1802, the second encoder may receive, from a network entity, an NC handover request. For example, the encoder 1310 in FIG. 13 may receive, from the network entity 1306, a handover request 1316. The handover request 1316 may be a downlink transmission. 1802 may also be performed by the component 197 in FIG. 5.

At 1804, the destination encoder may transmit an SL NC TB to the UE based on the NC handover request. For example, 1804 may be performed by the encoder 1310 in FIG. 13, which may transmit an SL NC TB 1332 to the UE 1304 based on the handover request 1316. 1804 may also be performed by the component 197 in FIG. 5.

Figure 19:
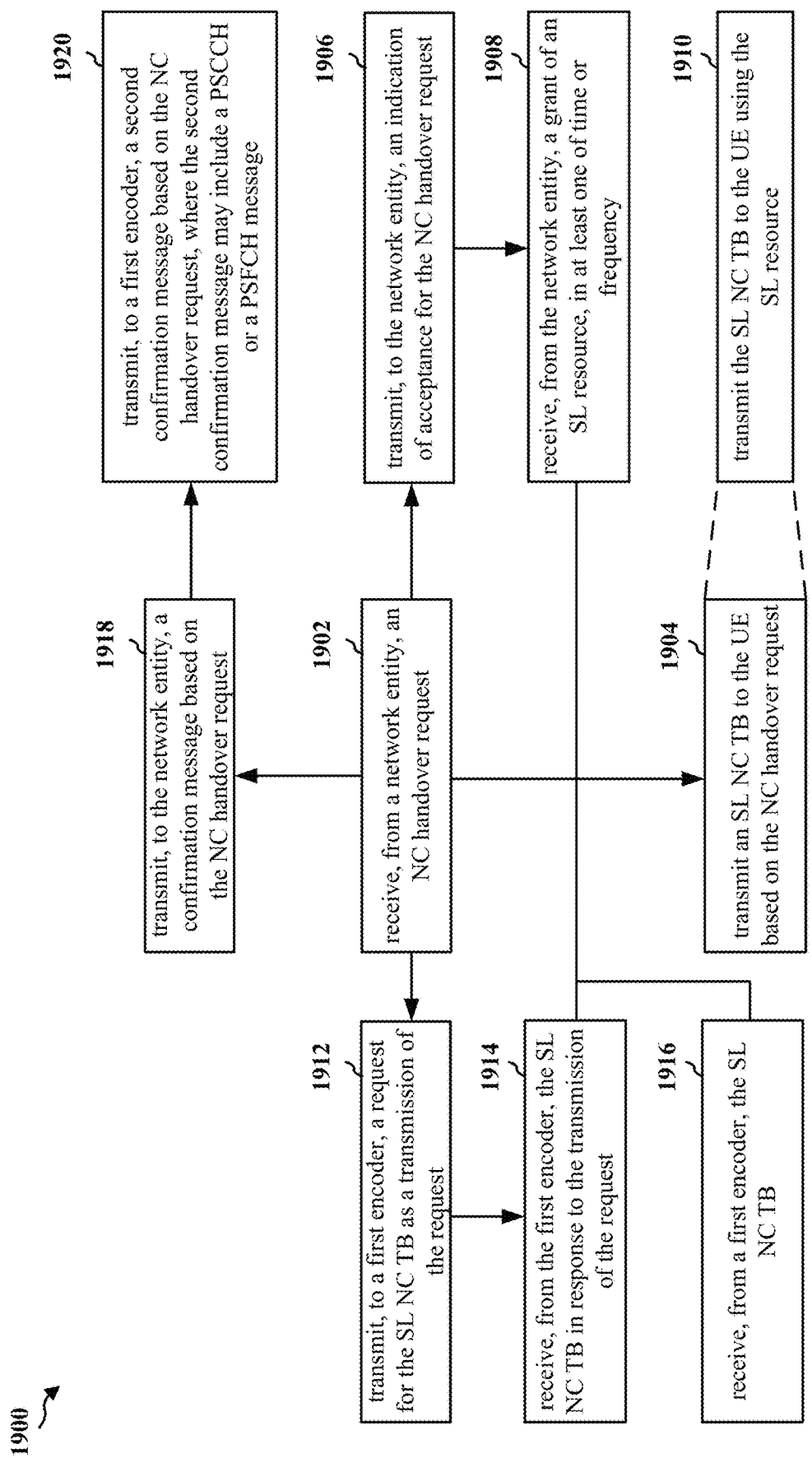
FIG. 19 is a flowchart of a method of wireless communication.

FIG. 19 is a flowchart 1900 of a method of wireless communication at a second encoder. The method may be performed by a second encoder (e.g., the encoder 152, 507, 707, 908, 1027, 1310, 1227, 1310). At 1902, the second encoder may receive, from a network entity, an NC handover request. For example, the encoder 1310 in FIG. 13 may receive, from the network entity 1306, a handover request 1316. The handover request 1316 may be a downlink transmission. 1902 may also be performed by the component 197 in FIG. 5.

At 1904, the second encoder may transmit an SL NC TB to the UE based on the NC handover request. For example, 1904 may be performed by the encoder 1310 in FIG. 13, which may transmit an SL NC TB 1332 to the UE 1304 based on the handover request 1316. 1904 may also be performed by the component 197 in FIG. 5.

At 1906, the second encoder may transmit, to the network entity, an indication of acceptance for the NC handover request. For example, 1906 may be performed by the encoder 1310 in FIG. 13, which may transmit, to the network entity 1306, an indication of acceptance for the handover request 1316 as the handover confirmation 1320. 1906 may also be performed by the component 197 in FIG. 5.

At 1908, the second encoder may receive, from the network entity, a grant of an SL resource, in at least one of time or frequency. For example, 1908 may be performed by the encoder 1310 in FIG. 13, which may receive, from the network entity 1306, a grant of an SL resource, in at least one of time or frequency, in the handover request 1316. 1908 may also be performed by the component 197 in FIG. 5.

At 1910, the second encoder may transmit the SL NC TB to the UE using the SL resource. For example, 1910 may be performed by the encoder 1310 in FIG. 13, which may transmit the SL NC TB 1332 to the UE 1304 using the SL resource provided by the grant in the handover request 1316. 1910 may also be performed by the component 197 in FIG. 5.

At 1912, the second encoder may transmit, to a first encoder, a request for the SL NC TB as a transmission of the request. For example, 1912 may be performed by the encoder 1310 in FIG. 13, which may transmit, to the encoder 1308, a request for the SL NC TB as the SL request 1328. The SL request 1328 may be a transmission of the handover request 1316. 1912 may also be performed by the component 197 in FIG. 5.

At 1914, the second encoder may receive, from the first encoder, the SL NC TB in response to the transmission of the request. For example, 1914 may be performed by the encoder 1310 in FIG. 13, which may receive, from the encoder 1308, the SL NC TB 1330 in response to the transmission of the SL request 1328. 1914 may also be performed by the component 197 in FIG. 5.

At 1916, the second encoder may receive, from a first encoder, the SL NC TB. For example, 1916 may be performed by the encoder 1310 in FIG. 13, which may receive, from the encoder 1308, the SL NC TB 1326. 1916 may also be performed by the component 197 in FIG. 5.

At 1918, the second encoder may transmit, to the network entity, a confirmation message based on the NC handover request. For example, 1918 may be performed by the encoder 1310 in FIG. 13, which may transmit, to the network entity 1306, a handover confirmation 1321, based on the handover request 1316. 1918 may also be performed by the component 197 in FIG. 5.

At 1920, the second encoder may transmit, to a first encoder, a second confirmation message based on the NC handover request. The second confirmation message may include a PSCCH or a PSFCH message. For example, 1920 may be performed by the encoder 1310 in FIG. 13, which may transmit, to the encoder 1308, a handover confirmation 1321 based on the handover request 1316. The handover confirmation 1321 may include a PSCCH or a PSFCH message. 1920 may also be performed by the component 197 in FIG. 5.

Figure 20:
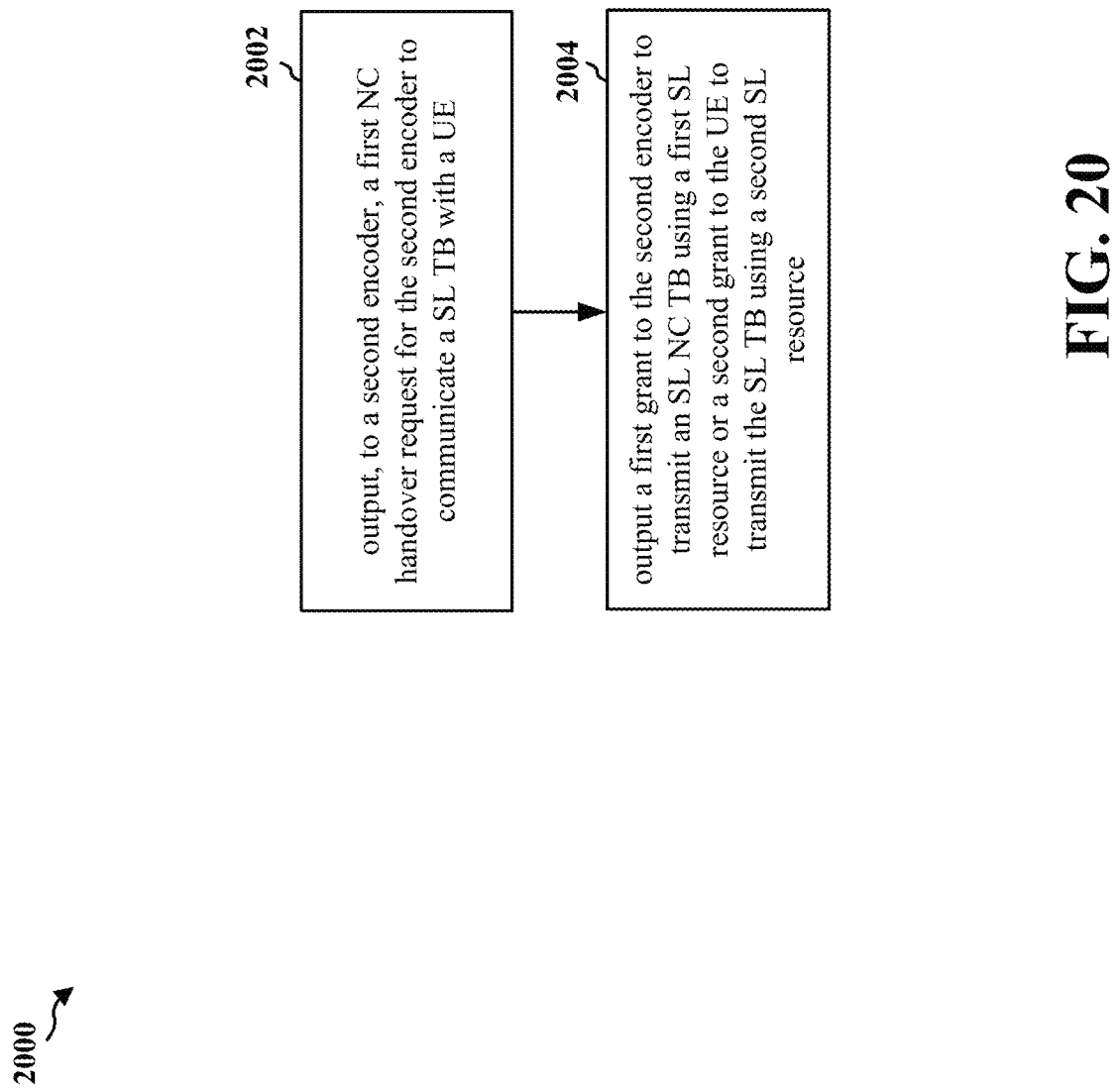
FIG. 20 is a flowchart of a method of wireless communication.

FIG. 20 is a flowchart 2000 of a method of wireless communication at a network entity. The method may be performed by a network entity (e.g., the base station 102, 310; the network entity 509, 609, 709, 906, 1009, 1106, 1209, 1306, 2202, 2302). At 2002, the network entity may output, to a second encoder, a first NC handover request for the second encoder to communicate a SL TB with a UE. For example, 2002 may be performed by the network entity 1306 in FIG. 13 which may output, to the encoder 1310, the handover request 1316 for the encoder 1310 to communicate an SL TB with the UE 1304. 2002 may also be performed by the component 199 in FIG. 23.

At 2004, the network entity may output a first grant to the second encoder to transmit an SL NC TB using a first SL resource or a second grant to the UE to transmit the SL TB using a second SL resource. For example, 2004 may be performed by the network entity 1306 in FIG. 13 which may output a first grant to the encoder 1310 in the handover request 1316 to transmit an SL NC TB 1332 using the first SL resource. In another aspect, the network entity 1106 may transmit a second grant to the UE 1102 to transmit the SL TB 1122 using the second SL resource. 2004 may also be performed by the component 199 in FIG. 23.

Figure 21:
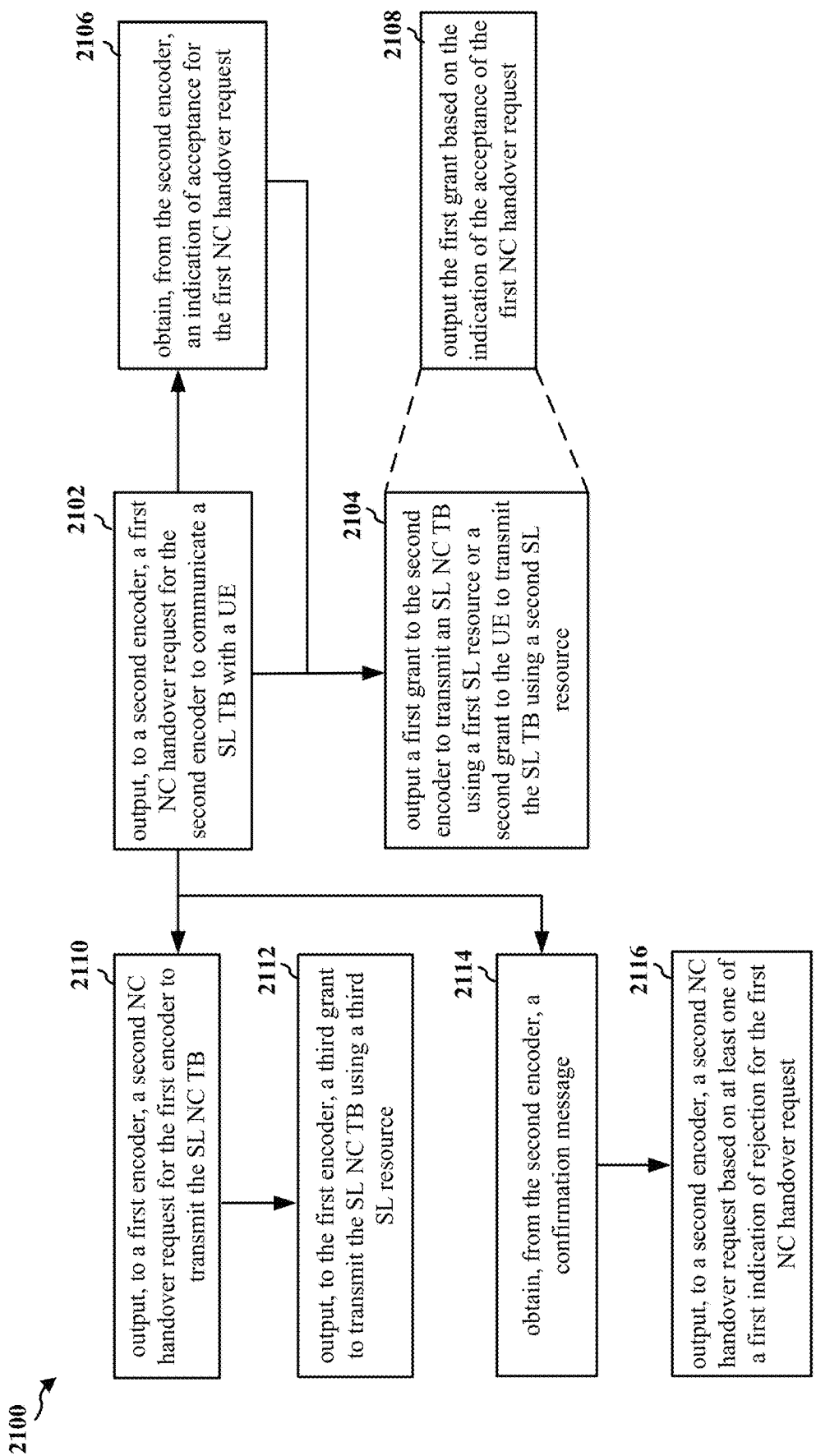
FIG. 21 is a flowchart of a method of wireless communication.

FIG. 21 is a flowchart 2100 of a method of wireless communication at a network entity. The method may be performed by a network entity (e.g., the base station 102, 310; the network entity 509, 609, 709, 906, 1009, 1106, 1209, 1306, 2202, 2302). At 2102, the network entity may output, to a second encoder, a first NC handover request for the second encoder to communicate a SL TB with a UE. For example, 2102 may be performed by the network entity 1306 in FIG. 13 which output, to the encoder 1310, the handover request 1316 for the encoder 1310 to communicate an SL TB with the UE 1304. 2102 may also be performed by the component 199 in FIG. 23.

At 2104, the network entity may output a first grant to the second encoder to transmit an SL NC TB using a first SL resource or a second grant to the UE to transmit the SL TB using a second SL resource. For example, 2104 may be performed by the network entity 1306 in FIG. 13 which may output a first grant to the encoder 1310 in the handover request 1316 to transmit an SL NC TB 1332 using the first SL resource. In another aspect, the network entity 1106 may transmit a second grant to the UE 1102 to transmit the SL TB 1122 using the second SL resource. 2104 may also be performed by the component 199 in FIG. 23.

At 2106, the network entity may obtain, from the second encoder or the UE, an indication of acceptance for the first NC handover request. For example, 2106 may be performed by the network entity 1306 in FIG. 13 which may obtain, from the encoder 1310, an indication of acceptance for the handover request 1316 as the handover confirmation 1320. 2106 may also be performed by the component 199 in FIG. 23.

At 2108, the network entity may output the first grant based on the indication of the acceptance for the first NC handover request. For example, 2108 may be performed by the network entity 1306 in FIG. 13 which may output the SL resource grant 1335 to the encoder 1310 based on the indication of the acceptance of the handover request 1316. 2108 may also be performed by the component 199 in FIG. 23.

At 2110, the network entity may output, to a first encoder, a second NC handover request for the first encoder to transmit the SL NC TB. For example, 2110 may be performed by the network entity 1306 in FIG. 13 which may output, to the encoder 1308, a handover request 1317 for the encoder 1308 to transmit the SL NC TB 1326 to the encoder 1310. 2110 may also be performed by the component 199 in FIG. 23.

At 2112, the network entity may output, to the first encoder, a third grant to transmit the SL NC TB using a third SL resource. For example, 2112 may be performed by the network entity 1306 in FIG. 13 which may output, to the encoder 1308, a grant to transmit the SL NC TB to the encoder 1310 using an SL resource. 2112 may also be performed by the component 199 in FIG. 23.

At 2114, the network entity may obtain, from the second encoder, a confirmation message. For example, 2114 may be performed by the network entity 1306 in FIG. 13 which may obtain, from the encoder 1310, the handover confirmation 1320. 2114 may also be performed by the component 199 in FIG. 23.

At 2116, the network entity may output, to a second encoder, a second NC handover request based on at least one of a first indication of rejection for the first NC handover request. For example, 2116 may be performed by the network entity 1306 in FIG. 13 which may output, to the encoder 1340, a handover request 1338 based on indication of rejection for the handover request 1316. 2116 may also be performed by the component 199 in FIG. 23.

FIG. 21 is a flowchart 2100 of a method of wireless communication. The method may be performed by a base station (e.g., the base station 102, 310; the network entity 509, 609, 709, 906, 1009, 1106, 1209, 1306, 2202, 2302). At 2102, the network entity may output, to a second encoder, a first NC handover request for the second encoder to communicate an SL TB with a UE. For example, the network entity 1306 in FIG. 13 may output, to the encoder 1310, a handover request 1316 for the encoder 1310 to transmit or receive an SL NC TB 1326, 1330, or 1332 for NC to or from a UE 1304, respectively. The handover request 1316 may be a downlink transmission. 2102 may also be performed by the component 199 in FIG. 23.

At 2104, the network entity may output a first grant to the second encoder to transmit an SL NC TB using a first SL resource or a second grant to the UE to transmit the SL TB using a second SL resource. For example, 2104 may be performed by the network entity 1306 in FIG. 13, which may output, to the encoder 1310, a first grant to transmit the SL NC TB 1332 using an SL resource in the handover request 1316. 2104 may also be performed by the network entity 1306 in FIG. 13, which may output, to the UE 1302, a grant to transmit the SL TB 1322 to the encoder 1310. 2104 may also be performed by the component 199 in FIG. 23.

Figure 22:
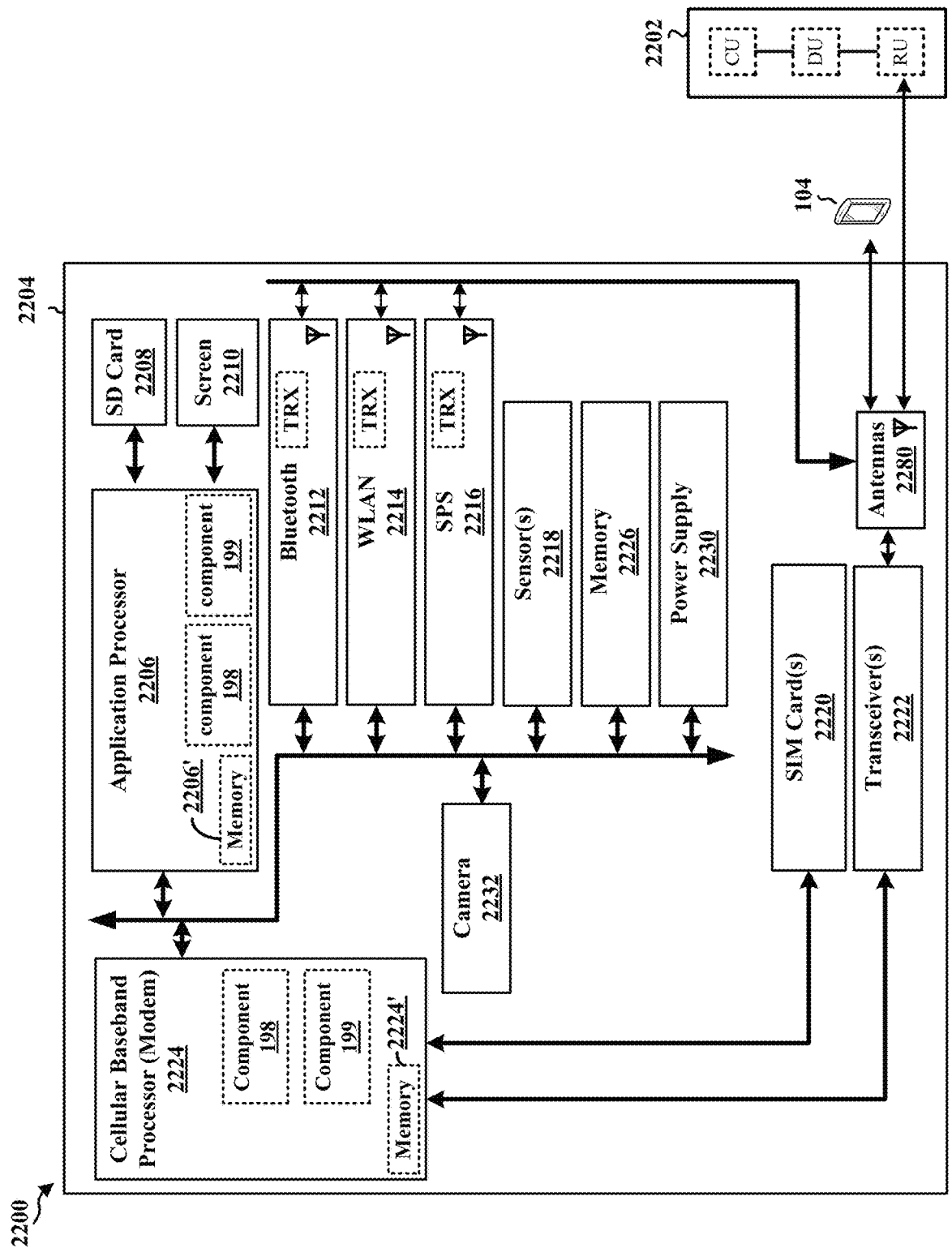
FIG. 22 is a diagram illustrating an example of a hardware implementation for an example apparatus and/or network entity.

FIG. 22 is a diagram 2200 illustrating an example of a hardware implementation for an apparatus 2204. The apparatus 2204 may be a UE, a component of a UE, or may implement UE functionality. In some aspects, the apparatus 2204 may include a cellular baseband processor 2224 (also referred to as a modem) coupled to one or more transceivers 2222 (e.g., cellular RF transceiver). The cellular baseband processor 2224 may include on-chip memory 2224'. In some aspects, the apparatus 2204 may further include one or more subscriber identity modules (SIM) cards 2220 and an application processor 2206 coupled to a secure digital (SD) card 2208 and a screen 2210. The application processor 2206 may include on-chip memory 2206'. In some aspects, the apparatus 2204 may further include a Bluetooth module 2212, a WLAN module 2214, an SPS module 2216 (e.g., GNSS module), one or more sensor modules 2218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2226, a power supply 2230, and/or a camera 2232. The Bluetooth module 2212, the WLAN module 2214, and the SPS module 2216 may include an on-chip transceiver (TRX) (or in some cases, just a receiver (RX)). The Bluetooth module 2212, the WLAN module 2214, and the SPS module 2216 may include their own dedicated antennas and/or utilize the antennas 2280 for communication. The cellular baseband processor 2224 communicates through the transceiver(s) 2222 via one or more antennas 2280 with the UE 104 and/or with an RU associated with a network entity 2202. The cellular baseband processor 2224 and the application processor 2206 may each include a computer-readable medium/memory 2224', 2206', respectively. The additional memory modules 2226 may also be considered a computer-readable medium/memory. Each computer-readable medium/memory 2224', 2206', 2226 may be non-transitory. The cellular baseband processor 2224 and the application processor 2206 are each responsible for general processing, including the execution of software stored on the computer-readable medium/memory. The software, when executed by the cellular baseband processor 2224/application processor 2206, causes the cellular baseband processor 2224/application processor 2206 to perform the various functions described supra. The computer-readable medium/memory may also be used for storing data that is manipulated by the cellular baseband processor 2224/application processor 2206 when executing software. The cellular baseband processor 2224/application processor 2206 may be a component of the UE 350 and may include the memory 360 and/or at least one of the Tx processor 368, the Rx processor 356, and the controller/processor 359. In one configuration, the apparatus 2204 may be a processor chip (modem and/or application) and include just the cellular baseband processor 2224 and/or the application processor 2206, and in another configuration, the apparatus 2204 may be the entire UE (e.g., see UE 350 of FIG. 3) and include the additional modules of the apparatus 2204.

As discussed supra, the component 198 is configured to communicate an SL TB with a second device for NC. At least one of the first device or the second device may include a UE. Communicating an SL TB with a device may include transmitting the SL TB to the device, or receiving the SL TB from the device. The component 198 may be configured to transmit, to a network entity, a first message including a first location information that indicates a movement of the UE from a first zone to a second zone. The component 198 may be within the cellular baseband processor 2224, the application processor 2206, or both the cellular baseband processor 2224 and the application processor 2206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2204 may include a variety of components configured for various functions. In one configuration, the apparatus 2204, and in particular the cellular baseband processor 2224 and/or the application processor 2206, includes means for transmitting or receive an SL TB to or from a second device for NC, respectively, where at least one of the first device and the second device include a UE, means for transmitting, to a network entity, a first message including a location that indicates a movement of the UE from a first transmission zone to a second transmission zone, means for communicating an SL TB with a second device for NC, means for transmitting, to a network entity, a first message including a first location information that indicates a movement of the UE from a first zone to a second zone, means for communicating at least one SL TB with each UE of a set of UEs, means for transmitting, to the network entity, location information associated with each UE of the set of UEs, means for transmitting, to the network entity, a second location information associated with the first encoder, means for receiving, from the network entity, an NC handover request, means for transmitting, to a second encoder of the second zone, the SL TB based on the NC handover request, means for communicating an SL TB with a second device for NC. At least one of the first device or the second device may include a UE, means for transmitting, to a network entity, a first message including a first location information that indicates a movement of the UE from a first zone to a second zone, means for communicating the SL TB for NC by communicating at least one SL TB with each UE of a set of UEs, means for transmitting the first message including the first location information by transmitting, to the network entity, location information associated with each UE of the set of UEs, means for transmitting, to the network entity, a second location information associated with the first encoder, means for receiving, from the network entity, an NC handover request, or means for transmitting, to a second encoder of the second zone, the SL TB based on the NC handover request. The means may be the component 198 of the apparatus 2204 configured to perform the functions recited by the means. As described supra, the apparatus 2204 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 23:
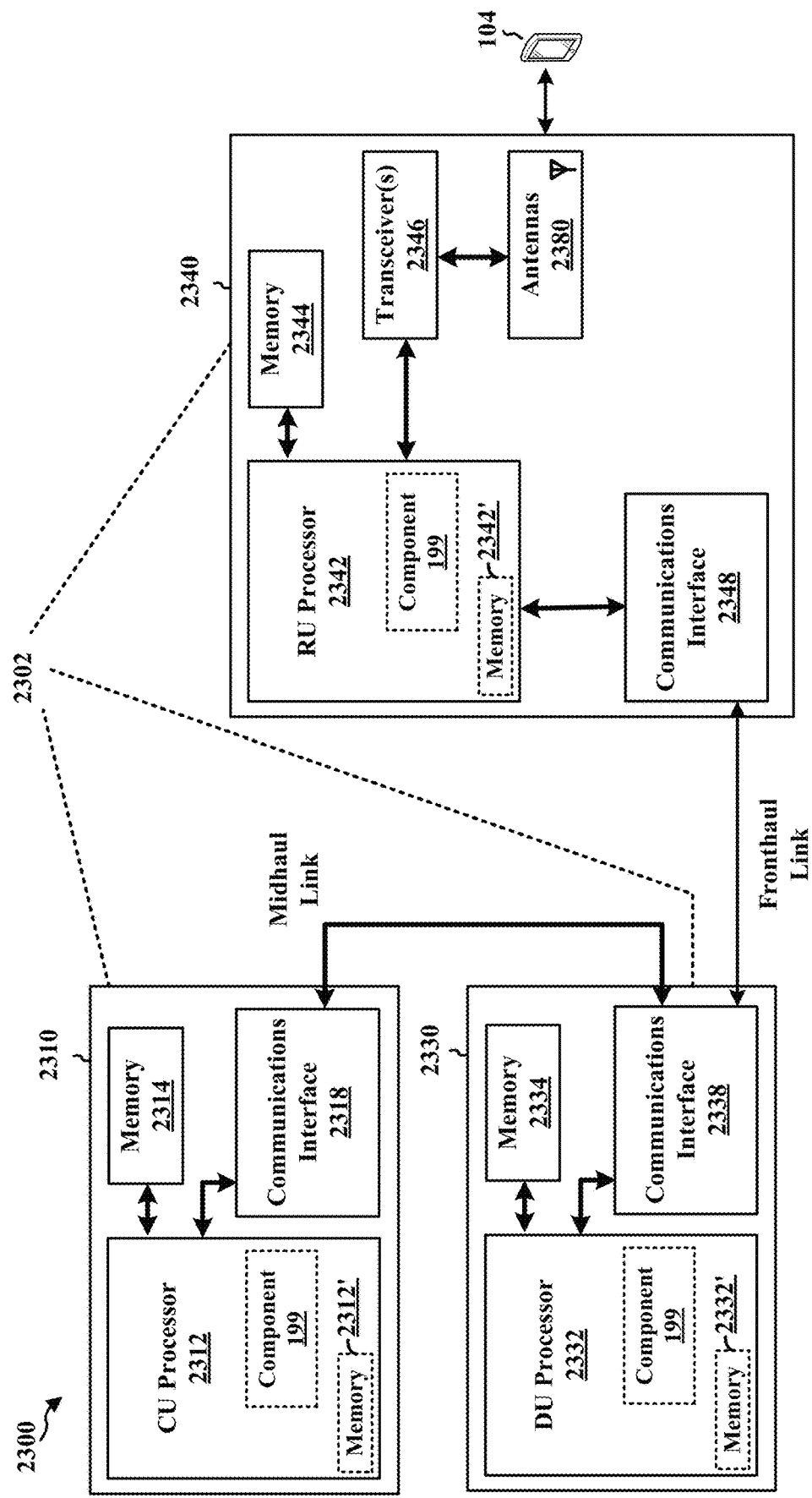
FIG. 23 is a diagram illustrating an example of a hardware implementation for an example network entity.

FIG. 23 is a diagram 2300 illustrating an example of a hardware implementation for a network entity 2302. The network entity 2302 may be a BS, a component of a BS, or may implement BS functionality. The network entity 2302 may include at least one of a CU 2310, a DU 2330, or an RU 2340. For example, depending on the layer functionality handled by the component 199, the network entity 2302 may include the CU 2310; both the CU 2310 and the DU 2330; each of the CU 2310, the DU 2330, and the RU 2340; the DU 2330; both the DU 2330 and the RU 2340; or the RU 2340. The CU 2310 may include a CU processor 2312. The CU processor 2312 may include on-chip memory 2312'. In some aspects, the CU 2310 may further include additional memory modules 2314 and a communications interface 2318. The CU 2310 communicates with the DU 2330 through a midhaul link, such as an F1 interface. The DU 2330 may include a DU processor 2332. The DU processor 2332 may include on-chip memory 2332'. In some aspects, the DU 2330 may further include additional memory modules 2334 and a communications interface 2338. The DU 2330 communicates with the RU 2340 through a fronthaul link. The RU 2340 may include an RU processor 2342. The RU processor 2342 may include on-chip memory 2342'. In some aspects, the RU 2340 may further include additional memory modules 2344, one or more transceivers 2346, antennas 2380, and a communications interface 2348. The RU 2340 communicates with the UE 104. The on-chip memory 2312', 2332', 2342' and the additional memory modules 2314, 2334, 2344 may each be considered a computer-readable medium/memory. Each computer-readable medium/memory may be non-transitory. Each of the processors 2312, 2332, 2342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to obtain, from a first device, a first message including a first location information associated with a UE in SL communication with a first encoder associated with a first zone. The component 199 may be configured to initialize an NC handover of the UE to a second encoder in a second zone in response to the first location information indicating a movement of the UE from the first zone to the second zone. The component 199 may be configured to output, to a second encoder, a first NC handover request for the second encoder to communicate an SL TB with a UE. The component 199 may be configured to output a first grant to the second encoder to transmit an SL NC TB using a first SL resource or a second grant to the UE to transmit the SL TB using a second SL resource. The component 199 may be within one or more processors of one or more of the CU 2310, DU 2330, and the RU 2340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2302 may include a variety of components configured for various functions. In one configuration, the network entity 2302 includes means for obtaining, from a first device, a first message including a location of a UE involved in SL communication with a first encoder in a first transmission zone, means for initializing an NC handover of the UE to a second encoder in a second transmission zone in response to the location indicating a movement of the UE from the first transmission zone to the second transmission zone, means for obtaining, from the first encoder, a set of locations including location information for each of a set of UEs in SL communication with the first encoder, where the set of UEs include the UE, means for obtaining, from the first encoder, location information for the first encoder, where the location of the first encoder and the first message indicates the movement of the UE from the first transmission zone to the second transmission zone, means for outputting, to a destination encoder, a first NC handover request for the destination encoder to transmit or receive an SL TB for NC to or from a UE, respectively, means for outputting, to one of the destination encoder or the UE, a first grant to transmit an SL NC TB using an SL resource, means for outputting, to a source encoder, a second NC handover request for the source encoder to transmit the SL NC TB, means for outputting, to the source encoder, a second grant to transmit the SL NC TB using a second SL resource, means for obtaining, from the destination encoder or the UE, an indication of acceptance for the first NC handover request, where outputting the grant to transmit the SL NC TB using the SL resource is in response to obtaining the indication of the acceptance for the first NC handover request, means for obtaining, from the destination encoder, a confirmation message, means for outputting, to a second destination encoder, a second NC handover request for the second destination encoder to transmit or receive the SL TB for NC to or from the UE, respectively in response to receiving at least one of a first indication of rejection for the first NC handover request, a second indication of no buffering of the SL NC TB, or a third indication of a failed receipt of the SL NC TB, means for obtaining, from a first device, a first message including a first location information associated with a UE in SL communication with a first encoder associated with a first zone, means for initializing an NC handover of the UE to a second encoder in a second zone in response to the first location information indicating a movement of the UE from the first zone to the second zone, means for obtaining, from the first encoder, a second message including location information associated with each UE of a set of UEs in SL communication with the first encoder, means for obtaining, from the first encoder, a second location information associated with the first encoder, means for outputting, to a second encoder, a first NC handover request for the second encoder to communicate an SL TB with a UE, means for outputting a first grant to the second encoder to transmit an SL NC TB using a first SL resource or a second grant to the UE to transmit the SL TB using a second SL resource, means for outputting, to a first encoder, a second NC handover request for the first encoder to transmit the SL NC TB. The method may include outputting, to the first encoder, a third grant to transmit the SL NC TB using a third SL resource, means for obtaining, from the second encoder or the UE, an indication of acceptance for the first NC handover request, means for outputting the first grant to transmit the SL NC TB using the first SL resource by outputting the first grant based on the indication of the acceptance for the first NC handover request, means for obtaining, from the second encoder, a confirmation message, means for obtaining, from the second encoder, a confirmation message, means for obtaining, from a first device, a first message including a first location information associated with a UE in SL communication with a first encoder associated with a first zone, means for initializing an NC handover of the UE to a second encoder in a second zone in response to the first location information indicating a movement of the UE from the first zone to the second zone, means for obtaining, from the first encoder, a second message including location information associated with each UE of a set of UEs in SL communication with the first encoder, means for obtaining, from the first encoder, a second location information associated with the first encoder, means for outputting, to a second encoder, a first NC handover request for the second encoder to communicate an SL TB with a UE, means for outputting a first grant to the second encoder to transmit an SL NC TB using a first SL resource or a second grant to the UE to transmit the SL TB using a second SL resource, means for outputting, to a first encoder, a second NC handover request for the first encoder to transmit the SL NC TB, means for outputting, to the first encoder, a third grant to transmit the SL NC TB using a third SL resource, means for outputting, to a first encoder, a second NC handover request for the first encoder to transmit the SL NC TB, means for outputting, to the first encoder, a third grant to transmit the SL NC TB using a third SL resource, means for obtaining, from the second encoder, an indication of acceptance for the first NC handover request, means for outputting the first grant to transmit the SL NC TB using the first SL resource by outputting the first grant based on the indication of the acceptance for the first NC handover request, means for obtaining, from the second encoder, a confirmation message, or means for outputting, to a second encoder, a second NC handover request based on a first indication of rejection for the first NC handover request. The means may be the component 199 of the network entity 2302 configured to perform the functions recited by the means. As described supra, the network entity 2302 may include the Tx processor 316, the Rx processor 370, and the controller/processor 375. As such, in one configuration, the means may be the Tx processor 316, the Rx processor 370, and/or the controller/processor 375 configured to perform the functions recited by the means.

As discussed supra, the component 197 in FIG. 5 is configured to receive, from a network entity, an NC handover request. The component 197 may be further configured to transmit an SL NC TB to the UE based on the NC handover request. The component 197 may be within a processor. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. The encoder 507 may include a variety of components configured for various functions. In one configuration, the encoder 507 includes means for transmitting or receiving an SL TB with a UE for NC, means for transmitting, to a network entity, a first message including a location that indicates a movement of the UE from a first transmission zone to a second transmission zone, means for transmitting or receiving at least one SL transmission with each of a set of UEs, where the set of UEs include the UE, means for transmitting, to the network entity, a set of locations including location information for each of the set of UEs, means for receiving, from the network entity, an NC handover request, means for transmitting, to a second encoder of the second transmission zone, the SL TB for the NC based on the NC handover request, means for receiving, from a network entity, an NC handover request, means for transmitting an SL NC TB to the UE based on the NC handover request, means for transmitting, to the network entity, an indication of acceptance for the NC handover request, means for receiving, from the network entity, a grant of an SL resource, in at least one of time or frequency, in response to the indication of the acceptance, where transmitting the SL NC TB with the UE includes transmitting the SL NC TB with the UE using the SL resource, means for transmitting, to a source encoder, a request for the SL NC TB, means for receiving, from the source encoder, the SL NC TB in response to the request, means for transmitting, to the network entity, a confirmation message in response to the NC handover request, means for transmitting, to a source encoder, a second confirmation message in response to the NC handover request, where the second confirmation message includes a PSCCH or a PSFCH message, means for receiving, from a source encoder, the SL NC TB, means for receiving, from a network entity, a NC handover request, means for transmitting a SL NC TB to a UE based on the NC handover request, means for receiving the NC handover request by receiving at least one of DCI, a MAC-CE, or an RRC including the NC handover request, means for transmitting, to the network entity, an indication of acceptance for the NC handover request, means for receiving, from the network entity, a grant of an SL resource, in at least one of time or frequency, means for transmitting the SL NC TB to the UE based on the NC handover request by transmitting the SL NC TB to the UE using the SL resource, means for transmitting, to a first encoder, a request for the SL NC TB, means for receiving, from the first encoder, the SL NC TB in response to transmitting the request, means for transmitting, to the network entity, a confirmation message based on the NC handover request, or means for transmitting, to a first encoder, a second confirmation message based on the NC handover request. The means may be the component 197 of the encoder 507 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a first device, including transmitting or receiving, an SL TB for NC to or from a second device, respectively. At least one of the first device and the second device may include a UE. The method may also include transmitting, to a network entity, a first message including a location that indicates a movement of the UE from a first transmission zone to a second transmission zone.

Aspect 2 is the method of aspect 1, where the first device may include the UE. The second device may include a first encoder of the first transmission zone.

Aspect 3 is the method of aspect 2, where the first message may include a BSR that indicates the location of the UE.

Aspect 4 is the method of any of aspects 1 to 3, where the uplink transmission may include a UE ID, a zone ID, or a GNSS location of the UE.

Aspect 5 is the method of aspect 1, where the first device may include a first encoder that network codes the SL TB. The second device may include the UE Aspect 6 is the method of aspect 5, further including transmitting or receiving at least one SL transmission to or from each UE of a set of UEs, respectively. The set of UEs may include the UE. The method may further include transmitting, to the network entity, a set of locations having a location for each of the set of UEs.

Aspect 7 is the method of any of aspects 5 to 6, further including transmitting, to the network entity, a location of the first encoder Aspect 8 is the method of any of aspects 5 to 7, further including receiving, from the network entity, an NC handover request n. The method may further include transmitting, to a second encoder of the second transmission zone, the SL TB for NC based on the NC handover request n.

Aspect 9 a method of wireless communication at a network entity, including obtaining, from a first device, an uplink transmission including a location of a UE involved in SL communication with a first encoder in a first transmission zone. The method may further include initializing an NC handover of the UE to a second encoder in a second transmission zone in response to the location indicating a movement of the UE from the first transmission zone to the second transmission zone.

Aspect 10 is the method of aspect 9, where the first device may include the UE.

Aspect 11 is the method of aspect 10, where the uplink transmission may include a BSR that has the location.

Aspect 12 is the method of any of aspects 9 to 11, where the uplink transmission may include a UE ID, a zone ID, or a GNSS location of the UE.

Aspect 13 is the method of any of aspects 9 or 12, where the first device may include the first encoder.

Aspect 14 is the method of aspect 13, further including obtaining, from the first encoder, a set of locations having location information for each of a set of UEs in SL communication with the first encoder. The set of UEs may include the UE.

Aspect 15 is the method of any of aspects 13 to 14, further including obtaining, from the first encoder, location information for the first encoder. The location of the first encoder and the uplink transmission may indicate the movement of the UE from the first transmission zone to the second transmission zone.

Aspect 16 is a method of wireless communication at a destination encoder. Network encoding for a UE may be handed over to the destination encoder. The method may include receiving, from a network entity, an NC handover request n. The method may further include transmitting an SL NC TB to the UE based on the NC handover request.

Aspect 17 is the method of aspect 16, where the NC handover request may include a DCI transmission, a MAC-CE transmission, or an RRC transmission.

Aspect 18 is the method of any of aspects 16 to 17, where the NC handover request may include at least one of (a) a first indication of the destination encoder, (b) a second indication of a source encoder, (c) a third indication for the source encoder to transmit the SL NC TB to the destination encoder, or (d) a fourth indication for the source encoder to transmit the SL NC TB to the UE.

Aspect 19 is the method of any of aspects 16 to 18, where the NC handover request may include a first indication for a source encoder to transmit the SL NC TB to the destination encoder and a second indication that the SL NC TB includes an NC transmission.

Aspect 20 is the method of any of aspects 16 to 19, where the NC handover request may include a grant of an SL resource in at least one of time or frequency. Transmitting the SL NC TB with the UE may include transmitting the SL NC TB with the UE using the SL resource.

Aspect 21 is the method of any of aspects 16 to 20, further including transmitting, to the network entity, an indication of acceptance for the NC handover request. The method may also include receiving, from the network entity, a grant of an SL resource in at least one of time or frequency. The grant of the SL resource may be received in response to the indication of the acceptance. Transmitting the SL NC TB with the UE may include transmitting the SL NC TB with the UE using the SL resource.

Aspect 22 is the method of any of aspects 16 to 21, where the NC handover request may include at least one of a unicast transmission, a groupcast transmission, or a broadcast transmission.

Aspect 23 is the method of any of aspects 16 to 22, further including transmitting, to a second encoder, a request for the SL NC TB. The method may further include receiving, from the second encoder, the SL NC TB in response to the request.

Aspect 24 is the method of any of aspects 16 to 23, further including transmitting, to the network entity, a confirmation message in response to the NC handover request.

Aspect 25 is the method of aspect 24, where the confirmation message may include a UCI format.

Aspect 26 is the method of aspect 25, where the confirmation message may include at least one of (a) a first indication of acceptance for the NC handover request, (b) a second indication of rejection for the NC handover request, (c) a third indication of buffering of the SL NC TB, (d) a fourth indication of no buffering of the SL NC TB, (e) a fifth indication of a successful receipt of the SL NC TB, or (f) a sixth indication of a failed receipt of the SL NC TB.

Aspect 27 is the method of any of aspects 24 to 26, further including transmitting, to a source encoder, a second confirmation message in response to the NC handover request.

Aspect 28 is the method of aspect 27, where the second confirmation message may include a PSCCH or a PSFCH message.

Aspect 29 is the method of any of aspects 24 to 28, further including receiving, from a source encoder, the SL NC TB.

Aspect 30 is the method of any of aspects 16 to 29, where the SL NC TB may include a header having at least one of an indication of an NC handover request or an ID of the destination encoder.

Aspect 31 is a method of wireless communication at a network entity, including outputting, to a destination encoder, a first NC handover request for the destination encoder to transmit or receive an SL TB for NC to or from a UE, respectively. The method may further include outputting, to one of the destination encoder or the UE, a first grant to transmit the SL NC TB using an SL resource.

Aspect 32 is the method of aspect 31, further including outputting, to a source encoder, a second NC handover request for the source encoder to transmit the SL NC TB. The method may further include outputting, to the source encoder, a second grant to transmit the SL NC TB using a second SL resource.

Aspect 33 is the method of aspect 32, where the first NC handover request may include a first unicast transmission. The second NC handover request may include a second unicast transmission.

Aspect 34 is the method of aspect 32, where the first NC handover request and the second NC handover request may compose a groupcast or a broadcast transmission.

Aspect 35 is the method of any of aspects 31 to 34, where the first NC handover request may include a DCI transmission, a MAC-CE transmission, or an RRC transmission.

Aspect 36 is the method of any of aspects 31 to 35, where the first NC handover request may include at least one of (a) a first indication of the destination encoder, (b) a second indication of a source encoder, (c) a third indication for the source encoder to transmit the SL NC TB to the destination encoder, or (d) a fourth indication for the source encoder to transmit the SL NC TB to the UE.

Aspect 37 is the method of any of aspects 31 to 36, where the first NC handover request may include a first indication for a source encoder to transmit the SL NC TB to the destination encoder and a second indication that the SL NC TB includes an NC transmission.

Aspect 38 is the method of any of aspects 31 to 37, where the first NC handover request may include the grant to transmit the SL NC TB using the SL resource in at least one of time or frequency.

Aspect 39 is the method of any of aspects 31 to 38, further including obtaining, from the destination encoder or the UE, an indication of acceptance for the first NC handover request. Outputting the grant to transmit the SL NC TB using the SL resource may be in response to obtaining the indication of the acceptance for the first NC handover request.

Aspect 40 is the method of any of aspects 31 to 39, further including obtaining, from the destination encoder, a confirmation message.

Aspect 41 is the method of aspect 40, where the confirmation message may include a UCI format.

Aspect 42 is the method of aspect 41, where the confirmation message may include at least one of (a) a first indication of acceptance for the NC handover request, (b) a second indication of rejection for the NC handover request, (c) a third indication of buffering of the SL NC TB, (d) a fourth indication of no buffering of the SL NC TB, (e) a fifth indication of a successful receipt of the SL NC TB, or (f) a sixth indication of a failed receipt of the SL NC TB.

Aspect 43 is the method of any of aspects 40 to 42, further including outputting, to a second destination encoder, a second NC handover request for the second destination encoder to transmit or receive the SL TB for NC to or from the UE, respectively in response to receiving at least one of (a) a first indication of rejection for the first NC handover request, (b) a second indication of no buffering of the SL NC TB, or (c) a third indication of a failed receipt of the SL NC TB.

Aspect 44 is a method of wireless communication at a first device, where the method may include communicating an SL TB with a second device for NC. At least one of the first device or the second device may include a UE. The method may also include transmitting, to a network entity, a first message including a first location information that indicates a movement of the UE from a first zone to a second zone.

Aspect 45 is the method of aspect 44, where the first device includes the UE and the second device includes a first encoder associated with the first zone.

Aspect 46 is the method of aspect 45, where the first message includes a BSR including the first location information associated with the UE.

Aspect 47 is the method of any of aspects 44 to 46, where the first message includes a UE ID, a zone ID, or a geographic location associated with the UE.

Aspect 48 is the method of aspect 44, where the first device includes a first encoder that encodes the TB and the second device includes the UE.

Aspect 49 is the method of aspect 48, where communicating the SL TB for NC may include communicating at least one SL TB with each UE of a set of UEs. Transmitting the first message including the first location information may include transmitting, to the network entity, location information associated with each UE of the set of UEs.

Aspect 50 is the method of any of aspects 44 to 49, where the method may include transmitting, to the network entity, a second location information associated with the first encoder.

Aspect 51 is the method of any of aspects 44 to 50, where the method may include receiving, from the network entity, an NC handover request. The method may include transmitting, to a second encoder of the second zone, the SL TB based on the NC handover request.

Aspect 52 is a method of wireless communication at a network entity, where the method may include obtaining, from a first device, a first message including a first location information associated with a UE in SL communication with a first encoder associated with a first zone. The method may include initializing an NC handover of the UE to a second encoder in a second zone in response to the first location information indicating a movement of the UE from the first zone to the second zone.

Aspect 53 is the method of aspect 52, where the first device includes the UE.

Aspect 54 is the method of aspect 53, where the first message includes a BSR including the first location information.

Aspect 55 is the method of any of aspects 53 to 54, where the first message includes a UE ID, a zone ID, or a geographic location associated with the UE.

Aspect 56 is the method of any of aspects 52 to 55, where the first device includes the first encoder.

Aspect 57 is the method of aspect 56, where the method may include obtaining, from the first encoder, a second message including location information associated with each UE of a set of UEs in SL communication with the first encoder. The set of UEs may include the UE.

Aspect 58 is the method of any of aspects 52 to 57, where the method may include obtaining, from the first encoder, a second location information associated with the first encoder. The second location information associated with the first encoder and the first location information may indicate the movement of the UE from the first zone to the second zone.

Aspect 59 is a method of wireless communication at a second encoder, where the method may include receiving, from a network entity, a NC handover request. The method may include transmitting a SL NC TB to a UE based on the NC handover request.

Aspect 60 is the method of aspect 59, where receiving the NC handover request may include receiving at least one of DCI, a MAC-CE, or an RRC including the NC handover request.

Aspect 61 is the method of any of aspects 59 to 60, where the NC handover request may include at least one of a first indication of the second encoder, a second indication of a first encoder, a third indication for the first encoder to transmit the SL NC TB to the second encoder, or a fourth indication for the first encoder to transmit the SL NC TB to the UE.

Aspect 62 is the method of any of aspects 59 to 61, where the NC handover request may include a first indication for a first encoder to transmit the SL NC TB to the second encoder and a second indication that the SL NC TB may include an NC transmission.

Aspect 63 is the method of any of aspects 59 to 62, where the NC handover request may include a grant of an SL resource in at least one of time or frequency. Transmitting the SL NC TB to the UE based on the NC handover request may include transmitting the SL NC TB to the UE using the SL resource.

Aspect 64 is the method of any of aspects 59 to 63, where the method may include transmitting, to the network entity, an indication of acceptance for the NC handover request. The method may include receiving, from the network entity, a grant of an SL resource, in at least one of time or frequency. Transmitting the SL NC TB to the UE based on the NC handover request may include transmitting the SL NC TB to the UE using the SL resource.

Aspect 65 is the method of any of aspects 59 to 64, where at least one of a unicast transmission, a groupcast transmission, or a broadcast transmission may include the NC handover request.

Aspect 66 is the method of any of aspects 59 to 65, where the method may include transmitting, to a first encoder, a request for the SL NC TB. The method may include receiving, from the first encoder, the SL NC TB in response to transmitting the request.

Aspect 67 is the method of any of aspects 59 to 66, where the method may include transmitting, to the network entity, a confirmation message based on the NC handover request.

Aspect 68 is the method of aspect 67, where confirmation message may include UCI, and the confirmation message may include (a) a first indication of acceptance for the NC handover request, (b) a second indication of rejection for the NC handover request, (c) a third indication of buffering of the SL NC TB, (d) a fourth indication of no buffering of the SL NC TB, (e) a fifth indication of a successful receipt of the SL NC TB, or (f) a sixth indication of a failed receipt of the SL NC TB.

Aspect 69 is the method of any of aspects 67 to 68, where the method may include transmitting, to a first encoder, a second confirmation message based on the NC handover request. The second confirmation message may include a PSCCH or a PSFCH message.

Aspect 70 is the method of any of aspects 67 to 69, where the method may include receiving, from a first encoder, the SL NC TB.

Aspect 71 is the method of aspect 70, where the SL NC TB may include a header having at least one of an indication of the NC handover request or an ID of the second encoder.

Aspect 72 is a method of wireless communication at a network entity, where the method may include outputting, to a second encoder, a first NC handover request for the second encoder to communicate an SL TB with a UE. The method may include outputting a first grant to the second encoder to transmit an SL NC TB using a first SL resource or a second grant to the UE to transmit the SL TB using a second SL resource.

Aspect 73 is the method of aspect 72, where the method may include outputting, to a first encoder, a second NC handover request for the first encoder to transmit the SL NC TB. The method may include outputting, to the first encoder, a third grant to transmit the SL NC TB using a third SL resource.

Aspect 74 is the method of any of aspects 72 to 73, where the method may include outputting, to a first encoder, a second NC handover request for the first encoder to transmit the SL NC TB. The method may include outputting, to the first encoder, a third grant to transmit the SL NC TB using a third SL resource.

Aspect 75 is the method of aspect 74, where a first unicast transmission may include the first NC handover request. A second unicast transmission may include the second NC handover request.

Aspect 76 is the method of any of aspects 74 to 75, where a groupcast or a broadcast transmission may include the first NC handover request and the second NC handover request.

Aspect 77 is the method of any of aspects 72 to 76, where at least one of DCI, a MAC-CE, or an RRC may include the first NC handover request.

Aspect 78 is the method of any of aspects 72 to 77, where the first NC handover request may include at least one of a first indication of the second encoder, a second indication of a first encoder, a third indication for the first encoder to transmit the SL NC TB to the second encoder, or a fourth indication for the first encoder to transmit the SL NC TB to the UE.

Aspect 79 is the method of any of aspects 72 to 78, where the first NC handover request may include a first indication for a first encoder to transmit the SL NC TB to the second encoder and a second indication that the SL NC TB may include an NC transmission.

Aspect 80 is the method of any of aspects 72 to 79, where the first NC handover request may include the first grant to transmit the SL NC TB using the first SL resource in at least one of time or frequency.

Aspect 81 is the method of any of aspects 72 to 80, where the method may include obtaining, from the second encoder, an indication of acceptance for the first NC handover request. Outputting the first grant to transmit the SL NC TB using the first SL resource may include outputting the first grant based on the indication of the acceptance for the first NC handover request.

Aspect 82 is the method of any of aspects 72 to 81, where the method may include obtaining, from the second encoder, a confirmation message.

Aspect 83 is the method of aspect 82, where the confirmation message may include UCI. The confirmation message may include at least one of (a) a first indication of acceptance for the NC handover request, (b) a second indication of rejection for the NC handover request, (c) a third indication of buffering of the SL NC TB, (d) a fourth indication of no buffering of the SL NC TB, (e) a fifth indication of a successful receipt of the SL NC TB, or (f) a sixth indication of a failed receipt of the SL NC TB Aspect 84 is the method of any of aspects 82 to 83, where the method may include outputting, to a second encoder, a second NC handover request based on a first indication of rejection for the first NC handover request.

Aspect 85 is an apparatus for wireless communication comprising means for performing the method of any of aspects 1-15.

Aspect 86 is an apparatus for wireless communication, comprising a memory; and at least one processor coupled to the memory and configured to perform the method of any of aspects 1-15.

In aspect 87, the apparatus of aspect 85 or 86 further includes at least one antenna.

Aspect 88 is a non-transitory computer-readable storage medium storing computer executable code, the code when executed by a processor causes the processor to perform the method of any of aspects 1-15.

Aspect 89 is an apparatus for wireless communication comprising means for performing the method of any of aspects 16-30.

Aspect 90 is an apparatus for wireless communication, comprising a memory; and at least one processor coupled to the memory and configured to perform the method of any of aspects 16-30.

In aspect 91, the apparatus of aspect 89 or 90 further includes at least one antenna.

Aspect 92 is a non-transitory computer-readable storage medium storing computer executable code, the code when executed by a processor causes the processor to perform the method of any of aspects 16-30.

Aspect 93 is an apparatus for wireless communication comprising means for performing the method of any of aspects 31-43.

Aspect 94 is an apparatus for wireless communication, comprising a memory; and at least one processor coupled to the memory and configured to perform the method of any of aspects 31-43.

In aspect 95, the apparatus of aspect 93 or 94 further includes at least one antenna.

Aspect 96 is a non-transitory computer-readable storage medium storing computer executable code, the code when executed by a processor causes the processor to perform the method of any of aspects 31-43.

Aspect 97 is an apparatus for wireless communication comprising means for performing the method of any of aspects 44-51.

Aspect 98 is an apparatus for wireless communication, comprising a memory; and at least one processor coupled to the memory and configured to perform the method of any of aspects 44-51.

In aspect 99, the apparatus of aspect 97 or 98 further includes at least one antenna.

Aspect 100 is a non-transitory computer-readable storage medium storing computer executable code, the code when executed by a processor causes the processor to perform the method of any of aspects 44-51.

Aspect 101 is an apparatus for wireless communication comprising means for performing the method of any of aspects 52-58.

Aspect 102 is an apparatus for wireless communication, comprising a memory; and at least one processor coupled to the memory and configured to perform the method of any of aspects 52-58.

In aspect 103, the apparatus of aspect 101 or 102 further includes at least one antenna.

Aspect 104 is a non-transitory computer-readable storage medium storing computer executable code, the code when executed by a processor causes the processor to perform the method of any of aspects 52-58.

Aspect 105 is an apparatus for wireless communication comprising means for performing the method of any of aspects 59-71.

Aspect 106 is an apparatus for wireless communication, comprising a memory; and at least one processor coupled to the memory and configured to perform the method of any of aspects 59-71.

In aspect 107, the apparatus of aspect 105 or 106 further includes at least one antenna.

Aspect 108 is a non-transitory computer-readable storage medium storing computer executable code, the code when executed by a processor causes the processor to perform the method of any of aspects 59-71.

Aspect 109 is an apparatus for wireless communication comprising means for performing the method of any of aspects 72-84.

Aspect 110 is an apparatus for wireless communication, comprising a memory; and at least one processor coupled to the memory and configured to perform the method of any of aspects 72-84.

In aspect 111, the apparatus of aspect 109 or 110 further includes at least one antenna.

Aspect 112 is a non-transitory computer-readable storage medium storing computer executable code, the code when executed by a processor causes the processor to perform the method of any of aspects 72-84.

What is claimed is:

1. An apparatus for wireless communication at a first encoder, comprising:
    memory; and
    one or more processors coupled to the memory and configured to cause the first encoder to:
        receive, from a user equipment (UE), a sidelink transport block (TB) for network coding;
        receive, from a network entity, a network coding handover request based on a movement of the UE from a first zone to a second zone;
        generate a sidelink network coding transport block (NC TB) based on the received sidelink TB and a second sidelink TB; and
        transmit, to a second encoder, the generated sidelink NC TB based on the received network coding handover request.

2. The apparatus of claim 1, wherein the one or more processors are further configured to cause the first encoder to:
    transmit, to the network entity, a first location information that indicates the movement of the UE from the first zone to the second zone before reception of the network coding handover request.

3. The apparatus of claim 2, further comprising a transceiver coupled to the one or more processors, wherein the one or more processors are further configured to cause the first encoder to:
    transmit the first location information via the transceiver, wherein the first location information comprises at least one of a UE identifier (ID), a zone ID, or a geographic location associated with the UE.

4. The apparatus of claim 2, wherein the one or more processors are further configured to cause the first encoder to:
    transmit, to the network entity, a second location information associated with the first encoder before reception of the network coding handover request.

5. The apparatus of claim 1, wherein the first encoder comprises a first road side unit (RSU) and the second encoder comprises a second RSU.

6. The apparatus of claim 1, wherein the network coding handover request comprises an indication for the first encoder to transmit the sidelink NC TB to the second encoder.

7. The apparatus of claim 1, wherein the one or more processors are further configured to cause the first encoder to:
    receive, from a second UE of a set of UEs, the second sidelink TB, wherein the set of UEs comprises the UE.

8. The apparatus of claim 1, wherein the received network coding handover request comprises an indication for the first encoder to transmit the sidelink NC TB to the UE, wherein the one or more processors are further configured to cause the first encoder to:
    transmit, to the UE, the generated sidelink NC TB.

9. An apparatus for wireless communication at a network entity, comprising:
    memory; and
    one or more processors coupled to the memory and configured to cause the network entity to:
        obtain, from a first device, a first message that includes a first location information associated with a first user equipment (UE) in sidelink communication with a first encoder associated with a first zone; and
        transmit, in response to the first location information that indicates a movement of the first UE from the first zone to a second zone, at least one of:
            a first network coding handover request to the first encoder, wherein the first network coding handover request includes a first indication to transmit, to a second encoder in the second zone, a sidelink network coding transport block (NC TB) based on a first sidelink transport block (TB) associated with the first UE and a second sidelink TB associated with a second UE, or
            a second network coding handover request to the second encoder in the second zone, wherein the second network coding handover request includes a second indication to generate the sidelink NC TB based on the first sidelink TB associated with the first UE and the second sidelink TB associated with the second UE.

10. The apparatus of claim 9, wherein the first device comprises the first UE.

11. The apparatus of claim 10, wherein the first message comprises a buffer status report (BSR) that includes the first location information.

12. The apparatus of claim 9, further comprising a transceiver coupled to the one or more processors, wherein the one or more processors are further configured to cause the network entity to:
    obtain the first message via the transceiver, and wherein the first message comprises at least one of a UE identifier (ID), a zone ID, or a geographic location associated with the first UE.

13. The apparatus of claim 9, wherein the first device comprises the first encoder.

14. The apparatus of claim 13, wherein the one or more processors are further configured to cause the network entity to:
    obtain, from the first encoder, a second message that includes location information associated with each UE of a set of UEs in communication over sidelink with the first encoder, wherein the set of UEs comprises the first UE.

15. The apparatus of claim 13, wherein the one or more processors are further configured to cause the network entity to:
    obtain, from the first encoder, a second location information associated with the first encoder, wherein the second location information associated with the first encoder and the first location information indicates the movement of the first UE from the first zone to the second zone.

16. An apparatus for wireless communication at a second encoder, the apparatus comprising:
memory; and
one or more processors coupled to the memory and configured to cause the second encoder to:
receive, from a network entity, a network coding handover request;
receive, from a first encoder, one of:
a sidelink network coding transport block (NC TB) based on a first sidelink transport block (TB) associated with a first user equipment (UE) and a second sidelink TB associated with a second UE or the first sidelink TB associated with the first UE, or
the first sidelink TB, wherein the sidelink NC TB is generated at the second encoder in response to reception of the first sidelink TB; and
transmit, to a UE the sidelink NC TB based on the network coding handover request.

17. The apparatus of claim 16, further comprising a transceiver coupled to the one or more processors, wherein, to receive the network coding handover request, the one or more processors are further configured to cause the second encoder to:
receive at least one of downlink control information (DCI), a medium access control (MAC) control element (MAC-CE), or a radio resource control (RRC) comprising the network coding handover request via the transceiver.

18. The apparatus of claim 16, wherein the network coding handover request comprises at least one of:
a first indication of the second encoder,
a second indication of the first encoder,
a third indication for the first encoder to transmit the sidelink NC TB to the second encoder, or
a fourth indication for the first encoder to transmit the sidelink NC TB to the UE.

19. The apparatus of claim 16, wherein the network coding handover request comprises a first indication for the first encoder to transmit the first sidelink TB to the second encoder and a second indication for the second encoder to generate the sidelink NC TB based on the first sidelink TB.

20. The apparatus of claim 16, wherein the network coding handover request comprises a grant of a sidelink resource in at least one of time or frequency, wherein, to transmit the sidelink NC TB to the UE based on the network coding handover request, the one or more processors are further configured to cause the second encoder to:
transmit the sidelink NC TB to the UE on the sidelink resource.

21. The apparatus of claim 16, wherein the one or more processors are further configured to cause the second encoder to:
transmit, to the network entity, an indication of acceptance for the network coding handover request; and
receive, from the network entity, a grant of a sidelink resource, in at least one of time or frequency, wherein, to transmit the sidelink NC TB, the one or more processors are further configured to cause the second encoder to transmit the sidelink NC TB to the UE on the sidelink resource.

22. The apparatus of claim 16, wherein at least one of a unicast transmission, a groupcast transmission, or a broadcast transmission comprises the network coding handover request.

23. The apparatus of claim 16, wherein the one or more processors are further configured to cause the second encoder to:
transmit, to the first encoder, a request for the sidelink NC TB before reception of the network coding handover request; and
receive, from the first encoder, the sidelink NC TB after a transmission of the request.

24. The apparatus of claim 16, wherein the one or more processors are further configured to cause the second encoder to:
transmit, to the network entity, a confirmation message based on the network coding handover request.

25. The apparatus of claim 24, wherein the confirmation message comprises an uplink control information (UCI), and includes at least one of:
a first indication of acceptance for the network coding handover request,
a second indication of rejection for the network coding handover request,
a third indication of buffering of the sidelink NC TB,
a fourth indication of no buffering of the sidelink NC TB,
a fifth indication of a successful receipt of the sidelink NC TB, or
a sixth indication of a failed receipt of the sidelink NC TB.

26. The apparatus of claim 24, wherein the one or more processors are further configured to cause the second encoder to:
transmit, to the first encoder, a second confirmation message based on the network coding handover request, wherein the second confirmation message comprises a physical sidelink control channel (PSCCH) or a physical sidelink feedback channel (PSFCH) message.

27. The apparatus of claim 16, wherein the one or more processors are further configured to:
generate the sidelink NC TB based on the first sidelink TB associated with the first UE and the second sidelink TB associated with the second UE in response to the reception of the first sidelink TB.

28. The apparatus of claim 16, wherein the sidelink NC TB comprises a header that includes at least one of an indication of the network coding handover request or an identifier (ID) of the second encoder.

29. An apparatus for wireless communication at a network entity, comprising:
memory; and
one or more processors coupled to the memory and configured to cause the network entity to:
output, to a second encoder, a first network coding handover request for the second encoder to communicate a sidelink network coding transport block (NC TB) to a third user equipment (UE), wherein the sidelink NC TB is based on a first sidelink transport block (TB) associated with a first UE and a second sidelink TB associated with a second UE; and
output, to the second encoder, a first grant to transmit the sidelink NC TB on a first sidelink resource.

30. The apparatus of claim 29, wherein the one or more processors are further configured to cause the network entity to:
output, to a first encoder, a second network coding handover request for the first encoder to transmit the sidelink NC TB; and
output, to the first encoder, a third grant to transmit the sidelink NC TB on a third sidelink resource.

31. The apparatus of claim 30, wherein a first unicast transmission comprises the first network coding handover request and wherein a second unicast transmission comprises the second network coding handover request.

32. The apparatus of claim 30, wherein at least one of a groupcast transmission or a broadcast transmission comprise both the first network coding handover request and the second network coding handover request.

33. The apparatus of claim 29, wherein the one or more processors are further configured to cause the network entity to:
obtain, from the second encoder, a confirmation message that includes an indication that the second encoder transmitted the sidelink NC TB on the first sidelink resource.

34. The apparatus of claim 30, wherein the one or more processors are further configured to cause the network entity to:
receive, from the second encoder, an indication of rejection of the first network coding handover request, wherein, to output the second network coding handover request, the one or more processors are configured to cause the network entity to:
output the second network coding handover request based on the indication of the rejection for the first network coding handover request.

35. The apparatus of claim 29, further comprising a transceiver coupled to the one or more processors, wherein, to output the first network coding handover request, the one or more processors are further configured to cause the network entity to:
transmit the first network coding handover request via the transceiver, wherein at least one of downlink control information (DCI), a medium access control (MAC) control element (MAC-CE), or a radio resource control (RRC) comprises the first network coding handover request.

36. The apparatus of claim 29, wherein the first network coding handover request comprises at least one of a first indication of the second encoder, a second indication of a first encoder, a third indication for the first encoder to transmit the sidelink NC TB to the second encoder, or a fourth indication for the first encoder to transmit the sidelink NC TB to the third UE.

37. The apparatus of claim 29, wherein the first network coding handover request comprises a first indication for a first encoder to transmit the sidelink NC TB to the second encoder and a second indication that the sidelink NC TB comprises a network coding transmission.

38. The apparatus of claim 29, wherein the first network coding handover request comprises the first grant to transmit the sidelink NC TB on the first sidelink resource in at least one of time or frequency.

39. The apparatus of claim 29, wherein the one or more processors are further configured to cause the network entity to:
obtain, from the second encoder, an indication of acceptance for the first network coding handover request, wherein, to output the first grant to transmit the sidelink NC TB on the first sidelink resource, the one or more processors are further configured to cause the network entity to:
output the first grant based on the indication of the acceptance of the first network coding handover request.

40. The apparatus of claim 33, wherein the confirmation message comprises an uplink control information (UCI) and includes at least one of:
a first indication of acceptance for the first network coding handover request,
a second indication of rejection for the first network coding handover request,
a third indication of buffering of the sidelink NC TB,
a fourth indication of no buffering of the sidelink NC TB,
a fifth indication of a successful receipt of the sidelink NC TB, or
a sixth indication of a failed receipt of the sidelink NC TB.

41. A method for wireless communication at a first encoder, comprising:
receiving, from a user equipment (UE), a sidelink transport block (TB) for network coding;
receiving, from a network entity, a network coding handover request based on a movement of the UE from a first zone to a second zone;
generating a sidelink network coding transport block (NC TB) based on the received sidelink TB and a second sidelink TB; and
transmitting, to a second encoder, the generated sidelink NC TB based on the received network coding handover request.

42. A method for wireless communication at a network entity, comprising:
obtaining, from a first device, a first message that includes a first location information associated with a first user equipment (UE) in sidelink communication with a first encoder associated with a first zone; and
transmitting, in response to the first location information that indicates a movement of the first UE from the first zone to a second zone, at least one of:
a first network coding handover request to the first encoder, wherein the first network coding handover request includes a first indication to transmit, to a second encoder in the second zone, a sidelink network coding transport block (NC TB) based on a first sidelink transport block (TB) associated with the first UE and a second sidelink TB associated with a second UE, or
a second network coding handover request to the second encoder in the second zone, wherein the second network coding handover request includes a second indication to generate the sidelink NC TB based on the first sidelink TB associated with the first UE and the second sidelink TB associated with the second UE.

43. A method for wireless communication at a second encoder, comprising:
receiving, from a network entity, a network coding handover request;
receiving, from a first encoder, one of:
a sidelink network coding transport block (NC TB) based on a first sidelink transport block (TB) associated with a first user equipment (UE) and a second sidelink TB associated with a second UE or the first sidelink TB associated with the first UE, or
the first sidelink TB, wherein the sidelink NC TB is generated at the second encoder in response to reception of the first sidelink TB; and
transmitting, to a UE the sidelink NC TB based on the network coding handover request.

44. A method for wireless communication at a network entity, comprising:
outputting, to a second encoder, a first network coding handover request for the second encoder to communicate a sidelink network coding transport block (NC TB) to a third user equipment (UE), wherein the sidelink NC TB is based on a first sidelink transport block (TB)

associated with a first UE and a second sidelink TB associated with a second UE; and outputting, to the second encoder, a first grant to transmit the sidelink NC TB on a first sidelink resource.

* * * * *